(12) United States Patent  
Kondo et al.

(10) Patent No.: US 7,963,155 B2  
(45) Date of Patent: *Jun. 21, 2011

(54) FUEL PRESSURE SENSOR/SENSOR MOUNT ASSEMBLY, FUEL INJECTION APPARATUS, AND PRESSURE SENSING APPARATUS

(75) Inventors: Jun Kondo, Nagoya (JP); Tooru Taguchi, Handa (JP); Hideo Naruse, Chiryu (JP); Akitoshi Yamanaka, Hekinan (JP)

(73) Assignee: Denso Corporation, Kariya (JP)

( * ) Notice: Subject to any disclaimer, the term of this patent is extended or adjusted under 35 U.S.C. 154(b) by 181 days.

This patent is subject to a terminal disclaimer.

(21) Appl. No.: 12/412,449

(22) Filed: Mar. 27, 2009

(65) Prior Publication Data

US 2009/0241650 A1 Oct. 1, 2009

(30) Foreign Application Priority Data

Mar. 28, 2008 (JP) ................................. 2008-086989  
Apr. 15, 2008 (JP) ................................. 2008-106015  
Sep. 18, 2008 (JP) ................................. 2008-239748

(51) Int. Cl.  
*G01M 15/04* (2006.01)

(52) U.S. Cl. .................................. 73/114.43; 73/114.45

(58) Field of Classification Search ............... 73/114.43, 73/114.45  
See application file for complete search history.

(56) References Cited

U.S. PATENT DOCUMENTS

| | | | |
|---|---|---|---|
| 4,438,496 A | | 3/1984 | Ohie |
| 5,890,653 A | * | 4/1999 | Kelly ................................. 239/5 |
| 6,729,297 B2 | * | 5/2004 | Futonagane et al. .......... 123/299 |
| 7,305,972 B2 | * | 12/2007 | Kloos et al. .................... 123/479 |
| 7,552,717 B2 | * | 6/2009 | Dingle ........................... 123/480 |
| 7,765,995 B2 | * | 8/2010 | Nakata et al. .................. 123/673 |
| 7,810,472 B2 | * | 10/2010 | Kondo et al. .................. 123/456 |
| 2003/0233998 A1 | * | 12/2003 | Futonagane et al. .......... 123/299 |
| 2006/0266332 A1 | * | 11/2006 | Kloos et al. .................... 123/446 |
| 2008/0228374 A1 | * | 9/2008 | Ishizuka et al. ................ 701/103 |
| 2009/0038589 A1 | * | 2/2009 | Dingle ........................... 123/480 |
| 2009/0118981 A1 | * | 5/2009 | Kondo et al. .................. 701/104 |
| 2009/0118982 A1 | * | 5/2009 | Kondo et al. .................. 701/104 |
| 2009/0118983 A1 | * | 5/2009 | Kondo et al. .................. 701/104 |

(Continued)

FOREIGN PATENT DOCUMENTS

EP 1925803 A1 5/2008

(Continued)

OTHER PUBLICATIONS

U.S. Appl. No. 12/265,743, Kondo et al, filed Nov. 2008.

(Continued)

*Primary Examiner* — Freddie Kirkland, III  
(74) *Attorney, Agent, or Firm* — Nixon & Vanderhye PC

(57) ABSTRACT

A fuel pressure sensor/sensor mount assembly in which a fuel pressure sensor is so mounted as to exposed to a high-pressure fuel path through which fuel is supplied to a fuel injector, a fuel injection apparatus equipped with a built-in fuel pressure sensor, and a pressure sensing apparatus working to measure the pressure of fuel in a fuel injector are provided. The fuel pressure sensor/sensor mount assembly is disposed between the high-pressure fuel path and the fuel injector, thus permitting the size of the fuel injector to be minimized without sacrificing the accuracy in measuring the pressure of the fuel. The fuel injection apparatus and the a pressure sensing apparatus are designed to ensure desired accuracy in measuring the pressure of the fuel.

27 Claims, 29 Drawing Sheets

U.S. PATENT DOCUMENTS

| | | | |
|---|---|---|---|
| 2009/0248276 A1* | 10/2009 | Kondo et al. | 701/103 |
| 2010/0050991 A1* | 3/2010 | Cooke | 123/470 |
| 2010/0096480 A1* | 4/2010 | Kondo et al. | 239/584 |
| 2010/0251998 A1* | 10/2010 | Kondo et al. | 123/470 |
| 2010/0252001 A1* | 10/2010 | Morita et al. | 123/472 |
| 2010/0252003 A1* | 10/2010 | Fujino et al. | 123/478 |
| 2010/0263633 A1* | 10/2010 | Kondo et al. | 123/478 |
| 2010/0264239 A1* | 10/2010 | Kondo et al. | 239/533.3 |

FOREIGN PATENT DOCUMENTS

| | | |
|---|---|---|
| JP | S57-005526 | 1/1982 |
| JP | 2000-241273 | 9/2000 |
| JP | 2000-265892 | 9/2000 |
| JP | 2000-275128 | 10/2000 |
| JP | 2001-324402 | 11/2001 |
| JP | 2002-013994 | 1/2002 |
| JP | 2002-013997 | 1/2002 |
| JP | 2007-016678 | 1/2007 |
| JP | 2007-154700 | 6/2007 |
| JP | 2007-218249 | 8/2007 |
| JP | 2007-231770 | 9/2007 |
| JP | 2007-270822 | 10/2007 |
| JP | 2008-144749 | 6/2008 |

OTHER PUBLICATIONS

U.S. Appl. No. 12/265,772, Kondo et al, filed Nov. 2008.
U.S. Appl. No. 12/265,745, Kondo et al, filed Nov. 2008.

* cited by examiner

FUEL PRESSURE SENSOR/SENSOR MOUNT ASSEMBLY, FUEL INJECTION APPARATUS, AND PRESSURE SENSING APPARATUS

CROSS REFERENCE TO RELATED DOCUMENT

The present application claims the benefit of Japanese Patent Applications No. 2008-86989 filed on Mar. 28, 2008, No. 2008-239748 filed on Sep. 18, 2008, and No. 2008-106015 filed on Apr. 15, 2008, disclosures of which are incorporated herein by reference.

BACKGROUND OF TUE INVENTION

1. Technical Field of the Invention

The present invention relates generally to a fuel pressure sensor/sensor mount assembly in which a fuel pressure sensor is so mounted as to exposed to a high-pressure fuel path through which fuel is supplied to a fuel injector, a fuel injection apparatus equipped with a fuel pressure sensor, and a pressure sensing apparatus working to measure the pressure of fuel in a fuel injector.

2. Background Art

In order to ensure the accuracy in controlling output torque of internal combustion engines and the quantity of exhaust emissions therefrom, it is essential to control a fuel injection mode such as the quantity of fuel to be sprayed from a fuel injector or the injection timing at which the fuel injector starts to spray the fuel. For controlling such a fuel injection mode, there have been proposed techniques for monitoring a change in pressure of the fuel upon spraying thereof from the fuel injector.

Specifically, the time when the pressure of the fuel begins to drop due to the spraying thereof from the fuel injector may be used to determine an actual injection timing at which the fuel has been sprayed actually. The amount of drop in pressure of the fuel arising from the spraying thereof may be used to determine the quantity of fuel sprayed actually from the fuel injector. Such actual observation of the fuel injection mode ensures the desired accuracy in controlling the fuel injection mode.

For instance, in the case where a change in pressure of the fuel arising from the spraying of the fuel from the fuel injector (which will also be referred to as a fuel pressure change below) is measured using a fuel pressure sensor installed directly in a common rail (i.e., a fuel accumulator), it will be somewhat absorbed within the common rail, thus resulting in a decrease in accuracy in determining such a pressure change. In order to alleviate this drawback, Japanese Patent First Publication No. 2000-265892 teaches installation of the fuel pressure sensor in a joint between the common rail and a high-pressure pipe through which the fuel is delivered from the common rail to the fuel injector to measure the fuel pressure change before it is absorbed within the common rail.

The fuel pressure change, as produced at a spray hole of the fuel injector through which the fuel has been sprayed, will, however, surely attenuates within the high-pressure pipe. The use of the pressure sensor, as disclosed in the above publication, installed in the joint between the common rail and the high-pressure pipe, therefore, does not ensure the desired accuracy in determining the fuel pressure change. The inventors have studied the installation of the pressure sensor in a portion of the fuel injector which is located downstream of the high-pressure pipe. Such installation, however, has been found to pose the problems, as discussed below.

The inventors have studied a fuel injector in which a branch path is formed which diverges from a fuel inlet path, and a fuel pressure sensor is installed so as to be exposed to the branch path. This structure, however, results in an increase in size of the fuel injector in a direction toward the branch path.

It is, therefore, a first object of the invention to provide a fuel pressure sensor/sensor mount assembly, a fuel injection apparatus, and pressure sensing apparatus which are permitted to be reduced in size without use of the branch path, as described above, and designed to facilitate the ease of installation to an internal combustion engine.

Japanese Patent First Publication No. 2007-231770 discloses a common rail fuel injection system equipped with a fuel pressure sensor which measures the pressure of fuel to be sprayed from a fuel injector. This system has a fuel pressure sensor installed in an end of a common rail to measure the pressure of fuel within the common rail. Japanese Patent First Publication Nos. 2007-270822 and 2007-218249 teach a fuel injector used with the above type of common rail fuel injection system.

Japanese Patent First Publication No. 57-5526 discloses a fuel injector equipped with a built-in fuel pressure sensor which works to measure the pressure of fuel to be sprayed. The fuel injector has a recess formed near a fuel flow path extending through a body of the fuel injector and a strain gauge mounted on the recess to measure a change in pressure of the fuel arising from the spraying of the fuel.

It is, however, impossible for the structures, as disclosed in the above second to fourth publications, to measure the pressure of fuel inputted directly into the fuel injector.

The fuel injector, as disclosed in the above fifth publication, has the recess machined in an outer wall of a lower portion of the body of the fuel injector near the fuel flow path to form the bottom of the recess as a diaphragm which is to be deformed by the pressure of the fuel. The fuel flow path is typically defined by a through hole which is so formed as to extend in a lengthwise direction of the body of the fuel injector. Therefore, in the case where the outer wall of the body of the fuel injector is ground to form the recess, it is difficult to control the thickness of the diaphragm (i.e., the bottom of the recess). This will result in a variation in accuracy of measuring the pressure of fuel among fuel injectors, Particularly, fuel injectors for use in spraying the high-pressure fuel, as disclosed in the above second to fourth publications, are usually made of a high-strength metal in order to ensure the mechanical strength of a body of the fuel injector which is high enough to withstand the pressure of the fuel or designed to have an increased thickness of a wall of the body of the fuel injector near the fuel flow path. The above problems, therefore, become more serious in such a type of fuel injectors.

It is another object of the invention to provide a fuel injection apparatus which is equipped with a fuel pressure sensor and easy to machine without sacrificing the accuracy in measuring the pressure of fuel to be sprayed.

It is a further object of the invention to provide a fuel injection apparatus which is equipped with a fuel pressure sensor and designed to facilitate replacement of the fuel pressure sensor.

In use, the fuel injectors are partially disposed in the engine cylinder, so that mechanical vibrations arising from the combustion of fuel in the engine cylinder are transmitted over the length of a body of the fuel injector. If the diaphragm of the fuel pressure sensor, as discussed above, is oriented perpendicular to the direction in which the vibrations are transmitted (i.e., the length of the body of the fuel injector, the direction in which the diaphragm deforms will coincide with that in which the vibrations are transmitted. This causes the vibrations to be added as an electrical noise to the output of the fuel pressure sensor.

It is, therefore, a still further object of the invention to provide a fuel injection apparatus which is equipped with a fuel pressure sensor and designed to minimize the electrical noise to be added to the output of the fuel pressure sensor.

SUMMARY OF THE INVENTION

According to one aspect of the present invention, there is provided a fuel pressure sensor/sensor mount assembly for use in a fuel injection system equipped with a fuel injector which injects fuel, as supplied from an accumulator through a fuel pipe, into an internal combustion engine. The fuel pressure sensor/sensor mount assembly comprises: (a) a connector which is to be disposed between the fuel injector and the fuel pipe and has formed therein a communication path which is to establish a fluid communication between a fuel outlet of the fuel pipe and a fuel inlet of the fuel injector, the connector also having formed therein a sensor mount exposed to the communication path; and (b) a fuel pressure sensor mounted in the sensor mount of the connector. The fuel pressure sensor is sensitive to a pressure of the fuel in the communication path to produce a signal indicative thereof.

The connector is, as described above, disposed between the fuel injector and the fuel pipe, thus eliminating the need for a branch path diverging from a fuel flow path extending in the fuel injector. This permits the size of the fuel injector to be minimized and improves the mountability of the fuel injector in the internal combustion engine.

In the preferred mode of the invention, the fuel pressure sensor/sensor mount assembly further includes a connection nut which has an injection-side thread formed on one of ends thereof for engagement with the fuel injector and a connector-side thread formed on the other of the ends for engagement with the connector. The injection-side thread and the connector-side thread are so mechanically oriented that tightening of the connection nut in a given direction causes the injection-side thread and the connector-side thread to establish the engagement with the fuel injector and the connector simultaneously.

The connector is to be retained between a top end portion of the fuel pipe in which the fuel outlet is formed and the fuel injector. The fuel pressure sensor/sensor mount assembly may further include a pipe nut which is to have the top end portion and the connector disposed therein and to establish threadable engagement with the fuel injector. The pipe nut includes a press member to press the top end portion against the connector through the threadable engagement of the pipe nut with the fuel injector.

The fuel pressure sensor is disposed inside the pipe nut. One of the fuel injector and the pipe nut has formed therein a conductor outlet hole through which a conductive wire of the fuel pressure sensor extends from inside to outside the pipe nut.

The connector has a thread which is fastened to the fuel injector. The connector is welded to the fuel injector to hold the connector from rotating relative to the fuel injector.

The connector may be designed to be fastened threadably to the fuel injector and the fuel pipe. The direction in which the connector is fastened threadably to the fuel injector is oriented to traverse the direction in which the connector is fastened threadably to the fuel pipe. This avoids undesirable rotation of the connector following rotation of the fuel pipe when the fuel pipe is disconnected from the connector.

According to the second aspect of the invention, there is provided a fuel pressure sensor/sensor mount assembly for use in a fuel injection system equipped with fuel injectors which inject fuel, as supplied from an accumulator through fuel pipes, into a multi-cylinder internal combustion engine. The fuel pressure sensor/sensor mount assembly comprises: (a) a connector which is to be disposed between the fuel injector sand the fuel pipes and has formed therein a plurality of communication paths which are to establish fluid communications between fuel outlets of the fuel pipes and fuel inlets of the fuel injectors, the connector also having formed therein sensor mounts exposed to the communication paths, respectively; and (b) fuel pressure sensors mounted one in each of the sensor mounts of the connector. Each of the fuel pressure sensors is sensitive to a pressure of the fuel in a corresponding one of the communication paths to produce a signal indicative thereof.

In the preferred mode of the invention, the connector has a joint serving to establish a mechanical joint to a cylinder head of the internal combustion engine, so that the connector functions as a clamp to clamp the fuel injectors to the cylinder head.

The connector may have formed therein a common wire distribution path through which conductive wires of the fuel pressure sensors extend.

The connector may have a common connector to which conductive wires of the fuel pressure sensors are joined.

The connector may be equipped with a cooling mechanism working to cool the fuel pressure sensors.

The cooling mechanism may include a coolant path formed in the connector through which coolant flows to cool the fuel pressure sensors.

The connector may have formed therein a thin-walled portion which is to be deformed elastically by the pressure of the fuel in the communication path. The fuel pressure sensor is designed to be sensitive to elastic deformation of the thin-walled portion to product the signal as a function of the pressure of the fuel.

According to the third aspect of the invention, there is a provided a fuel injection apparatus which comprises: (a) an injector body which has a fuel flow path to which fuel is supplied from an external fuel induction pipe and a spray hole which communicates with the fuel flow path and from which at least a portion of the fuel is sprayed; (b) an inlet body which is designed to be separate from the injector body and secured to the injector body, the inlet body having formed therein a fuel inlet path communicating between the external fuel induction pipe and the fuel flow path of the injector body; and (c) a fuel pressure sensor which is installed in the inlet body and includes a diaphragm which is to be deformed in response to pressure of the fuel flowing through the fuel inlet path and a sensing element which produces a signal as a function of a degree of deformation of the diaphragm. This structure permits the fuel pressure sensor to be diagnosed in operation thereof before the inlet body is secured to the injector body. If a failure in operation of the fuel pressure sensor is found, it may be replaced easily, thus improving the fabrication yield of the fuel injection apparatus.

In the preferred mode of the invention, the fuel injection apparatus may further comprise a nozzle needle which is movable in an axial direction of the injector body to open and close the spray hole selectively, an actuator working to control movement of the nozzle needle in the axial direction of the injector body, and a pressure control chamber into or from which the fuel is fed or discharged by an operation of the actuator and which exerts pressure of the fuel, as fed thereinto, on a control piston to urge the nozzle needle in a valve-closing direction in which the spray hole is closed. The nozzle needle, the actuator, the control piston, and the pressure chamber are disposed in the injector body. The inlet body is joined to a portion of the injector body which is located farther from the spray hole than the pressure control chamber.

The diaphragm may have a flat surface on which the sensing element is mounted. The plane of the flat surface is oriented at an angle greater than or equal to 0° and smaller than 90° to an axial direction of the injector body. This avoids the addition of vibrations arising from the combustion of fuel in the engine to the output of the fuel pressure sensor.

The plane of the flat surface of the diaphragm may alternatively be oriented at an angle greater than or equal to 0° and smaller than or equal to 75° to the axial direction of the injector body. This causes the vibrations to be reduced by 0 to 0.95 times in degree, thus resulting in a decrease in electrical nose added to the output of the fuel pressure sensor.

The inlet body may include a branch path extending from the fuel inlet path and a cylindrical stem having an open end communicating with the branch path and a closed end which is opposite the open end and which defines the diaphragm.

The inlet body also includes an open hole and a recess. The open hole extends from an outer wall of the inlet body into the fuel inlet path to define the branch path. The recess is formed to occupy an area of the outer wall of the inlet body in which the open hole is formed. The cylindrical stem is fit in the recess.

The diaphragm has opposed first and second surfaces. The first surface faces the fuel inlet path. The fuel pressure sensor has a sensing element installed on the second surface of the diaphragm. The recess of the inlet body is so formed in the inlet body that an outermost portion of one of the sensing element and the stem in a radial direction of the inlet body is located radially inside an outermost portion of the outer wall of the inlet body which defines the recess.

The sensing element may be a semiconductor pressure sensing element and affixed to the second surface of the diaphragm.

The branch path may be defined by an orifice formed between the fuel inlet path and the cylindrical stem. The diameter of the orifice is smaller an inner diameter of the cylindrical stem.

The inlet body may be designed to be joined detachably to the injector body through a fastener.

The injector body has a thread formed thereon. The fastener is made of a hollow cylindrical member which covers at least a portion of the inlet body and a portion of the injector body and has a thread engaging with the thread of the injector body to make a joint between the injector body and the inlet body.

The inlet body may include a plurality of connector pins which are electrically connected to the fuel pressure sensor and which are electrically insulated from each other. The fastener has an opening facing the connector pins.

According to the fourth aspect of the invention, there is provided a pressure sensing apparatus for use in a fuel injection system working to spray fuel which comprises: (a) an inlet body including a fuel inlet path through which fuel flows, an open hole and a recess, the open hole extending from an outer wall of the inlet body into the fuel inlet path to define a branch path diverging from the fuel inlet path, the recess being formed to occupy an area of the outer wall of the inlet body in which the open hole is formed; (b) a hollow cylindrical stem having an open end communicating with the branch path and a closed end which is opposite the open end and which defines a diaphragm, the diaphragm having opposed first and second surfaces, the first surface facing the fuel inlet path; and (c) a fuel pressure sensor mounted on the second surface of the diaphragm. The pressure sensor produces a signal as a function of a degree of deformation of the diaphragm arising from exertion of pressure of the fuel. The recess of the inlet body is so formed in the inlet body that an outermost portion of one of the fuel pressure sensor and the stem in a radial direction of the inlet body is located radially inside an outermost portion of the outer wall of the inlet body which defines the recess. This avoids the removal of or physical damage to the fuel pressure sensor when the inlet body is fixed to the injector body.

According to the fifth aspect of the invention, there is provided a pressure sensing apparatus which comprises: (a) an injector body including a fuel inlet port to which an external fuel induction pipe is to be joined and fuel is supplied through the external fuel induction pipe, a fuel flow path through which the fuel, as supplied through the fuel inlet port, flows, and a spray hole which communicates with the fuel flow path and from which at least a portion of the fuel is sprayed; (b) a diaphragm exposed to the fuel flowing through the fuel flow path, the diaphragm having a flat wall which is to be deformed in response to pressure of the fuel; and (c) a fuel pressure sensor mounted on the flat wall of the diaphragm, the fuel pressure sensor producing a signal as a function of a degree of deformation of the diaphragm. If an axial direction of the injector body is defined as a first direction, and a radial direction of the injector body oriented toward the fuel inlet port is defined as a second direction, a plane of the flat wall of the diaphragm extends at an angle greater than or equal to 0° and smaller than or equal to 30° to a plane, as defined to extend through the first and second directions. This causes vibrations arising from the combustion of the fuel in the engine to be reduced by 0 to 0.5 times in degree, thus resulting in a decrease in electrical nose added to the output of the fuel pressure sensor.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings.

DESCRIPTION OF THE PREFERRED EMBODIMENTS

Figure 1:
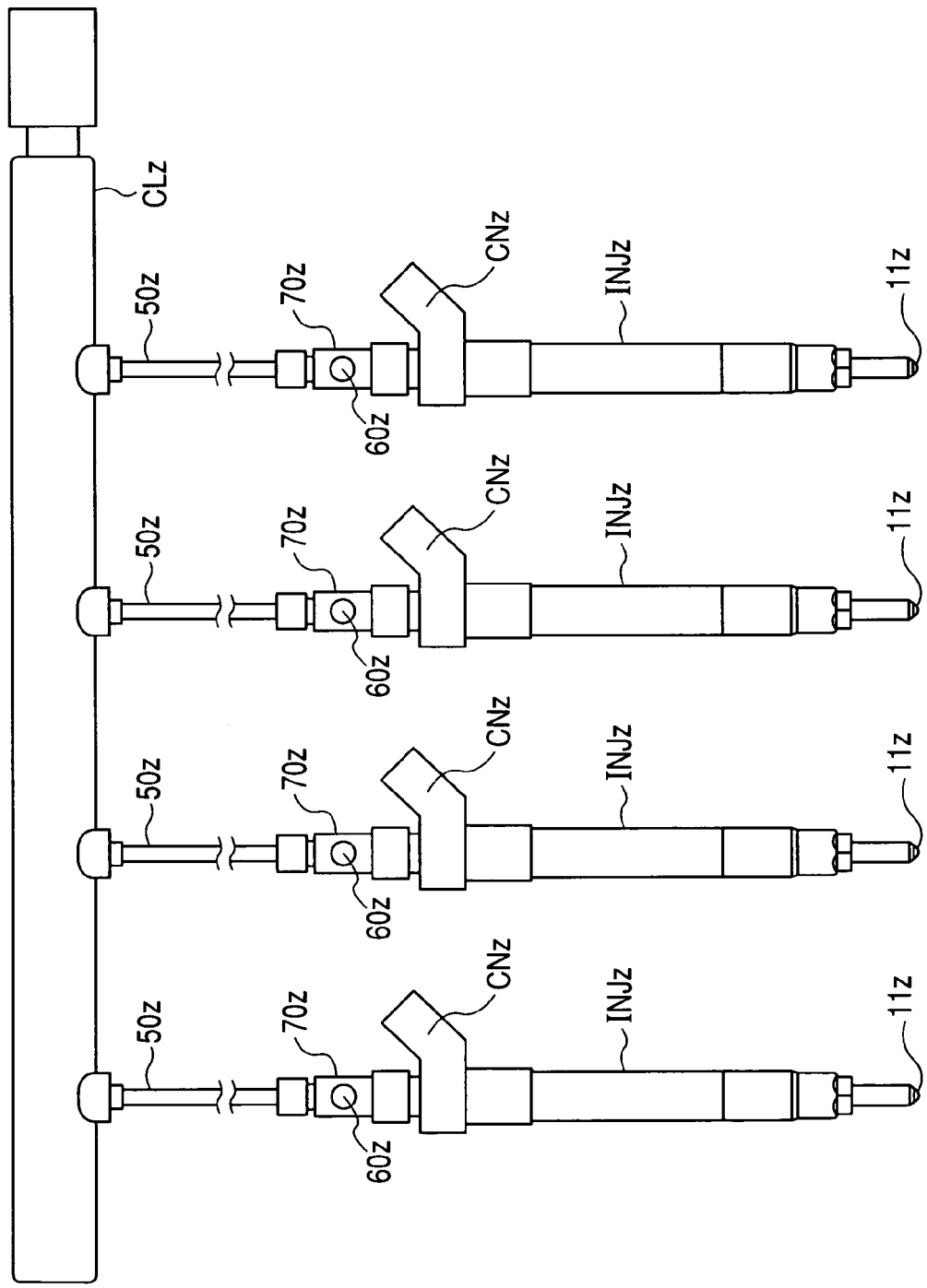
FIG. 1 is a schematic view which shows fuel injectors joined to a common rail through connectors according to the first embodiment of the invention.
Figure 2:
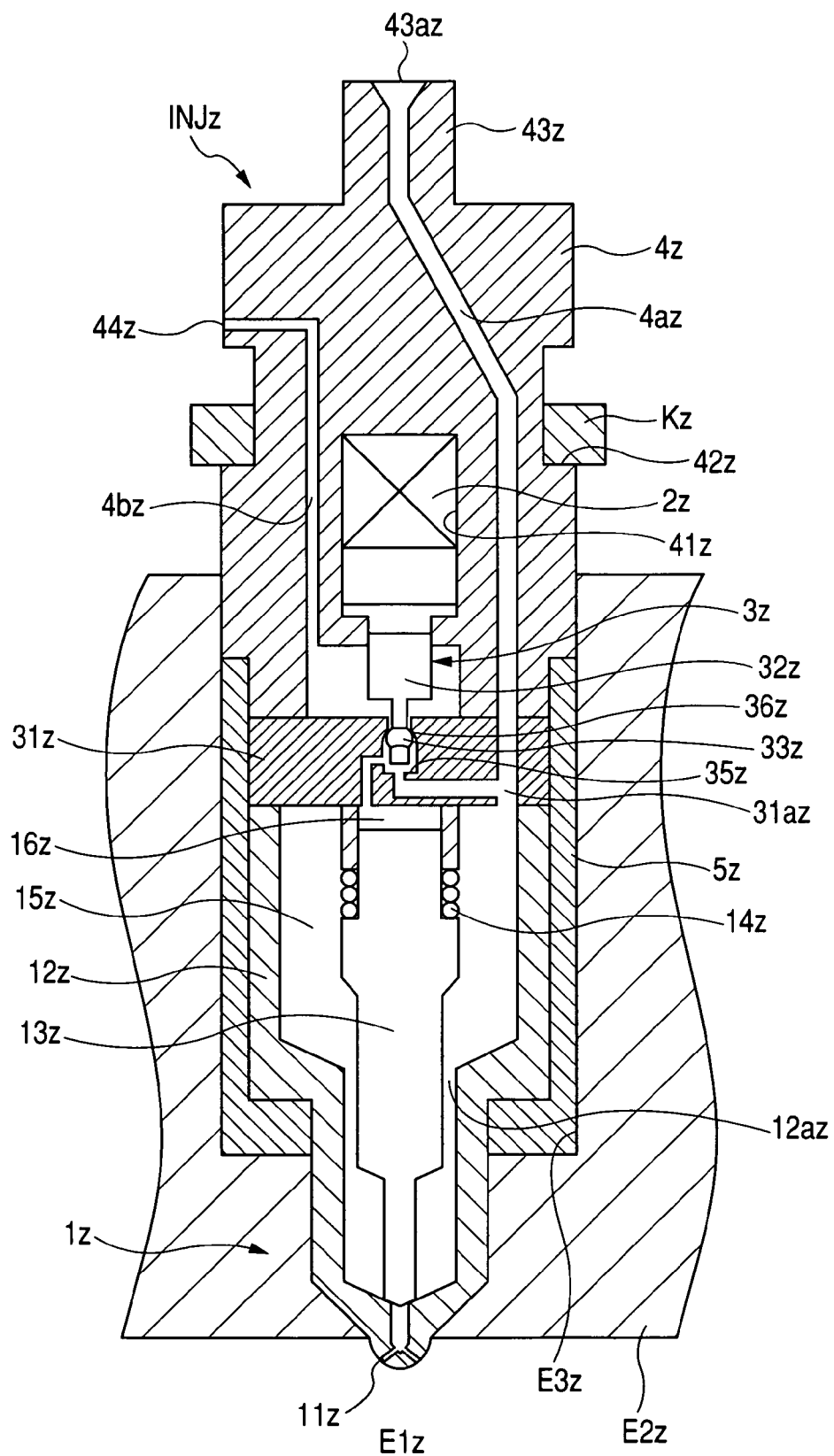
FIG. 2 is a longitudinal sectional view which shows an internal structure of each of the fuel injectors of FIG. 1.
Figure 3:
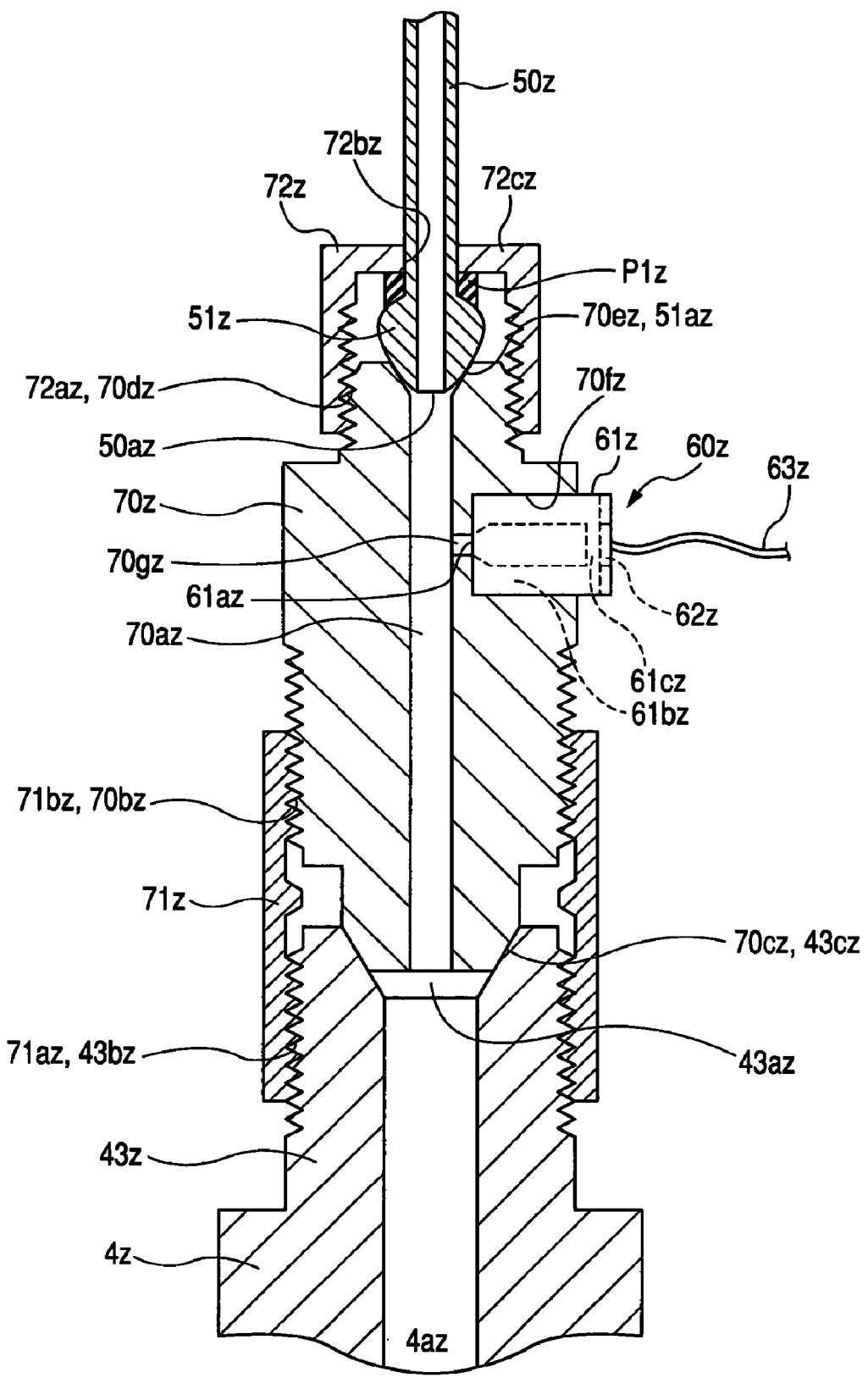
FIG. 3 is a longitudinal sectional view which shows a sensor-mount designed to mount a fuel pressure sensor on the fuel injector of FIG. 1.

Referring to the drawings, wherein like reference numbers refer to like parts in several views, particularly to FIGS. 1, 2, and 3, there is shown fuel injectors INJz according to the invention which are joined to a common rail CLz (i.e., a fuel accumulator), as usually used in an automotive fuel injection system. FIG. 2 is a longitudinal sectional view which shows an internal structure of each of the injectors INJz. FIG. 3 is a longitudinal sectional view which shows a sensor-mount designed to mount a fuel pressure sensor $60z$ on the fuel injector INJz.

Each of the injectors INJz, as illustrated in FIGS. 1 and 2, works to spray the fuel, as supplied from the common rail CLz, into a corresponding one of combustion chambers E1z of an internal combustion engine. The injectors INJz are installed in a cylinder head E2z of the engine.

The engine, as referred to herein, is an in-line four-cylinder four-stroke reciprocating diesel engine for four-wheel automobiles in which high-pressure light fuel is to be injected directly into the combustion chamber E1z at an atmospheric pressure of 1000 or more. The common rail CLz serves as a fuel accumulator which is supplied with the high-pressure fuel, as fed from a fuel tank through a fuel pump (not shown).

The injector INJz includes a nozzle 1z, a piezo actuator 2z, and a back pressure control mechanism 3z. The piezo actuator 2z is equipped with a piezoelectric device which expands or contracts when charged or discharged to open or close the nozzle 1z. The back pressure control mechanism 3z is driven by the piezo actuator 2z to control the back pressure acting on the nozzle 1z. Instead of the piezo actuator 2z, a solenoid coil may be employed to actuate the back pressure control mechanism 3z. Alternatively, in place of the back pressure control mechanism 3z, the injector INJz may be designed as a direct-acting fuel injector in which an actuator opens or closes the nozzle 1z directly.

The nozzle 1z is made up of a nozzle body 12z in which spray holes 11z are formed, a needle 13z, and a spring 14z. The needle 13z is to be moved into or out of abutment with a seat formed on an inner wall of the nozzle body 12z to close or open the spray holes 11z. The spring 14z works to urge the needle 13z to close the spray holes 11z at all the time.

The piezo actuator 2z is made of a stack of piezoelectric elements (which is usually called a piezo stack). The piezoelectric elements are capacitive loads which expand or contact through the piezoelectric effect. When charged, the piezo stack expands, while when discharged, the piezo stack contacts. Specifically, the piezo stack serves as an actuator to move the needle 13z. The piezo actuator 2z is supplied with electric power from conductors (not shown) joined to an electric connector CNz, as illustrated in FIG. 1.

The back pressure control mechanism 3z includes a valve body 31z which has formed therein an inner fluid path in which a head portion of a piston 32z and a ball valve 33z are disposed. The piston 32z is moved by the contraction or expansion of the piezo actuator 2z to lift up or down the ball valve 33z. The valve body 31z is illustrated as being made of a single member, but actually formed by a plurality of blocks.

The injector INJz also includes a cylindrical injector body 4z which has formed therein a cylindrical inner chamber 41z extending substantially in an axial or longitudinal direction of the injector INJz (i.e., a vertical direction, as viewed in FIG. 2). The inner chamber 41z has a lower end, as viewed in the drawing, defined by an inner annular shoulder (or flange) of the injector body 4z. The piezo actuator 2z and the back pressure control mechanism 3z are disposed in the inner chamber 41z. A hollow cylindrical retainer 5z is threadably fitted to the injector body 4z to secure the nozzle 1z to the end of the injector body 4z.

The injector body 4z, the valve body 31z, and the nozzle body 12z have folded therein high-pressure fuel paths 4az, 31az, and 12az which define a fuel flow path into which the fuel is delivered at a high pressure from the common rail CLz at all times. The injector body 4z and the valve body 31z have formed therein a low-pressure fuel path 4bz leading to the fuel tank (not shown).

The nozzle body 12z, the injector body 4z, and the valve body 31z are each made of metal and installed in a mount hole E3z formed in a cylinder head E2z of the engine. The injector body 4z has an outer shoulder 42z with which an end of a clamp Kz is to engage for securing the fuel injector INJz in the mount hole E3z tightly. Specifically, installation of the fuel injector INJz in the mount hole E3 is achieved by fastening the other end of the clamp Kz to the cylinder head E2z through a bolt to press the outer shoulder 42z into the mount hole E3z.

The nozzle body 12z has formed therein a high-pressure chamber 15z that constitutes the part of the fuel supply path defined by the high-pressure fuel paths 4az, 31az, and 12az. Specifically, the high-pressure chamber 15z is defined by an inner peripheral wall of the nozzle body 12z and an outer peripheral wall of the needle 13z. When the needle 13z is moved in a valve-opening direction, it establishes a fluid communication between the nozzle chamber 15z and the spray holes 11z. The nozzle chamber 15z is supplied with the high-pressure fuel at all the time through the high-pressure fuel path 31az. A back-pressure chamber 16z is formed by one of ends of the needle 13z which is opposite the spray holes 11z. The spring 14z is disposed within the back-pressure chamber 16z to urge the needle 13z in a valve-closing direction.

The valve body 31z has formed therein a high-pressure seat 35z exposed to a fluid path extending between the high-pressure fuel path 31az and the back-pressure chamber 16z. The valve body 31z has also formed therein a low-pressure seat 36z exposed to a path extending between the low-pressure fuel path 4bz and the back-pressure chamber 16z in the nozzle 1z. The low-pressure seat 36z faces the high-pressure seat 35z to define a valve chamber within which the ball valve 33z is disposed.

The injector body 4z has a high-pressure port 43z in which a fuel inlet 43az is formed and to which a high-pressure pipe 50z is to be joined, as illustrated in FIGS. 1 and 3, through a connector 70z. The injector body 4z also has a low-pressure port 44z to which a low-pressure pipe (i.e., a drain pipe) is to be connected. The high-pressure port 43z is, as illustrated in FIG. 2, located farther away from the spray holes 11 than the clamp Kz, but may be located closer to the spray holes 11 than the clamp Kz. The high-pressure port 43z extends from the axial end of the injector body 4, but may be formed on a side wall of the injector body 4z.

In operation, the fuel, as stored in the common rail CLz at a high pressure, is delivered from outlets of the common rail CLz and supplied to the high-pressure ports 43z of the fuel injectors INJz through the high-pressure fuel pipes 50z and the connectors 70z. The fuel then passes through the high-pressure fuel paths 4az and 31az and enters the high-pressure chamber 15z and the back pressure chamber 16z. When the piezoelectric actuator 2z is in a contracted state, the valve 33z is, as illustrated in FIG. 2, urged into abutment with the low-pressure seat 36z to establish the fluid communication between the back-pressure chamber 16z and the high-pressure fuel path 31az, so that the high-pressure fuel is supplied to the back-pressure chamber 16z. The pressure of the fuel in the back-pressure chamber 16z and the elastic pressure, as produced by the spring 14z, act on the needle 13z to urge it in the valve-closing direction to close the spray holes 11z.

Alternatively, when the piezoelectric actuator 2z is charged so that it expands, the valve 33z is pushed into abutment with the high-pressure seat 35z to establish the fluid communication between the back-pressure chamber 16z and the low-pressure fuel path 4bz, so that the pressure in the back-pressure chamber 16z drops, thereby causing the needle 13z to be urged by the pressure of fuel in the high-pressure chamber 15z in the valve-opening direction to open the spray holes 11z to spray the fuel into the combustion chamber E1z of the engine.

The spraying of the fuel from the spray holes 11z of each of the fuel injectors INJz will result in a variation in pressure of the fuel in the injector INJz. The fuel pressure sensors 60z working to monitor such a fuel variation are installed, one for each injector INJz, in the connectors 70z. The time when the fuel has started to be sprayed actually from the injector INJz may be found by sampling the time when the pressure of fuel has started to drop from the waveform of an output from the fuel pressure sensor 60z. The time when the fuel has stopped from being sprayed actually from the injector INJz may be found by sampling the time when the pressure of fuel has started to rise from the waveform of the output from the fuel pressure sensor 60z. The quantity of fuel having been sprayed from the injector INJz may be found by sampling the amount by which the fuel has dropped from the waveform of the output of the fuel pressure sensor 60z. In other words, each of the fuel pressure sensors 60z works to detect a change in injection rate arising from the spraying of fuel from a corresponding one of the fuel injectors INJz.

Next, the fuel pressure sensors 60z and the connectors 70z will be described below with reference to FIG. 3.

The connector 70z is made of metal and to be installed between the high-pressure port 43z of each of the fuel injectors INJz and a corresponding one of the high-pressure pipes 50z. The connector 70z is of a hollow cylindrical shape and has a length extending in a longitudinal or axial direction of the fuel injector INJz. The connector 70z has formed therein a communication path 70az which communicates between the fuel inlet 43az of the high-pressure port 43z and the fuel outlet 50az of the high-pressure pipe 50z.

A downstream end portion of the connector 70z and the high-pressure port 43z are joined detachably by a metal nut 71z. Specifically, the metal nut 71z is made of a hollow cylinder and has an injector-side inner thread 71az and a connector-side inner thread 71bz which are formed in an inner wall in alignment. The injector-side inner thread 71az engages an outer thread 43bz of the high-pressure port 43z. The connector-side inner thread 71bz engages an outer thread 70bz of the connector 70z.

The connector-side inner thread 71bz is, as described below, shaped as an inverse helical thread. Specifically, the injector-side inner thread 71az is a standard helical thread so that when the metal nut 71z is turned clockwise, as viewed from the metal nut 71z (i.e., an upper side of FIG. 3) to the high-pressure port 43z, the injector-side inner thread 71az and the outer thread 43bz are fastened together, while the connector-side inner thread 71bz is an inverse helical thread so that when the metal nut 71z is turned counterclockwise, as viewed from the metal nut 71z (i.e., a lower side of FIG. 3) to the connector 70z, the connector-side inner thread 71bz and the outer thread 70bz are fastened together. Therefore, when the metal nut 71z is turned in a condition where the fuel injector INJz and the connector 70z are held from being rotated, it will cause the injector-side inner thread 71az and the connector-side inner thread 71bz to be fastened together to make a firm joint between the fuel injector INJz and the connector 70z.

The fastening of the injector-side inner thread 71az and the connector-side inner thread 71bz urges a sealing surface 70cz of the connector 70z and a sealing surface 43cz of the high-pressure port 43z into contact abutment with each other to create metal-to-metal tough sealing between the connector 70z and the high-pressure port 43z to avoid the leakage of the high-pressure fuel from the communication path 70az.

An upstream end portion of the connector 70z and the high-pressure pipe 50z are joined detachably by a metal pipe nut 72z. Specifically, the metal pipe nut 72z has an inner thread 72az formed in an inner peripheral wall thereof and a press plate 72cz defined by the bottom thereof. The inner thread 72az engages an outer thread 70dz of the connector 70z. The press plate 72cz has formed therein a center hole 72bz through which the high-pressure pipe 50z passes. A top end portion 51z of the high-pressure pipe 50z in which the fuel outlet 50az is formed is disposed inside the pipe nut 72z. The top end portion 51z, as can be seen from FIG. 3 bulges radially of the high-pressure pipe 50z so as to have the greatest thickness and is retained firmly between the press plate 72cz and the connector 70z through a gasket P1z.

The joining of the high-pressure pipe 50z to the connector 70z is achieved by holding the connector 70z from being rotated and turning the pipe nut 72z to fasten the threads 72az and 70dz to urge a sealing surface 70ez of the connector 70z and a sealing surface 51az of the top end portion 51z into contact abutment with each other, thereby creating metal-to-metal touch sealing therebetween to avoid the leakage of the high-pressure fuel from the communication path 70az.

The connector 70z has formed in the outer peripheral wall thereof a mount hole 70fz in which the fuel pressure sensor 60z is disposed. The connector 70z has also formed therein a branch path 70gz which diverges from the communication path 70az radially of the connector 70z. The fuel pressure sensor 60z is fit in the mount hole 70fz of the connector 70z through metal-to-metal tough sealing.

The fuel pressure sensor 60z is equipped with a stem 61z working as a pressure deformable member which is sensitive to the pressure of fuel in the branch path 70gz to deform elastically and a strain gauge 62z working as a sensing device to convert the elastic deformation or distortion of the stem 61z into an electric signal. The stem 61z is made of a metallic material which has the mechanical strength great enough to withstand the high-pressure of the fuel in the branch path 70gz and a coefficient of thermal expansion low enough to keep adverse effects on the operation of the strain gauge 62z within an allowable range. For example, the stem 61z is made of material lower in coefficient of thermal expansion than the connector 70z to minimize the distortion of the stem 61z itself arising from thermal expansion or contraction thereof. This permits a total production cost of the connectors 70z and the fuel pressure sensors 60z to be decreased as compared with when the whole of the connectors 70z is made of material having a lower coefficient of thermal expansion.

The stem 61z includes a hollow cylindrical body 61bz and a circular plate-made diaphragm 61cz. The cylindrical body 61bz has formed in an end thereof a fuel inlet 61az into which the fuel is introduced from the branch path 70gz. The diaphragm 61cz closes the other end of the cylindrical body 61bz. The pressure of the fuel entering the cylindrical body 61bz at the fuel inlet 61az is exerted on the diaphragm 61cz and an inner wall of the cylindrical body 61bz, so that the stem 61z is deformed elastically as a whole.

The cylindrical body 61bz and the diaphragm 61cz are axial-symmetrical with respect to a longitudinal center line (i.e., an axis) of the mount hole 70fz which extends laterally, as viewed in FIG. 3, so that the diaphragm 61cz will deform axisymmetrically when subjected to the pressure of the fuel. This causes the diaphragm 61cz to be deformed proportional to the degree of pressure of the fuel accurately. The strain gauge 62z senses the degree of deformation of the diaphragm 61cz and produced an electrical signal as a function of the pressure of the fuel exerted on the diaphragm 61cz.

The strain gauge 62z is affixed to a mount surface of the diaphragm 61cz (i.e., one of major surfaces of the diaphragm 61cz which is far away from the fuel inlet 61az) through an insulating film (not shown). When the pressure of the fuel enters the cylindrical body 61bz, so that the stem 61z elastically expands, the diaphragm 61cz will deform. This causes the strain gauge 62z to produce an electrical output as a function of the amount of deformation of the diaphragm 61cz.

A sequence of steps of joining the fuel injectors INJz, the connectors 70z, and the high-pressure fuel pipes 50z to the cylinder head E2 will be described below briefly.

First, the fuel injector INJz is inserted into the mount hole E3z of the cylinder head E2z. The bolt is fastened to secure the clamp Kz to the cylinder head E2z to fix the fuel injector INJz in the cylinder head E2z firmly. The fuel injector INJz is, thus, held from being rotated.

Next, the pipe nut 72z with the high-pressure pipe 50z inserted into the center hole 72bz is fastened to the connector 70z with the fuel pressure sensor 60z fit in the mount hole 70fz to join the connector 70z and the high-pressure pipe 50z together.

The connector 70z in which the fuel pressure sensor 60z is installed and to which the high-pressure pipe 50z is joined is connected to the high-pressure port 43z of the fuel injector INJz through the metal nut 71z. Specifically, the fuel pressure sensor 60z in the connector 70z is first oriented at a selected angular position relative to the fuel injector INJz. Next, the connector 70z is held by an operator's hand from rotating, Finally, the metal nut 71z is turned to make a firm joint between the high-pressure port 43z and the connector 70z.

After all the injectors INJz are installed in the cylinder head E2z in the above manner, the high-pressure fuel pipes 50z are joined to the common rail CLz. The fuel injector INJz may alternatively be joined to the connector 70z, after which the high-pressure pipe 50z may be joined to the connector 70z.

The above described first embodiment offers the following beneficial effect.

1) The connector 70z is disposed between the high-pressure port 43z of the injector INJz and the high-pressure pipe 50z. The fuel pressure sensor 60z is installed in the connector 70z to measure the pressure of fuel supplied to the fuel injector INJz. This enables a change in pressure of the fuel arising from the spraying of the fuel from the fuel injector INJz to be monitored without installation of the fuel pressure sensor 60z within the fuel injector INJz. The connector 70z in which the fuel pressure sensor 60z is installed occupies the part of space between the fuel injectors INJz and the common rail CLz, thus eliminating the need for an increase in radial size of the fuel injectors INJz caused by the installation of the fuel pressure sensors 60z in the fuel injectors INJz and also facilitating the ease of installation of the fuel injectors INJz in the cylinder head E2z.

2) The connector 70z is designed to be separate from the injector body 4z and coupled with the fuel injector INJz detachably, thus permitting the fuel injectors INJz to be installed in the cylinder head E2z independently from the connector 70z. This improves the workability to install the fuel injectors INJz to the engine.

3) The connector 70z is designed to be separate from the injector body 4z and coupled with the fuel injector INJz detachably, thus permitting typical fuel injectors to be employed as the fuel injectors INJz, in other words, eliminating the need for designing the fuel injectors INJz specially.

4) The injector-side inner thread 71az of the connector 70z is shaped as a standard helical thread, while the connector-side inner thread 71bz is shaped as an inverse helical thread. The joining of the fuel injector INJz and the connector 70z is, therefore, achieved by holding the fuel injector INJz and the connector 70z held from rotating and then turning the metal nut 71z to fasten the injector-side inner thread 71az and the connector-side inner thread 71bz. This facilitates the ease of installation of the connector 70z on the fuel injector INJz. The metal nut 71z may be turned without having to turn the connector 70z, thereby permitting conductive wires 63z (see FIG. 3) of the fuel pressure sensor 60z to be laid out in a desired position around the metal nut 71z, which improves the workability of layout designing of the conductive wires 63z.

Figure 4:
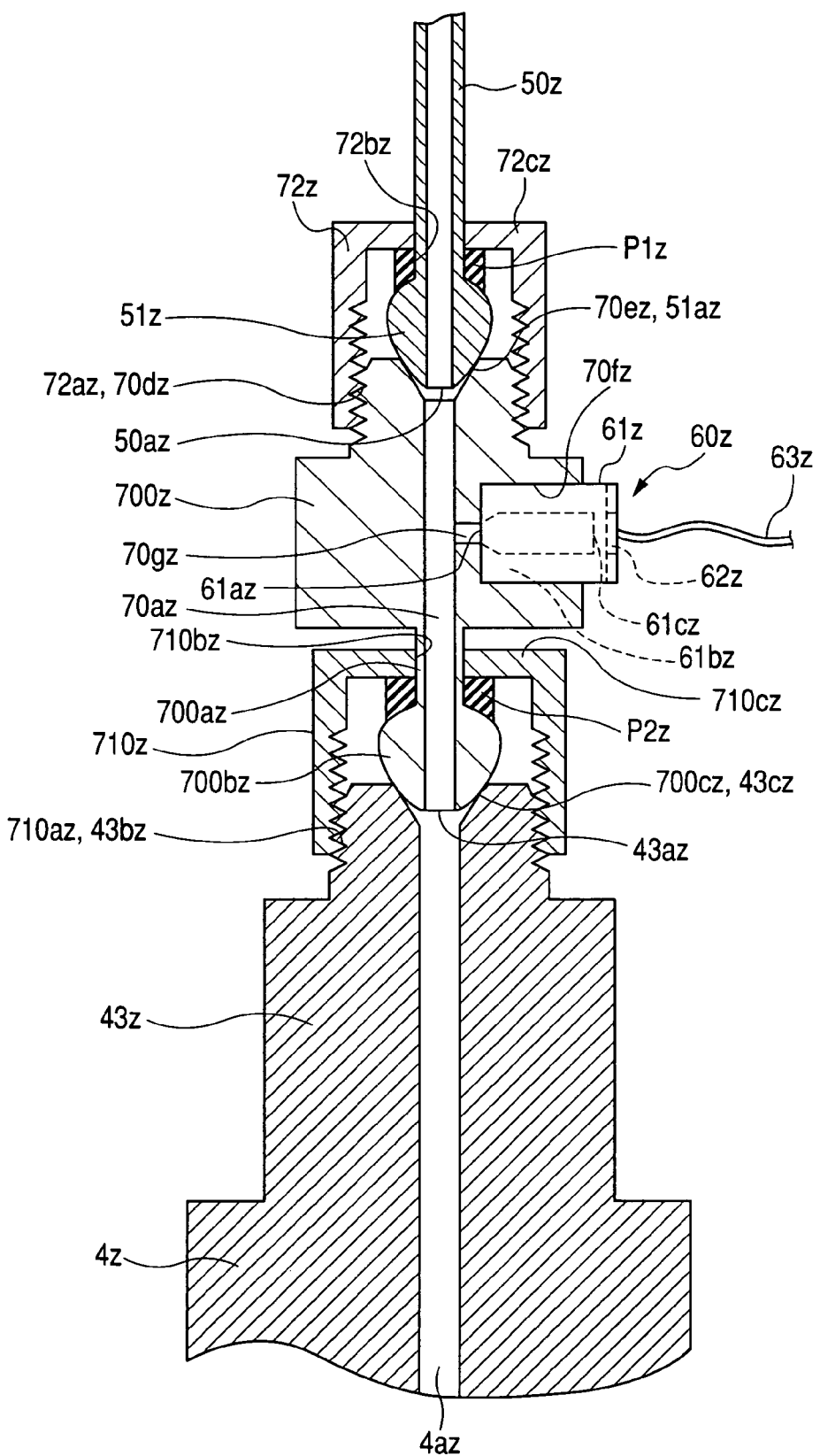
FIG. 4 is a longitudinal sectional view which shows a sensor-mount designed to mount a fuel pressure sensor on a fuel injector according to the second embodiment of the invention.

The second embodiment of the invention will be described below with reference to FIG. 4. The same reference numbers, as employed in the first embodiment, will refer to the same parts, and explanation thereof in detail will be omitted here.

In the first embodiment, the joining of the high-pressure pipe 50z to the high-pressure port 43z is accomplished by fastening the connector 70z into the metal nut 71z. In the second embodiment, such a joining is achieved by fastening a connecting nut 710z to the high-pressure port 43z to join the high-pressure pipe 50z to the high-pressure port 43z through the connector 700z.

Specifically, the connecting nut 710z is made of a hollow cylinder and has formed therein an inner thread 710az which engages the outer thread 43bz of the high-pressure port 43z of the fuel injector INJz. The connecting nut 710z also has a press plate 710cz that is the bottom thereof. The press plate 710cz has formed therein a center hole 710bz through which a neck 700az of the connector 700z is inserted. The connector 700z has a top end 700bz in which a fuel outlet is formed and which is disposed inside the connecting nut 710z. The top end 700bz extends from the neck 700az and bulges radially of the connector 700z so as to have the greatest thickness. The top end 700bz is retained firmly between the press plate 710cz and the high-pressure port 43z through a gasket P2z.

The joining of the connector 700z to the fuel injector INJz is achieved by turning the connecting nut 710z to fasten the inner thread 710az to the outer thread 43bz of the high-pressure port 43z to establish metal-to-metal touch sealing between the connector 700z (i.e., the top end 700bz) and the high-pressure port 43z of the fuel injector INJz, thereby avoiding the leakage of the high-pressure fuel from the communication path 70az.

The third embodiment of the invention will be described below with reference to FIG. 5. The same reference numbers, as employed in the first embodiment, will refer to the same parts, and explanation thereof in detail will be omitted here.

In the first embodiment, the connector 70z is secured threadably to the high-pressure port 43z of the fuel injector INJz and the high-pressure pipe 50z. In the third embodiment, a connector 701z which has no inner thread is disposed between the top end 51z of the high-pressure pipe 50z and the high-pressure port 43z.

Specifically, the top end 51z of the high-pressure pipe 50z and the connector 701z are disposed inside the pipe nut 720z. The high-pressure port 43z has formed on the end thereof a hollow cylindrical extension 431z defining a housing in which the connector 701z is disposed. The inner thread 720az of the pipe nut 720z is fastened to an external or outer thread 431az formed on the peripheral wall of the housing 431z to join the pipe nut 720z to the high-pressure port 43z firmly, thereby nipping the connector 701z between the top end 51z of the high-pressure pipe 50z and the high-pressure port 43z.

The pipe nut 720z may alternatively be designed to have an external thread instead of the internal thread 720az, while the high-pressure port 43z may be designed to have an internal thread instead of the external thread 431az to make a firm joint between is the high-pressure pipe 50z and the fuel injector INJz.

The firm engagement between the threads 720az and 431az urges the sealing surface 70ez of the connector 701z and the sealing surface 51az of the top end 51z of the high-pressure pipe 50z into pressed abutment with each other and also simultaneously urges the sealing surface 70cz of the connector 701z and the sealing surface 43cz of the high-pressure port 43z into pressed abutment with each other, thereby establishing metal-to-metal touch sealing between the connector 701z and the high-pressure pipe 50z and between the connector 701z and the high-pressure port 43z to avoid the leakage of the high-pressure fuel from the communication path 70az.

The fuel pressure sensor 60z of the first embodiment is, as described above, made up of the stem 61z and the strain gauge 62z, but, in this embodiment, it consists only of the strain gauge 620z affixed directly to the connector 701z to measure the degree of elastic deformation of the connector 701z as a function of the pressure of fuel flowing through the communication path 70az.

The connector 701z has a hollow cylindrical small-diameter thin-walled portion 701az which has a thickness small enough to deform elastically as a function of a change in pressure of fuel flowing through the connector 701z. The strain gauge 620z is attached to the thin-walled portion 70az. The thin-walled portion 701z extends from the top end of a major body of the connector 701z in alignment and has a conical end surface serving as the sealing surface 70cz.

The housing 431z of the high-pressure port 43z has formed therein a conductor outlet hole 431bz through which a conductive wire 63z extends from the strain gauge 620z to outside the high-pressure port 43z. The conductor outlet hole 431bz is formed in a portion of the housing 431z other than the external thread 431az, thus facilitating the withdrawing of the conductive wire 63z outside the high-pressure port 43z and the pipe nut 720z.

The joining between the high-pressure port 43z and the connector 701z and between the high-pressure pipe 50z and the connector 701z is, as described above, achieved only by fastening the pipe nut 720z to the high-pressure port 43z, thus resulting in a decrease in step of assembling the high-pressure pipe 50z, the connector 701z, and the fuel injector INJz as compared with the first and second embodiments.

The connector 701z is retained between the top end 51z of the high-pressure pipe 50z and the high-pressure port 43z of the fuel injector INJz thus eliminating the need for a thread(s) on the connector 701z. This structure also eliminates the problem, as encountered in the first embodiment, that when the high-pressure pipe 50z is removed from the connector 70z for maintenance or repair thereof, the connector 70z may rotate following rotation of the high-pressure pipe 50z.

The connector 701z is, as described above, designed to have the thin-walled portion 701az through which the communication path 70az passes and to which the strain gauge 620z is affixed to measure the degree of elastic deformation of the thin-walled portion 701az as a function of a change in pressure of fuel following through the communication path 70az. This eliminates the need for the stem 61z and permits the fuel pressure sensor 60z to be reduced in size. The stem 61z of the above embodiments requires a hermetical seal between itself and the connector 701z, but the structure of this embodiment eliminates the need thereof, thus resulting in a simplified structure of the connector 701z.

The fourth embodiment of the invention will be described below with reference to FIG. 6 which is a modification of the third embodiment of FIG. 5. The same reference numbers, as employed in the third embodiment, will refer to the same parts, and explanation thereof in detail will be omitted here.

The pipe nut 720z has the center hole 72bz greater in diameter than that in the third embodiment to define a conductive outlet through which the conductive wire 63z of the fuel pressure sensor 60z (i.e., the strain gauge 620z) extends outside the pipe nut 720z through the gasket P1z. The pipe nut 720z may alternatively be designed to have formed in a side wall thereof a conductive outlet hole through which the conductive wire 63z passes.

The fifth embodiment of the invention will be described below with reference to FIG. 7 which is a modification of the first embodiment. The same reference numbers, as employed in the first embodiment, will refer to the same parts, and explanation thereof in detail will be omitted here.

In order to avoid the rotation of the connector 701z following the rotation of the high-pressure pipe 50z when the high-pressure pipe 50z is removed from the connector 701z, the third embodiment is designed to have the connector 701z retained between the high-pressure pipe 50z and the high-pressure port 43z of the fuel injector INJz without the formation of a thread on the connector 701z. The fifth embodiment is designed to have the high-pressure port 43z with an internal thread 430bz. Specifically, the high-pressure port 43z has a hollow cylindrical head 433 in which the internal thread 430bz is formed which engages the external thread 70bz of the connector 702z. The threads 430bz and 70bz are at least partially welded, as denoted by Wz, together by spot-welding techniques. A hatched portion in FIG. 7 represents a weld between the connector 702z and the high-pressure port 43z.

The weld Wz holds the connector 701z from rotating relative to the high-pressure port 43z, thus avoiding the rotation of the connector 702z following the rotation of the high-pressure pipe 50z when the high-pressure pipe 50z is removed from the connector 702z.

The sixth embodiment of the invention will be described below with reference to FIG. 8 which is a modification of the fifth embodiment of FIG. 7. The same reference numbers, as employed in the seventh embodiment, will refer to the same parts, and explanation thereof in detail will be omitted here.

The connector 703z is, as clearly illustrated in the drawing, designed like an elbow pipe. The communication path 70az is, therefore, bent at right angles to an L-shape. The direction J2z (i.e., an axis of an upstream portion of the communication path 70az) in which the high-pressure pipe 50z (i.e., the pipe nut 72z in FIG. 3) is fastened to the external thread 70dz is oriented perpendicular (e.g., right angles) to the direction J1z (i.e., an axis of a downstream portion of the communication path 70az or the fuel injector INJz) in which the connector 703z is fastened to the high-pressure port 43az of the fuel injector INJz. This avoids the rotation of the connector 703z following the rotation of the high-pressure pipe 50z when the high-pressure pipe 50z is removed from the connector 703z.

Figure 7:
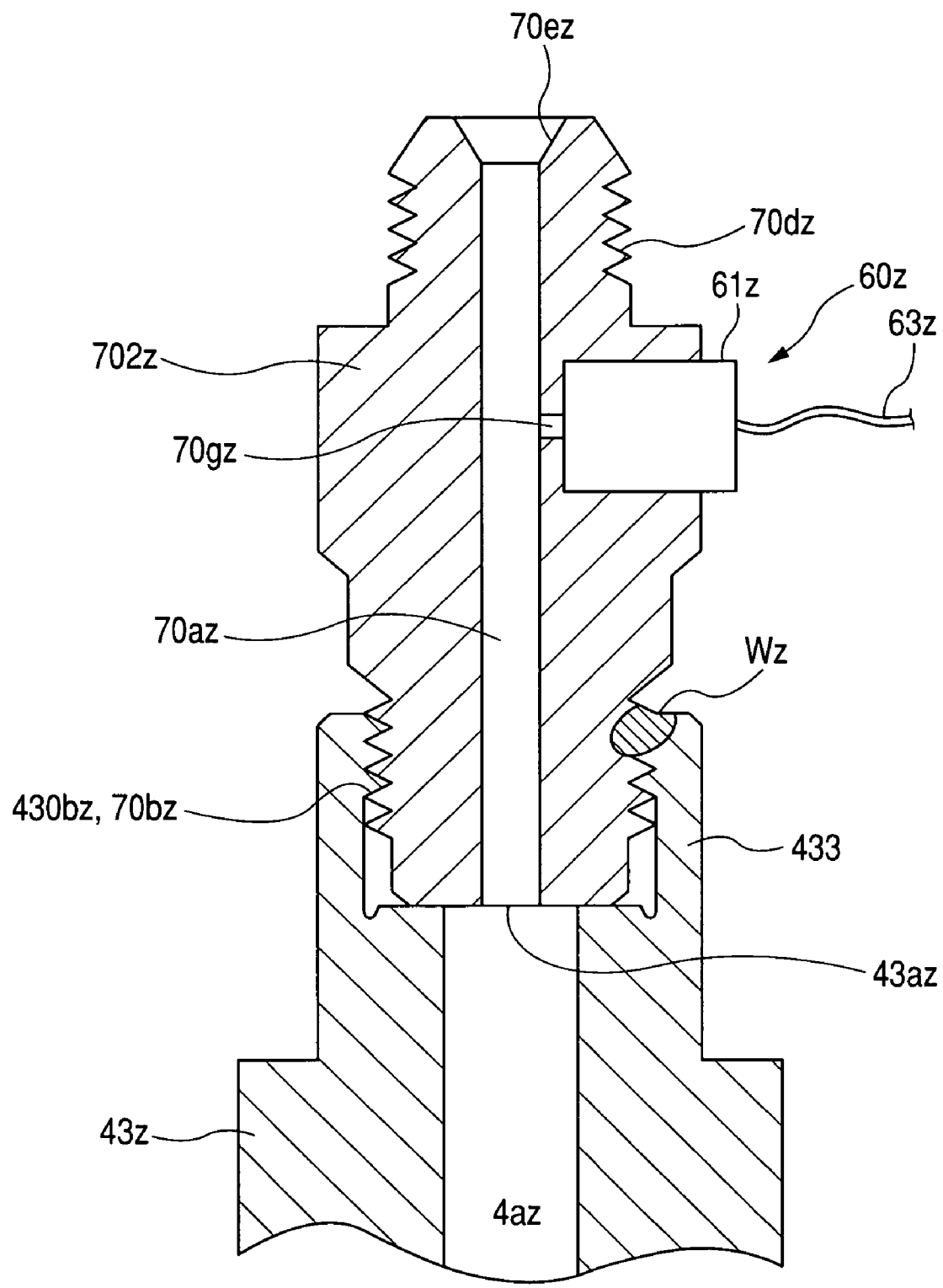
FIG. 7 is a longitudinal sectional view which shows a sensor-mount designed to mount a fuel pressure sensor on a fuel injector according to the fifth embodiment of the invention.
Figure 8:
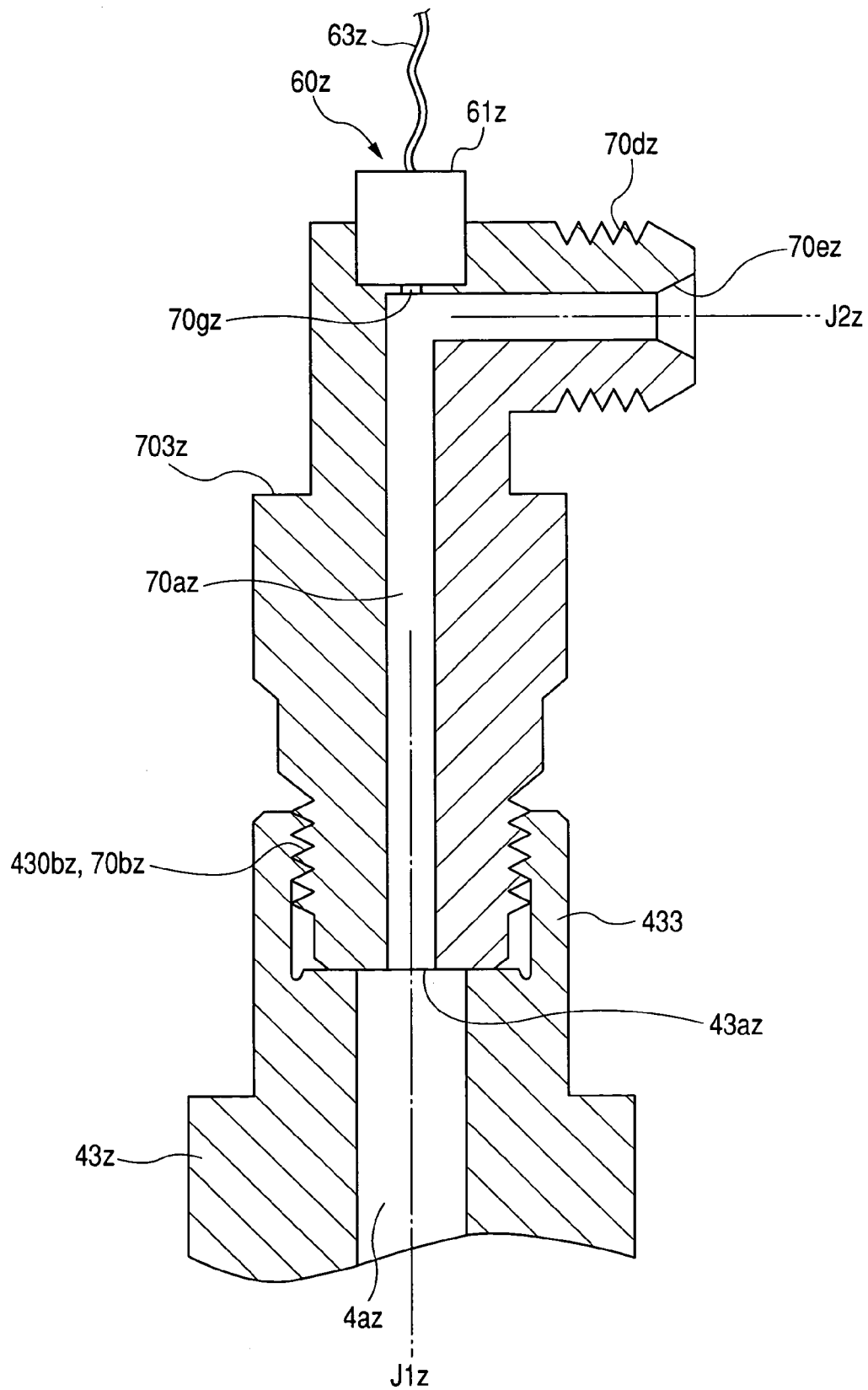
FIG. 8 is a longitudinal sectional view which shows a sensor-mount designed to mount a fuel pressure sensor on a fuel injector according to the sixth embodiment of the invention.

The elbow structure of the connector 703z also permits the space occupied by the high-pressure pipe 50z in the axial direction J1z of the fuel injector INJz to be decreased as compared with when the 90° bent high-pressure pipe 50z is joined to the connector 702z of FIG. 7.

Figure 9:
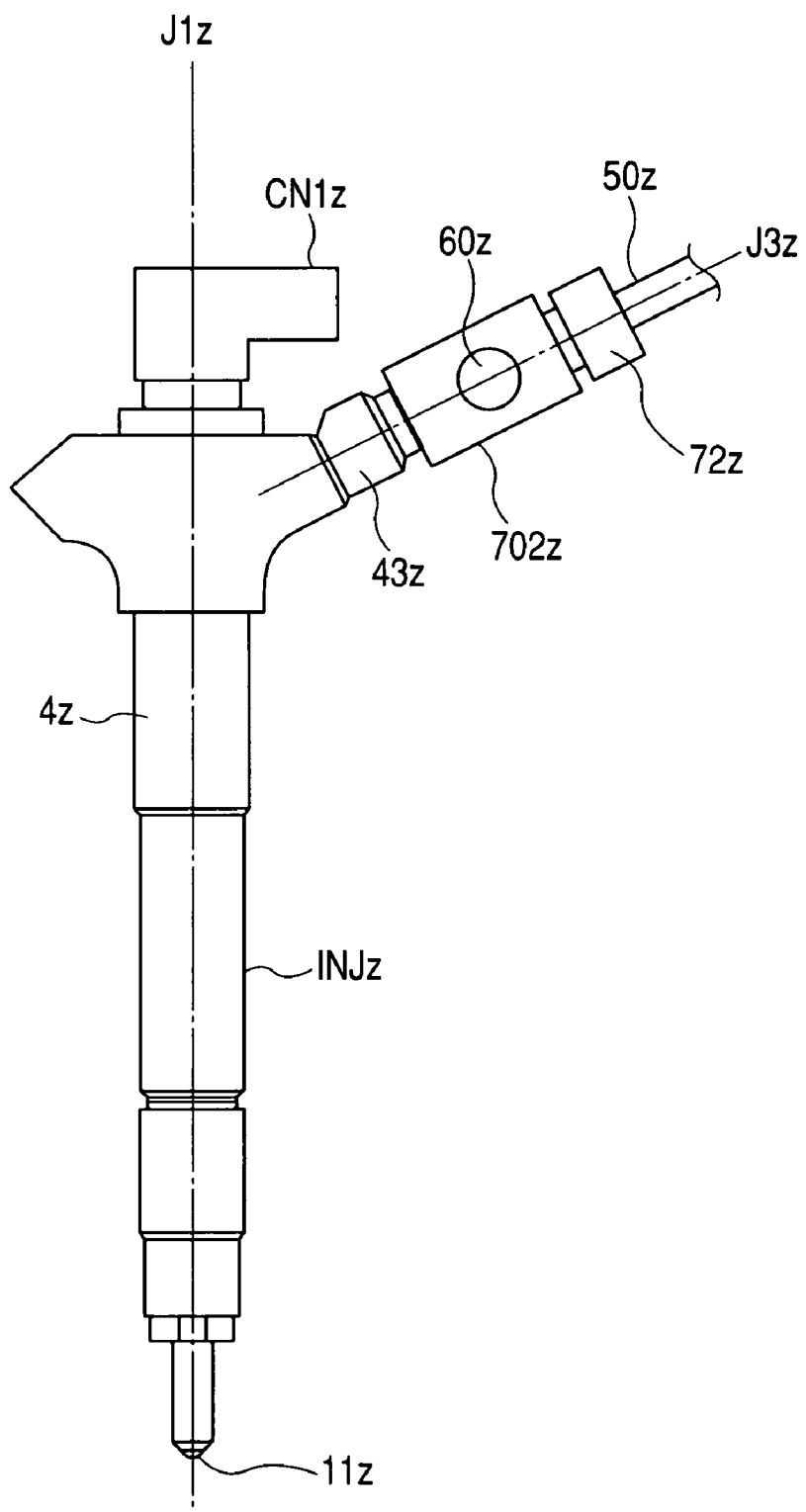
FIG. 9 is a side view which shows a fuel injector equipped with a sensor mount designed to mount a fuel pressure sensor on the fuel injector according to the seventh embodiment of the invention.

The seventh embodiment of the invention will be described below with reference to FIG. 9. The same reference numbers, as employed in the above embodiments, will refer to the same parts, and explanation thereof in detail will be omitted here.

The fuel injectors INJz of the above embodiments are designed to have the high-pressure port 43z extending in the axial direction J1z thereof, but, the high-pressure port 43z of this embodiment is designed to have an axial direction J3z extending diagonally to the axial direction J1z of the fuel injector INJz. The electric connector CNz is, unlike the first embodiment, disposed on the end of the injector body 4z along the axial direction J1z (i.e., the longitudinal center line) of the injector body 4z.

Figure 10:
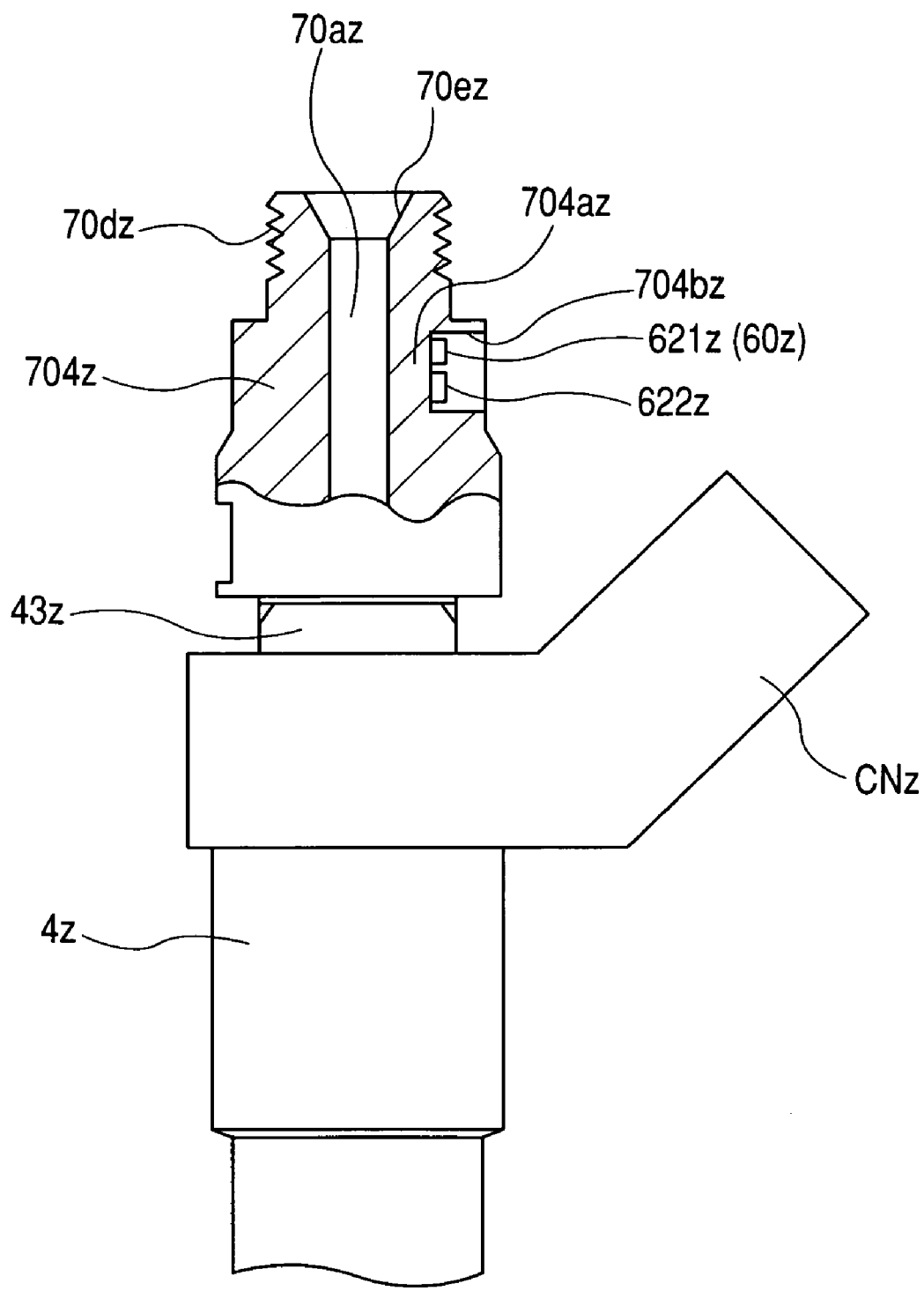
FIG. 10 is a partially sectional view which shows a sensor-mount designed to mount a fuel pressure sensor on a fuel injector according to the eighth embodiment of the invention.

The eighth embodiment of the invention will be described below with reference to FIG. 10. The same reference numbers, as employed in the above embodiments, will refer to the same parts, and explanation thereof in detail will be omitted here.

Figure 5:
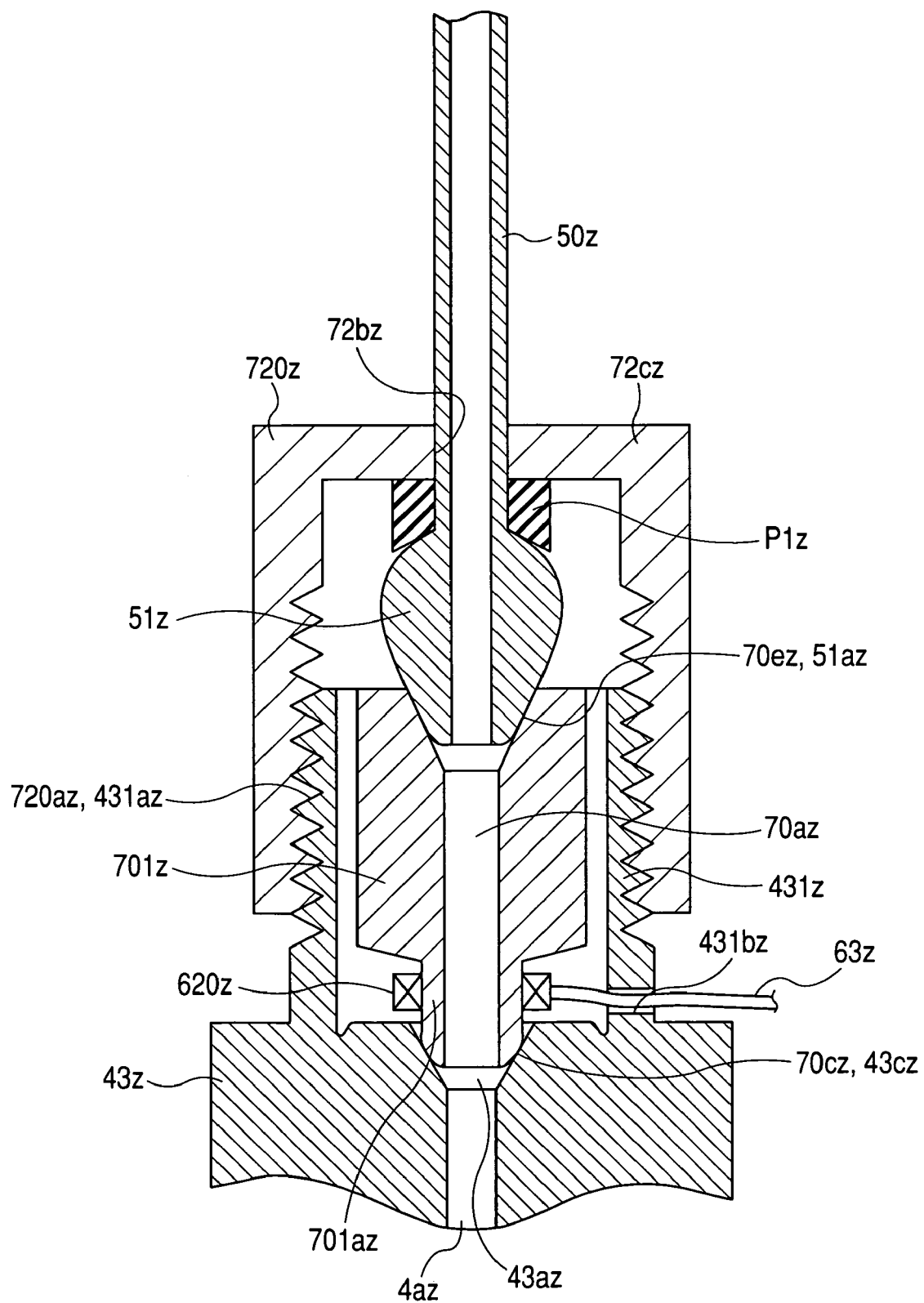
FIG. 5 is a longitudinal sectional view which shows a sensor-mount designed to mount a fuel pressure sensor on a fuel injector according to the third embodiment of the invention.
Figure 6:
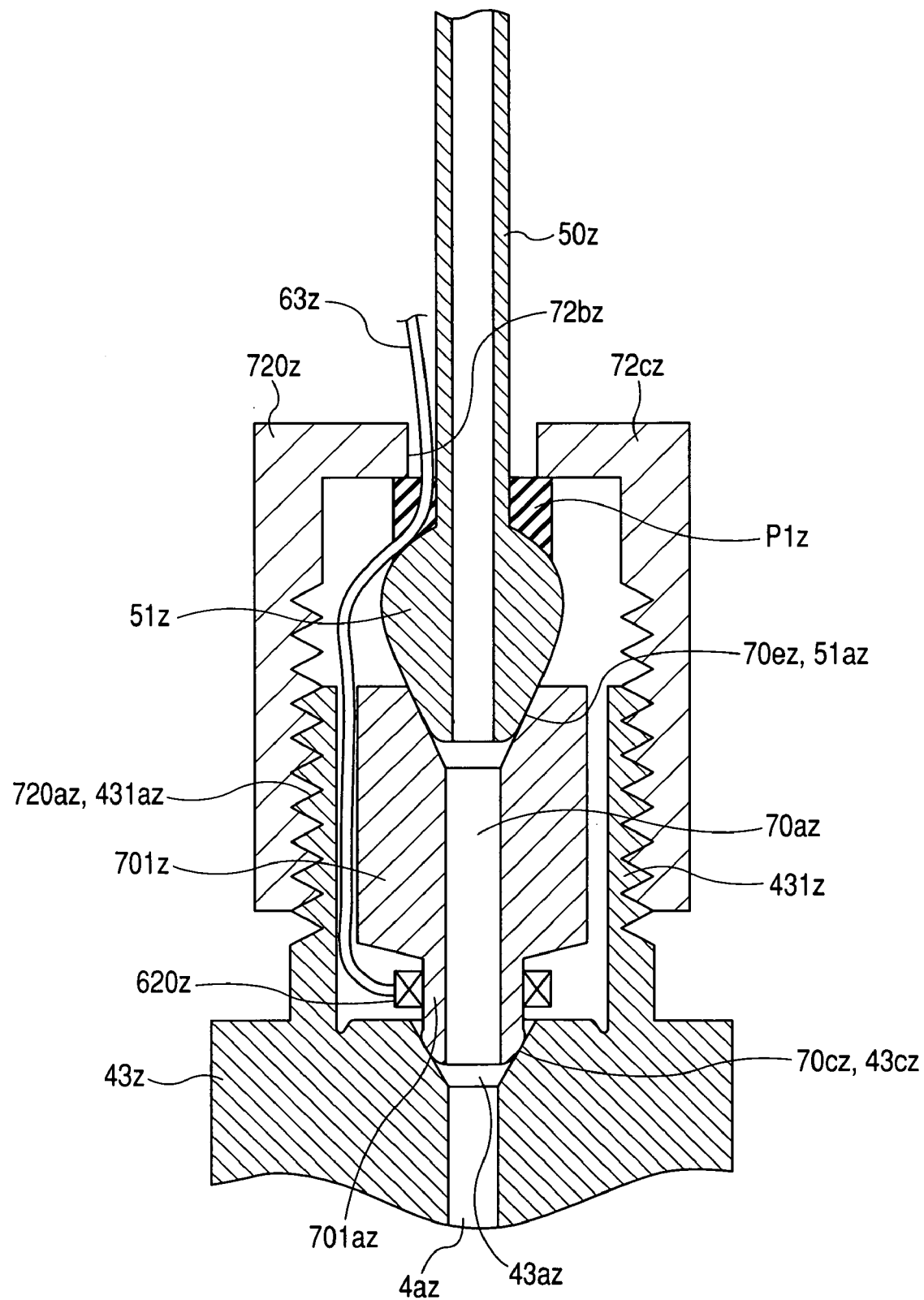
FIG. 6 is a longitudinal sectional view which shows a sensor-mount designed to mount a fuel pressure sensor on a fuel injector according to the fourth embodiment of the invention.

The fuel pressure sensor 60z of this embodiment is, like in the third embodiment of FIG. 5, made only of a strain gauge 621z. Specifically, the connector 704z has a thin-walled portion 704az formed in the middle of a length thereof. The thin-walled portion 704az is defined by a portion of a circumference of the connector 704z. In other words, the thin-walled portion 704az is made by forming a recess 704bz in the outer wall of the connector 704az and serves as an elastically deformable diaphragm exposed to the fuel flowing through the communication path 70*az*. The strain gauge 621*z* is attached to the outer surface of the thin-walled portion 704*az* (i.e., the bottom of the recess 704*bz*) to measure the elastic deformation of the thin-walled portion 704*az* arising from a change in pressure of fuel flowing through the communication path 70*az*.

Within the recess 704*bz*, circuit components 622*z* making a voltage applying circuit and an amplifier, as will be described later in detail, are disposed. The circuit components 622*z* are connected to the strain gauge 621*z* through wire-bonding. The strain gauge 621*z* constitutes a bridge-circuit along with resistors (not shown). The bridge circuit changes a resistance value thereof with a change in degree of deformation of the thin-walled portion 704*az* arising from a change in pressure of fuel flowing through the communication path 70*az*. When the voltage applying circuit applies the voltage to the bridge circuit, it will cause an output voltage of the bridge circuit to change as a function of the change in pressure of the fuel. The output voltage of the bridge circuit is amplified by the amplifier and then outputted as representing the change in pressure of the fuel flowing through the communication path 70*az*.

Figure 11:
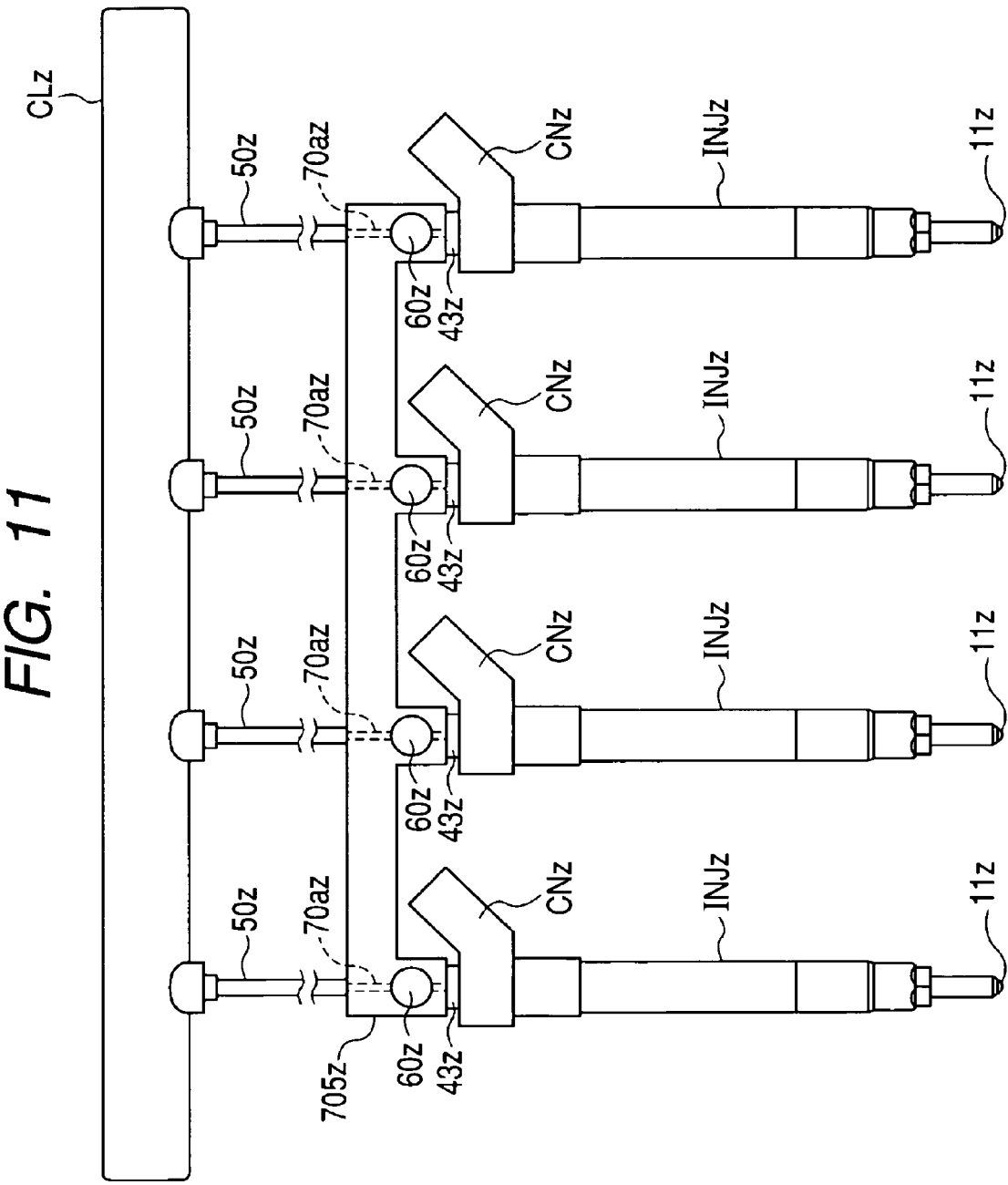
FIG. 11 is a schematic view which shows fuel injectors joined to a common rail through a connector according to the ninth embodiment of the invention.

The ninth embodiment of the invention will be described below with reference to FIG. 11. The same reference numbers, as employed in the above embodiments, will refer to the same parts, and explanation thereof in detail will be omitted here.

The connectors 70*z* in the first embodiment are provided one for each of the fuel injectors INJ*z*, but in this embodiment, a single connector 705*z* is used to connect the high-pressure pipes 50*z* to the fuel injectors INJ*z*. The connector 705*z* has formed therein the communication paths 70*az* each of which communicates with one of the high-pressure pipes 50*z*. As many fuel pressure sensors 60*z* as the cylinders of the engine are installed in the connector 705*z*. The fuel pressure sensors 60*z* are identical in structure with those in the first embodiment.

Figure 12:
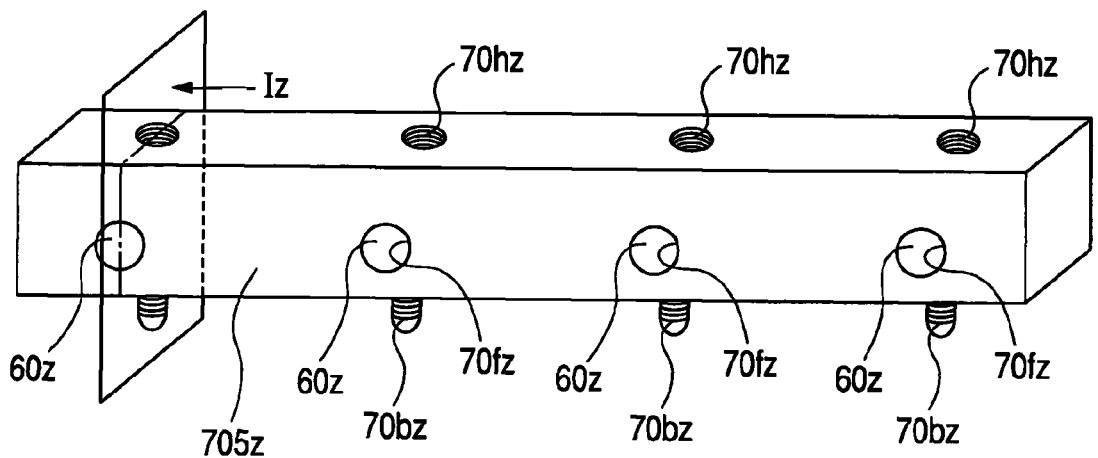
FIG. 12 is a perspective view which shows the connector of FIG. 11 in which fuel pressure sensors are mounted and which establishes mechanical joints between the fuel injectors and the common rail.
Figure 13A:
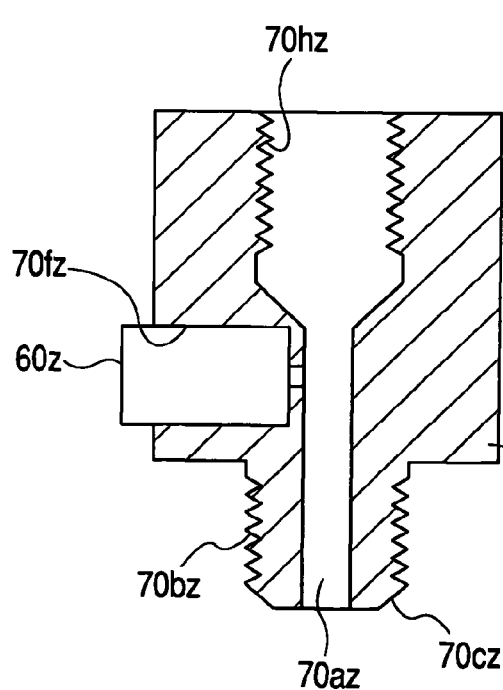
FIG. 13(a) is a cross section, as represented by a dashed line in FIG. 12, of the connector.
Figure 13B:
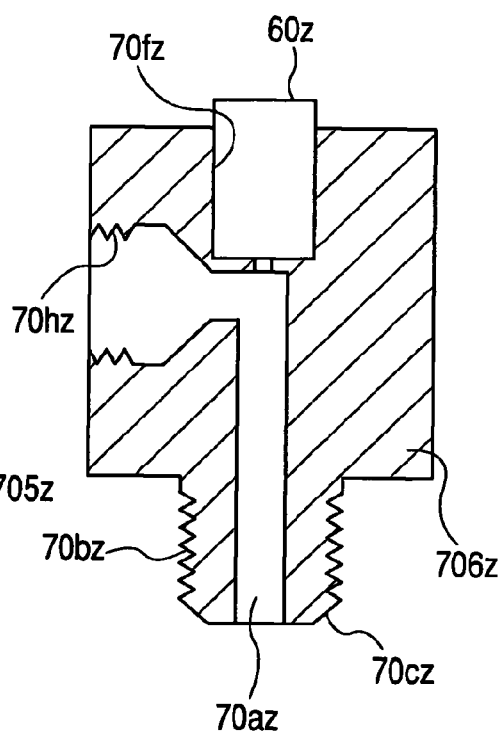
FIG. 13(b) is a cross section which shows a modification of the connector of FIG. 13(a)

FIG. 12 is a schematically perspective view which shows the connector 705*z* which are quipped with sensor mounts. FIG. 13 is a cross section, as represented by a dashed line in FIG. 12, of the connector 705*z*, as viewed from an arrow I.

The connector 705*z* has as many joint-screws 70*bz* as the cylinders of the engine which serve as downstream joints, like in the fifth embodiment, to be connected to the high-pressure ports 43*z* of the injectors INJ*z*. Additionally, the connector 705*z* also has as many joint-screw holes 70*hz* as the cylinders of the engine which serve as upstream joints to be connected to the high-pressure pipes 50*z*.

The connector 705*z*, like in the first embodiment, also has as many mount holes 70*fz* as the cylinders of the engine which are formed in the side wall thereof. Each of the fuel pressure sensor 60*z* is mounted in one of the mount holes 70*fz* so as to be exposed to the fuel flowing through the communication path 70*az*.

The structure of the connector 705*z* of this embodiment offers the following beneficial advantages.

The communication paths 70*az* each of which is to establish a fluid communication between one of the fuel injectors INJ*z* and one of the high-pressure pipes 50*z* are formed in the single connector 705*z*. The connector 705*z* is designed to couple the fuel injectors INJ*z* and the high-pressure pipes 50*z*. The fuel pressure sensors 60*z* are installed in the connector 705*z* so as to be exposed to the communication paths 70*az*. Specifically, the fuel pressure sensors 60*z* and the connector 705*z* are prepared as the fuel pressure sensor/sensor mount assembly before being joined to the fuel injectors INJ*z*, thus facilitating the ease of installation of the fuel pressure sensors 60*z* and joining of the fuel injectors INJ*z* to the common rail CL*z* within the engine compartment.

The communication paths 70*az* are, as can be seen in FIG. 13(*a*), so formed as to extend straight in alignment with the length of the injectors INJ*z*. Each of the fuel pressure sensors 60*z* is installed in the side wall of the connector 705*z*. Each of the communication paths 70*az* may alternatively, as illustrated in FIG. 13(*b*), be formed in the connector 705*z* to be of an L-shape. Specifically, the joint-screw holes 70*hz* are formed in a side wall of the connector 705*z*, while the mount holes 70*fz* in which the fuel pressure sensors 60*z* are to be installed is formed in the upper surface of the connector 705*z*.

Figure 14:
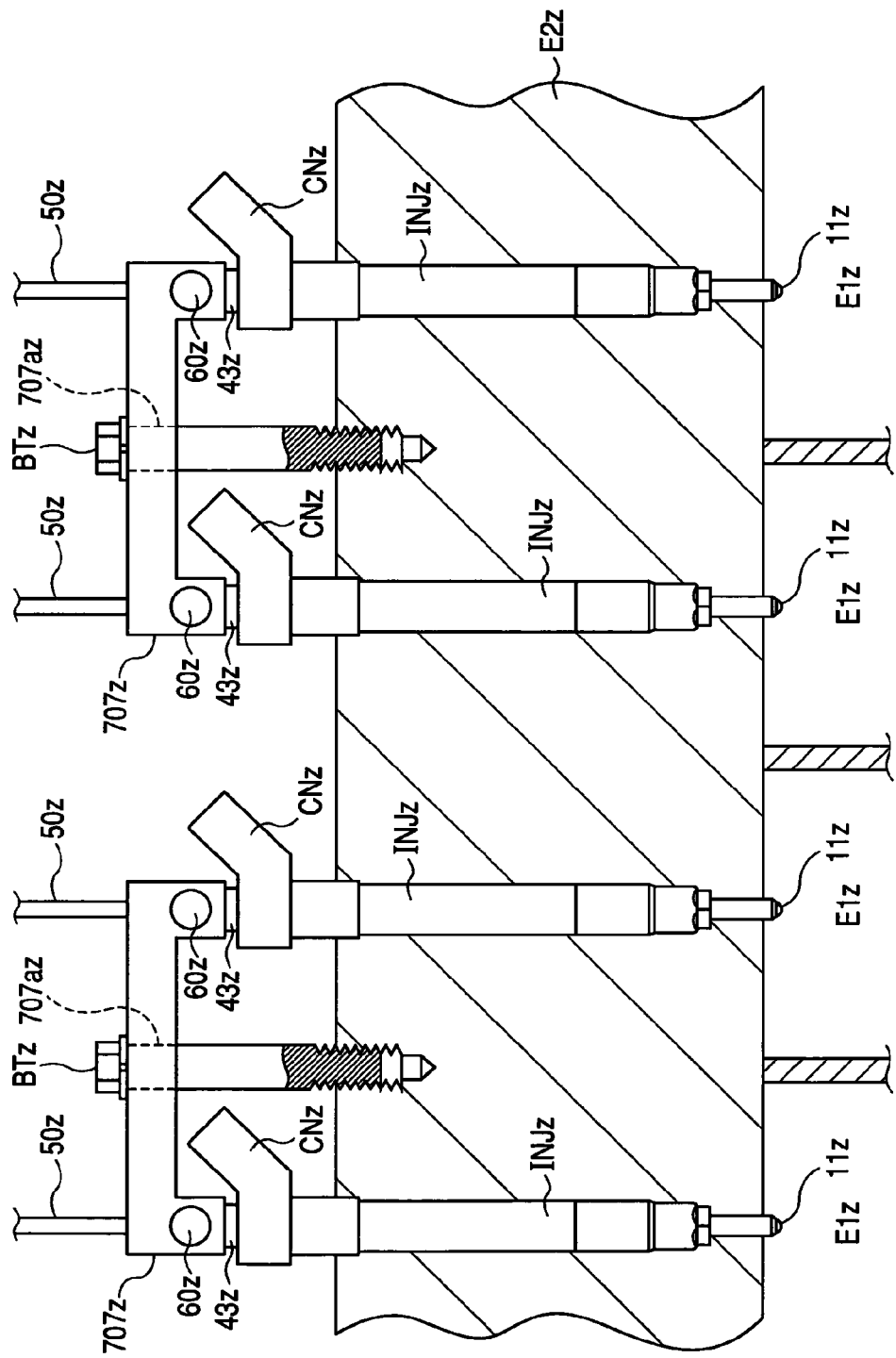
FIG. 14 is a plan view which shows connectors according to the tenth embodiment of the invention in which fuel pressure sensors are mounted and which establish mechanical joints between the fuel injectors and a common rail.

The tenth embodiment of the invention will be described below with reference to FIG. 14. The same reference numbers, as employed in the above embodiments, will refer to the same parts, and explanation thereof in detail will be omitted here.

In the ninth embodiment, the connector 705*z* has formed therein as many communication paths 70*az* as the cylinders of the engine to install all the fuel pressure sensors 60*z* in the connector 705*z*. The tenth embodiment has a plurality of discrete connectors 707*z*. The engine, as referred to herein, has four cylinders as an example. The two connectors 707*z* are used one for two of the cylinders of the engine.

Each of the connectors 707*z* has formed therein the two communication paths 70*az* and the two fuel pressure sensors 60*z*. Each of the connectors 707*z* also has a center hole 707*az* through which a bolt BT*z* is to be inserted to secure the connector 707*z* to the cylinder head E2*z*.

The installation of two of the fuel injectors INJ*z* in the cylinder head E2*z* of the engine is achieved by inserting the bolt BT*z* into the center hole 707*az* of the connector 707*z* and fastening the bolt BT*z* into the cylinder head E2*z* of the engine. Specifically, the connector 707*z* functions as a clamp to retain the fuel injectors INJ*z* in the cylinder head E2*z*, thereby eliminating the need for the clamp K*z*, as illustrated in FIG. 2 in the first embodiment. The center hole 707*az* serves as a joint together with the bolt BT*z* to join the connector 707*z* and the cylinder head E2*z*, in other words, to retain the fuel injectors INJ*z* in the cylinder head E2*z*. The center hole 707*az* is preferably located intermediate between the injectors INJ*z*.

The structure of the connectors 707*z*, as described above, eliminates the need for the clamp K*z*, thus resulting in a decease in parts required to install the fuel injectors INJ*z* in the engine cylinder E2*z* as compared with the first embodiment. The installation of two of the fuel injectors INJ*z* to the engine is achieved only by securing one of the connectors 707*z* to the cylinder head E2*z*, thus permitting the number of steps required to retain the fuel injectors INJ*z* and the connectors 707*z* within the engine compartment to be decreased as compared with the first embodiment.

The two connectors 707*z* are used to secure the four fuel injectors INJ*z* to the engine, which ensures the pressure great enough to hold the fuel injectors INJ*z* within the mount holes E3*z* of the cylinder head E2*z* firmly as compared with a single connector is used as a clamp to retain all the fuel injectors INJ*z* in the engine. Particularly, when three or more of the fuel injectors INJ*z* are installed in the cylinder head E2*z* using a single connector, it is difficult to ensure the pressure great enough to press the fuel injectors INJ*z* against the cylinder head E2*z*. However, in this embodiment, one of the connectors 707*z* is used to secure two of the fuel injectors INJ*z*, thus ensuring the pressure required to retain the fuel injectors INJ*z* in the cylinder head E2*z* firmly.

Figure 15:
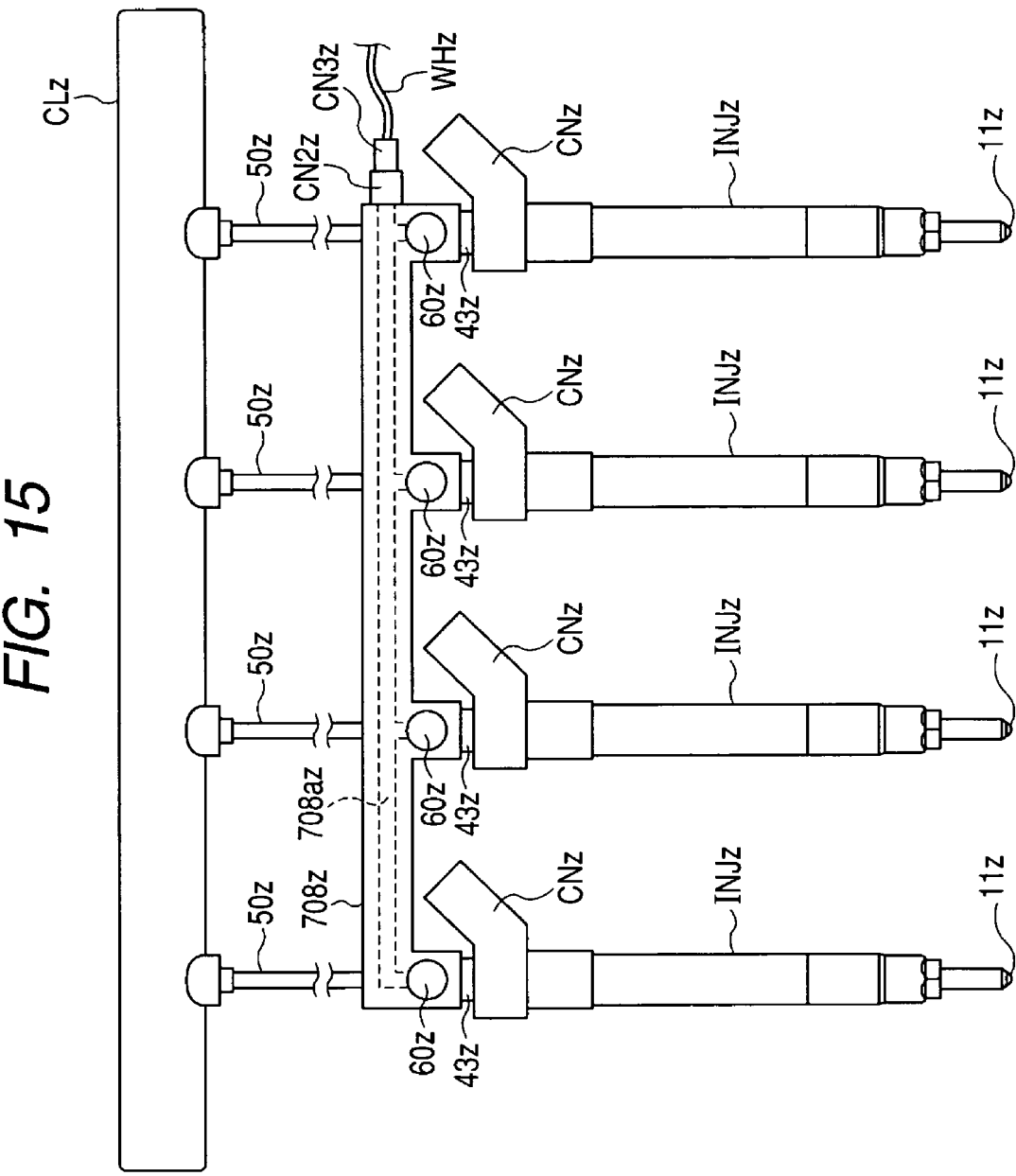
FIG. 15 is a schematic view which shows fuel injectors joined to a common rail trough a connector according to the eleventh embodiment of the invention.

The eleventh embodiment of the invention will be described below with reference to FIG. 15. The same reference numbers, as employed in the ninth embodiment, will refer to the same parts, and explanation thereof in detail will be omitted here.

The connector 708z has formed therein a common wire distribution path 708az through which wires or conductors of the fuel pressure sensors 60z extend. The connector 708z has installed therein a common connector CN2z to which the conductors of the fuel pressure sensors 60z are joined. A connector CN3z is to be joined to the common connector CN2z to connect the fuel pressure sensors 60z to an engine ECU through a wire harness WHz.

The structure of the connector 708z facilitates the ease of joining of the wire harness WHz to the fuel pressure sensors 60z through the common connector CN2z and results in decreased steps of connecting the fuel pressure sensors 60z and the engine ECU through the connector CN3z.

Figure 16:
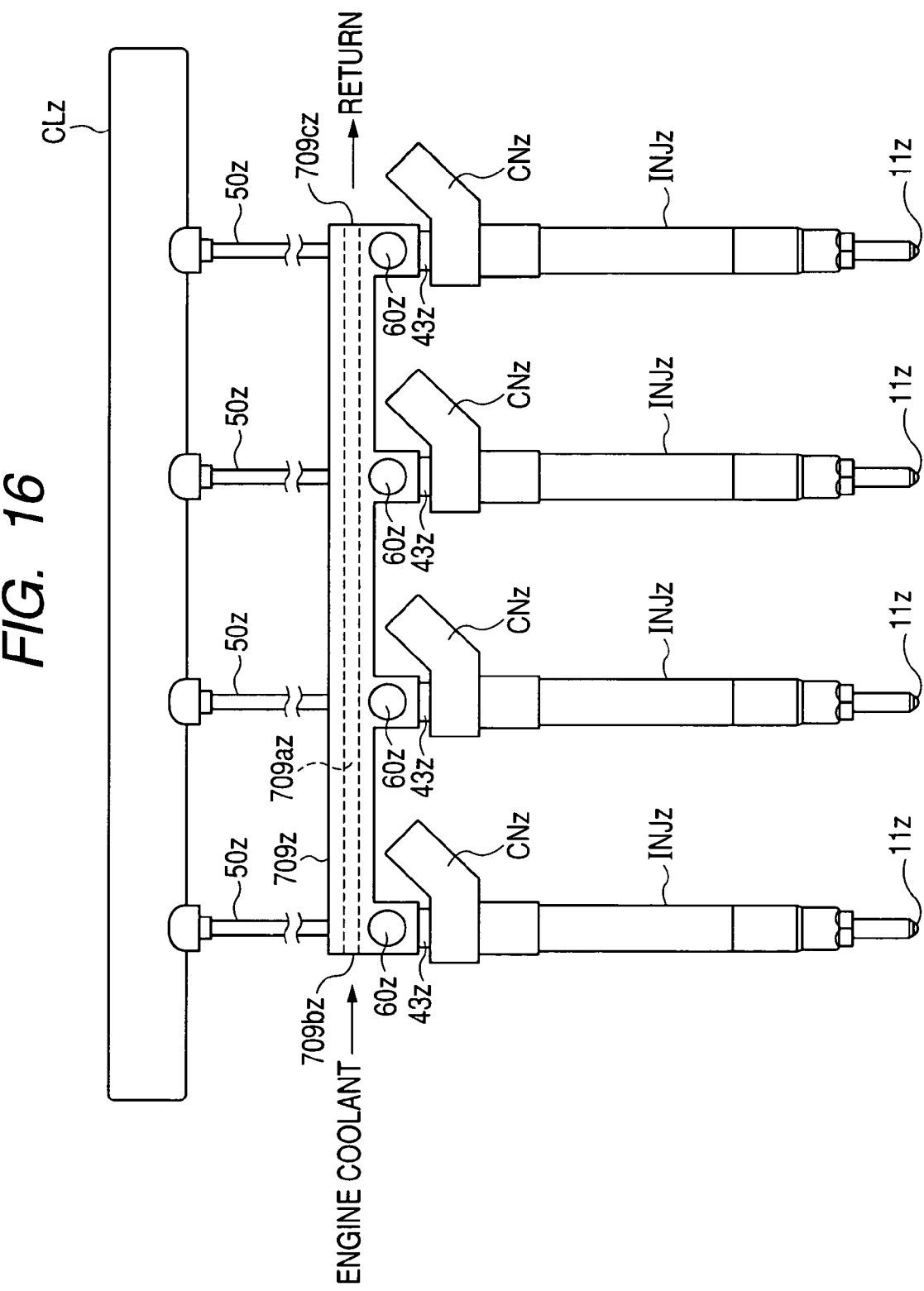
FIG. 16 is a schematic view which shows fuel injectors joined to a common rail through a connector according to the twelfth embodiment of the invention.

The twelfth embodiment of the invention will be described below with reference to FIG. 16. The same reference numbers, as employed in the ninth embodiment, will refer to the same parts, and explanation thereof in detail will be omitted here.

The connector 709z has formed therein a coolant path 709az through which cooling water or coolant flows. The coolant path 709az extends over locations where the fuel pressure sensors 60z are joined to the connector 709z. Specifically, the coolant path 709az extends along the length of the connector 709z and passes therethrough. The coolant path 709az has formed at one of ends thereof a coolant inlet 709bz into which coolant of the engine enters and at the other end a coolant outlet 709cz from which the coolant emerges.

Usually, the relation between the pressure of fuel, as represented by an output of the fuel pressure sensor 60z, and an actual pressure of fuel flowing into the fuel injector INJz (i.e., an output characteristic of the fuel pressure sensor 60z) depends upon the temperature of the fuel pressure sensor 60z. In other words, the output of the fuel pressure sensor 60z usually changes with a change in temperature of thereof regardless of an actual pressure of the fuel flowing into the fuel injector INJz, which rises a concern about a deterioration of accuracy in measuring the pressure of the fuel using the output of the fuel pressure sensor 60z. In order to address such a concern, the connector 708z is designed to have the coolant path 708az to keep the temperature of the fuel pressure sensors 60z constant.

Usually a change in temperature of coolant of the engine is smaller than that of the cylinder head E2z. The mere recirculation of coolant of the engine through the coolant path 709az, therefore, minimizes a change in pressure of the fuel pressure sensors 60z to ensure the measurement accuracy of the fuel pressure sensors 60z.

The thirteenth embodiment of the invention will be described below with reference to FIG. 17. The same reference numbers, as employed in the above embodiments, will refer to the same parts, and explanation thereof in detail will be omitted here.

Figure 17:
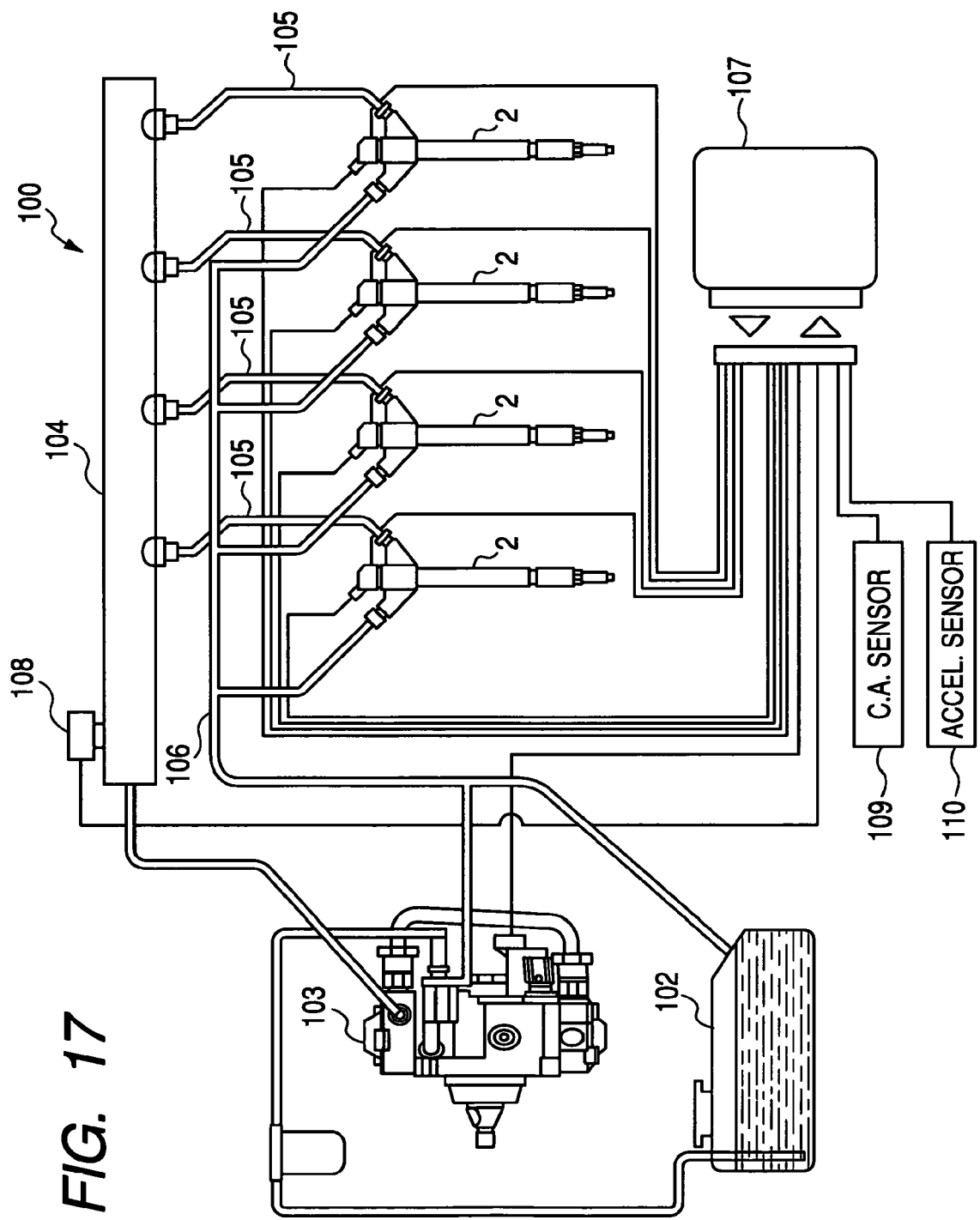
FIG. 17 is a block diagram which illustrates an accumulator fuel injection system equipped with fuel injectors in which fuel pressure sensors are installed according to the thirteenth embodiment of the invention.
Figure 18:
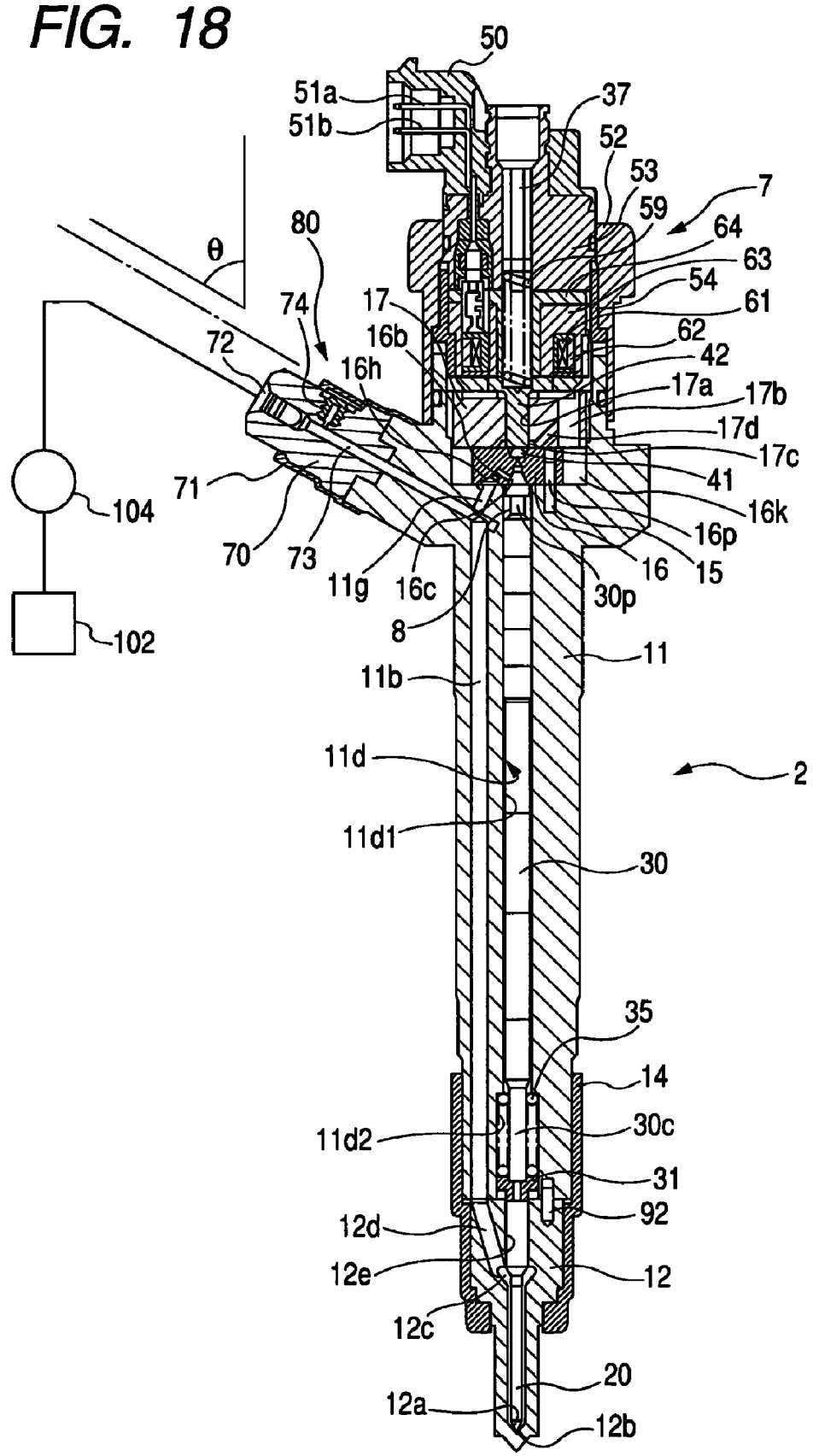
FIG. 18 is a longitudinal sectional view which shows an internal structure of each of the fuel injectors installed in the accumulator fuel injection system of FIG. 17.
Figure 19A:
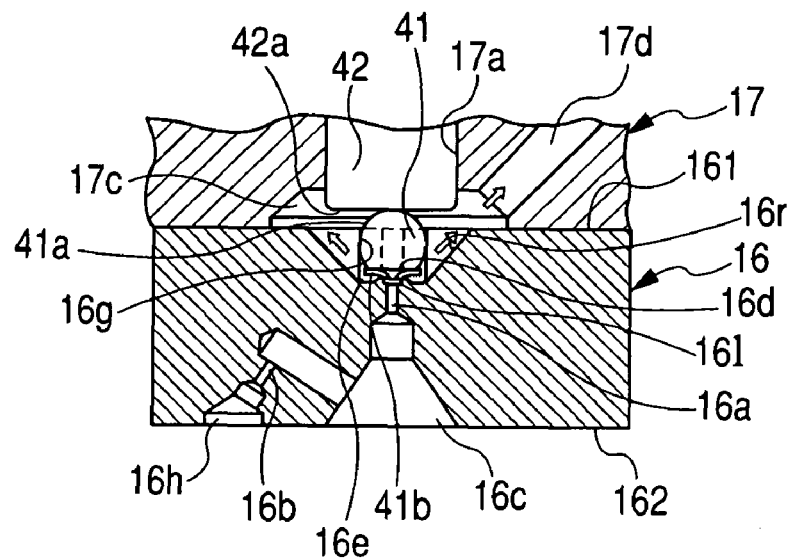
FIG. 19(a) is a partially longitudinal sectional view which shows a valve body and an orifice block installed in the fuel injector of FIG. 18.
Figure 19B:
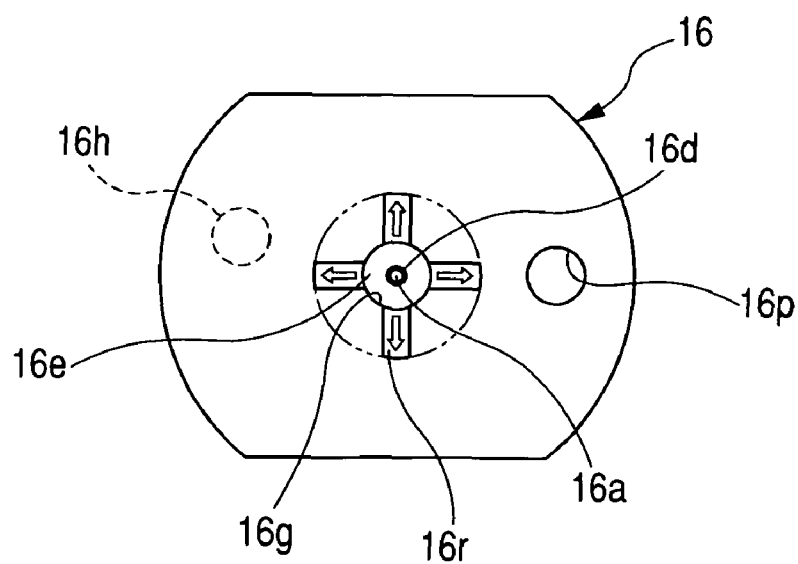
FIG. 19(b) is a plan view which shows an orifice block installed in the fuel injector of FIG. 18.
Figure 20A:
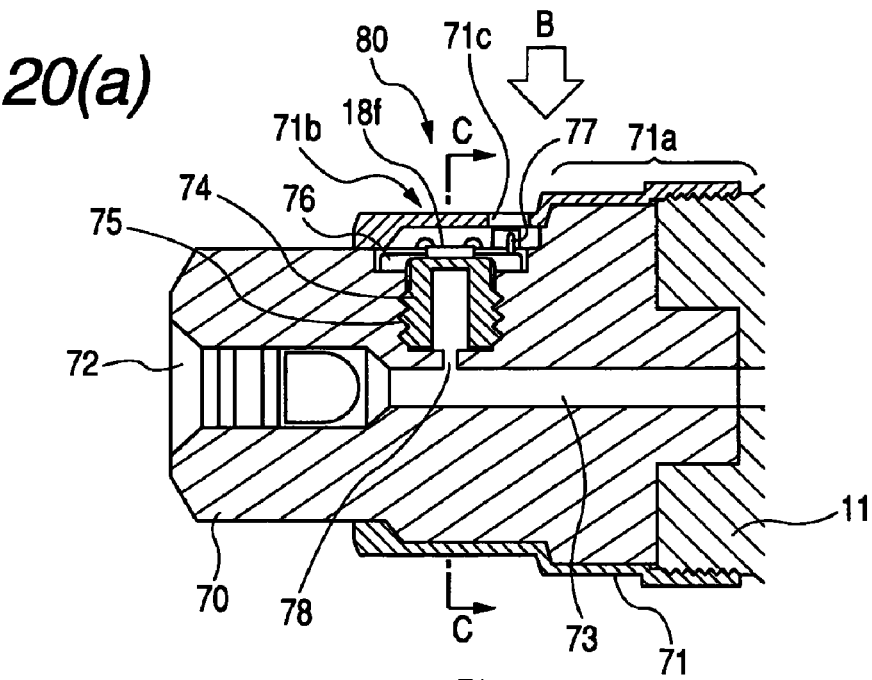
FIG. 20(a) is a partially longitudinal sectional view, as taken along the line A-A in FIG. 20(c), which shows an internal structure of an inlet body joined to the fuel injector of FIG. 18.
Figure 20B:
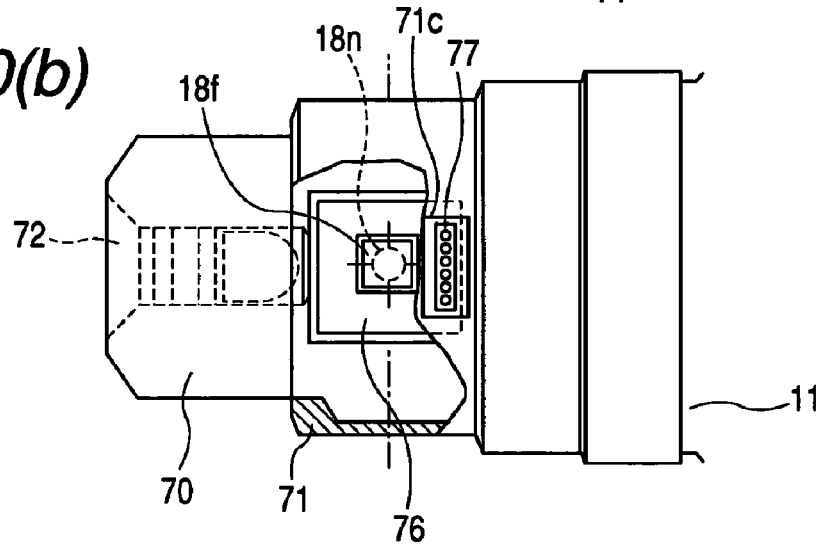
FIG. 20(b) is a partially cut-away view, as viewed from an arrow B in FIG. 20(a), which shows a fuel pressure sensor mounted in the inlet body of FIG. 20(a)
Figure 20C:
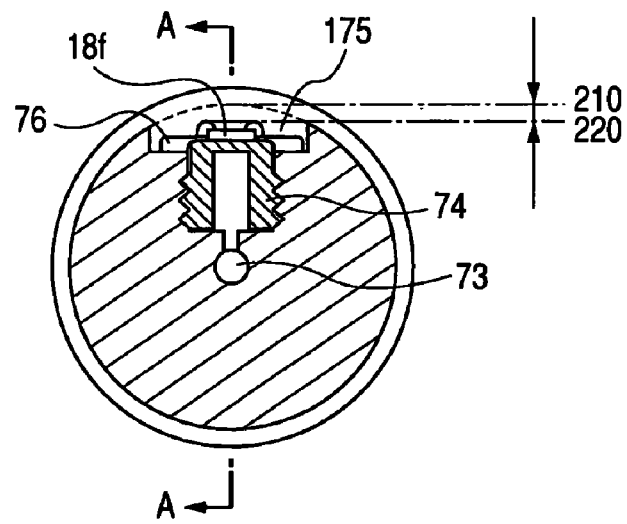
FIG. 20(c) is a transverse sectional view, as taken along the line C-C in FIG. 20(a), which shows the inlet body of FIG. 20(a)
Figure 21:
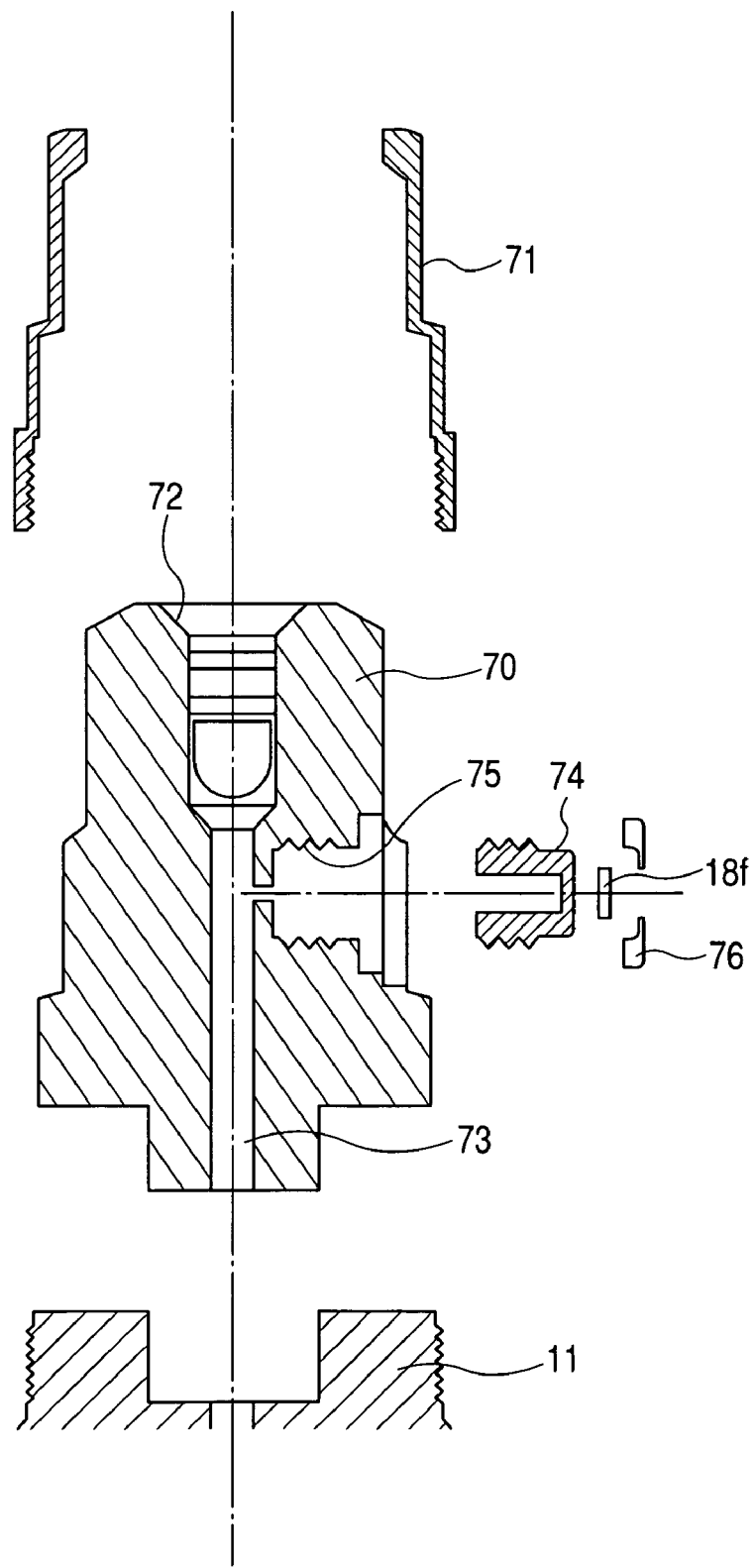
FIG. 21 is an exploded view which shows a pipe nut, an inlet body, and a lower body of the fuel injector of FIG. 18.

FIG. 17 shows an accumulator fuel injection system 100 for diesel engines which is engineered as an automotive common rail fuel injection system, FIG. 18 is a longitudinal sectional view which shows an internal structure of fuel injectors 2 installed in the fuel injection system 100 of FIG. 17. FIGS. 19(a) and 19(b) are partial longitudinal sectional view and a plane view which illustrate highlights of a fluid control valve in the fuel injector 2 of FIG. 18. FIGS. 20(a) to 20(c) are a longitudinal sectional view, a plan view, and a transverse sectional view which show an inlet body 70 joint to a major body of the fuel injector 2 of FIG. 18. FIG. 21 is a sectional view which shows a sequence of steps of assembling the inlet body 70.

The accumulator fuel injection system 100 includes a fuel tank 102, a high-pressure fuel supply pump 103, a common rail 104, and fuel injectors 2. The fuel supply pump 103 works to pump fuel out of the fuel tank 102 and pressurize and feed it to the common rail 104. The common rail 104 stores the fuel at a controlled high pressure and supplies it to the fuel injectors 2 through high-pressure fuel pipes 105, respectively. The fuel injectors 2, as illustrated in FIG. 1, are installed one in each of four cylinders of the diesel engine mounted in the automotive vehicle and work to inject the fuel, as accumulated in the common rail 104, directly into a combustion chamber of the diesel engine. The fuel injectors 2 are also connected to a low-pressure fuel path 106 to return the fuel back to the fuel tank 102.

The accumulator fuel injection system 100 also includes an electronic control unit (ECU) 107 which is equipped with a typical microcomputer and memories and works to control an output from the diesel engine. Specifically, the ECU 107 samples and analyzes an output of a fuel pressure sensor 108 indicating the pressure of fuel in the common rail 104, an output of a crank angle sensor 109 indicating an angular position of a crankshaft of the diesel engine, an accelerator position sensor 110 indicating the position of an accelerator pedal (i.e., a driver's effort on the accelerator pedal) of the vehicle, and fuel pressure sensors 80, as illustrated in FIG. 18 installed in the fuel injectors 2, respectively, to control the operation of the diesel engine.

The fuel injector 2, as can be seen in FIG. 18, includes a nozzle needle 20, a nozzle body 12, a spring 35, a lower body 11, a retaining nut 14, the inlet body 70, a retaining nut 71, a solenoid-operated valve 7, and the fuel pressure sensor 80. The nozzle needle 20 is disposed within the nozzle body 12 to be slidable in an axial direction of the fuel injector 2. The spring 35 is disposed within the lower body 11 and urges the nozzle needle 20 in a valve-closing direction. The retaining nut 14 serves as a fastener which joints the nozzle body 12 and the lower body 11 together with a given degree of axial clamping pressure. The inlet body 70 has the fuel pressure sensor 80 installed therein. The retaining nut 71 serves as a fastener which joints the lower body 11 and the inlet body 70. The solenoid-operated valve 7 works as a fluid control valve, as will be described later in detail. The fuel pressure sensor 80 works to measure the pressure of fuel in the fuel injector 2 and output a signal indicative thereof to the ECU 107.

An assembly of the lower body 11 and the nozzle body 12 joined by the retaining nut 14 forms an injector body. An assembly of the nozzle needle 20 and the nozzle body 12 forms an injector nozzle.

The nozzle body 12 is substantially of a hollow cylindrical shape and has at least one spray hole 12b formed in a head thereof for spraying a jet of fuel into a combustion chamber of the diesel engine.

The nozzle body 12 has formed therein a chamber 12e (which will also be referred to as a first needle chamber below) within which the solid-core nozzle needle 20 is retained to be slidable in the axial direction thereof. The first needle chamber 12e has a fuel sump 12c formed in a middle portion thereof, as viewed vertically in the drawing, The fuel sump 12c bulges laterally to have a greater inner diameter. Specifically, within the nozzle body 12, the first needle chamber 12e, the fuel sump 120c and a valve seat 12a are located in this order in a direction of flow of the fuel. The spray hole 12b is located downstream of the valve seat 12a and extends from inside to outside the nozzle body 12.

The valve seat 12a is of a conical shape and continues at a large diameter side to the first needle chamber 12e and at a small diameter side to the spray hole 12b. The nozzle needle 20 is seated on or away from the valve seat 12a to close or open the spray hole 12b.

The nozzle body 12 also has a fuel feeding path 12d extending from an upper end surface thereof mating with the lower body 11 to the fuel sump 12c. The fuel feeding path 12d communicates with a fuel supply path 11b, as will be described later in detail, formed in the lower body 11 to deliver the fuel, as stored in the common rail 104 at the controlled high pressure, to the valve seat 12a through the fuel sump 12c. The fuel feeding path 12d and the fuel supply path 11b define a high-pressure fuel path.

The lower body 11 is substantially of a cylindrical shape and has formed therein a chamber 11d (which will also be referred to as a second needle chamber below) within which the spring 35 and a control piston 30 which works to move the nozzle needle 20 are disposed to be slidable in the axial direction of the lower body 11. The lower body 11 has an inner circumference 11d2 formed in a lower portion of the second needle chamber 11d continuing to the nozzle body 12. The large-diameter inner circumference 11d2 is greater in diameter than a middle inner circumference 11d1 of the second needle chamber 11d.

Specifically, the inner circumference 11d2 defines a spring chamber within which the spring 35, an annular member 31, and a needle 30c of the control piston 30 are disposed. The annular member 31 is interposed between the spring 35 and the nozzle needle 20 and serves as a spring holder on which the spring 35 is held to urge the nozzle needle 20 in the valve-closing direction. The needle 30c is disposed in indirect contact with the nozzle needle 20 through the annular member 31 or may alternatively be placed in direct abutment with the nozzle needle 20.

The lower body 11 has joined thereto the inlet body 70 to which the high-pressure pipe 105, as illustrated in FIG. 17, leading to the common rail 104 is to be joined hermetically. The inlet body 70 is designed to be separate from the lower body 11. After the fuel pressure sensor 80, as will be described later in detail, is installed, the inlet body 70 is secured threadably to the lower body 11. Specifically, the inlet body 70 serves as a connector to connect the fuel pressure sensor 80 to the lower body 11 of the fuel injector 2. The inlet body 70 is oriented to have a length extending at an angle of 30° to 75° (e.g., 60° in this embodiment) to the length (i.e. an axis) of the injector body made up of the lower body 11 and the nozzle body 12. The structure of the inlet body 70 will be discussed later in detail.

The lower body 11 also has a drain path (not shown) through which the fuel in the spring chamber 11d2 is drained to a low-pressure fuel path defined by the low-pressure fuel pipe 106, as illustrated in FIG. 17, leading to the fuel tank 102. The drain path and the spring chamber 11d2 form a part of the low-pressure fuel path.

The lower body 11 also has pressure control chambers 8 and 16c which are defined on an end of the control piston 30 and to which the hydraulic pressure is supplied by the solenoid-operated valve 7. The hydraulic pressure in the pressure control chambers 8 and 16c is increased or decreased to close or open the nozzle needle 20. Specifically, when the hydraulic pressure is drained from the pressure control chambers 8 and 16c, it will cause the nozzle needle 20 and the control piston 30 to move upward, as viewed in FIG. 18, against the pressure of the spring 35 to open the spray hole 12b. Alternatively, when the hydraulic pressure is supplied to the pressure control chambers 8 and 16c so that it rises, it will cause the nozzle needle 20 and the control piston 30 to move downward, as viewed in FIG. 18, by the pressure of the spring 35 to close the spray hole 12b. The pressure control chambers 8, 16c, and 18c are defined by the upper end 30p of the control piston 30, the second needle chamber 11d, and an orifice block 16, as will be described later in detail.

The solenoid-operated valve 17 is an electromagnetic two-way valve which establishes or blocks fluid communication of the pressure control chambers 8 and 16c with a low-pressure path 17d. The solenoid-operated valve 17 is installed on one of opposed ends of the lower body 11 which is far from the spray hole 12b. The solenoid-operated valve 17 is secured to the lower body 11 through an upper body 52. The orifice block 16 is disposed on one of ends of the second needle chamber 11d which is far from the spray hole 12b.

The orifice block 6 is made of a metallic plate extending substantially perpendicular to an axial direction of the fuel injector 2, that is, a length of the control piston 30. The orifice block 6 is machined independently from the lower body 11 and the nozzle body 12 defining the injector body and then installed in the lower body 11. The orifice block 16, as illustrated in FIGS. 19(a) and 19(b), has communication paths 16a and 16b formed therein. FIG. 19(b) is a plan view of the orifice block 16, as viewed from a valve armature 42. The communication path 16a works as an outer or outlet orifice defining an outlet. The communication path 16b works as an inner or inlet orifice defining an inlet. The outlet and inlet orifices 16a and 16b communicate with each other through a pressure control chamber 16c.

The outlet orifice 16a communicates between the valve seat 16d and the pressure control chamber 16c. The outlet orifice 16a is closed or opened by a valve ball 41 through the valve armature 42. The inlet orifice 16b has an inlet 16h opening at the flat surface 162 of the orifice block 16. The inlet 16h communicates with a fuel supply branch path 11g which diverges from the fuel supply path 11b. The valve seat 16d of the orifice body 16 on which the valve ball 41 is to be seated and the structure of the valve armature 42 will be described later in detail.

The valve body 17 serving as a valve housing is disposed on one of the ends of the orifice block 16 which is far from the spray hole 12b. The valve body 17 has formed on the periphery thereof an outer thread which meshes with an inner thread formed on an inner cylindrical chamber of the lower body 11 to nip the orifice block 16 between the valve body 17 and the lower body 11. The valve body 17 is substantially of a hollow cylindrical shape and has, as can be seen from FIG. 18, through holes 17a and 17b. The low-pressure path 17d is formed between the through holes 17a and 17b, The hole 17a will also be referred to as a guide hole below.

The end surface 16l of the orifice block 16 and the inner wall of the through hole 17a define a valve chamber 17c. The orifice block 16 has formed on an outer wall thereof diametrically opposed flats (not shown) one of which defines a gap 16k between itself and the inner wall of the lower body 11. The gap 16k, as illustrated in FIG. 18, communicates with the through hole 17b.

The solenoid-operated valve 7 includes a coil 61 wound around a resinous spool 62. The coil 61 and the spool 62 are covered at an outer periphery thereof with a resinous mold (not shown). The coil 61 and the spool 62 may be made by winding wire into the coil 61 using a winding machine, coating the outer periphery of the coil 61 with resin using molding techniques, and resin-molding the assembly of the coil 61 and the spool 62. The coil 61 is connected electrically at ends thereof to the ECU 107 through terminal pins 51a formed in the connector 50 together with terminal pins 51b.

The solenoid-operated valve 7 also includes a stationary core 63 which is substantially of a hollow cylindrical shape. The stationary core 63 is, as can be seen from the drawing, made up of an inner peripheral wall, an outer peripheral wall, and an upper end connecting the inner and outer peripheral walls together. The coil 61 is retained between the inner and outer peripheral walls. The stationary core 63 is made of a magnetic material.

The valve armature 42 is disposed beneath the stationary core 63, as viewed in FIG. 18, and faces the stationary core 63. Specifically, the valve armature 42 has an upper flange serving as a pole face which is movable to or away from a lower end surface (i.e., a pole face) of the stationary core 63. When the coil 61 is energized, it will cause a magnetic flux to flow from pole faces of the inner and outer peripheral walls of the stationary core 63 to the pole face of the valve armature 42 to create a magnetic attraction depending upon the magnetic flux density which acts on the valve armature 42.

A hollow cylindrical stopper 64 is disposed inside the stationary core 63 and has a flange held firmly between the stationary core 63 and an upper housing 53. A compression spring 59 is disposed in the stopper 64. The compression spring 59 may be replaced with any other elastic member. The pressure, as produced by the spring 59, acts on the valve armature 42 to bring the valve armature 42 away from the stationary core 63 so as to increase an air gap between the pole faces thereof. The stopper 64 has a lower end working to define a limit to which the valve armature 42 is lifted up fully. The stopper 64 and the upper body 52 have form therein a fuel path 37 from which the fuel flowing out of the valve chamber 17c and a through hole 17b is discharged outside the fuel injector 2.

An assembly of the upper body 52 (i.e. an upper housing), an intermediate housing 54, and the valve body 17 serves as a valve housing. The intermediate housing 54 is made of a hollow cylinder and retains the stationary core 63 therein. Specifically, the stationary core 63 is, as described above, cylindrical in shape and has an outer shoulder and a bottom. The stationary core 63 is disposed within a lower portion of the intermediate housing 54 in contact with an inner periphery thereof. The stationary core 63 has a small-diameter portion formed below the outer shoulder, as viewed in the drawing. The intermediate housing 54 has an inner shoulder with which the outer shoulder of the stationary core 63 is placed in abutment, thereby retaining the stationary core 63 firmly within the intermediate housing 54.

The valve armature 42 is, as described above, made up of an upper flange disc and a small-diameter shaft extending downward, as viewed in the drawing, from the center of the flange disc. The flange disc has the pole face opposed to the pole faces of the inner and outer peripheral walls of the stationary core 63. The valve armature 42 is made of a magnetic material such as permendur.

The valve ball 41 is, as clearly illustrated in FIG. 19(a), disposed in abutment with the lower end 42a of the small-diameter shaft of the valve armature 42. The valve armature 42 is to be seated on the valve seat 16d of the orifice block 16 through the valve ball 41. The positioning pin 15 passes through the hole 16p of the orifice block 16 and is inserted into the lower body 11 to position the orifice block 16 relative to the lower body 11.

The structures of the valve armature 42 and the orifice block 16 win also be described below in detail with reference to FIGS. 19(a) and 19(b).

The surface of the lower end 42a of the small-diameter shaft of the valve armature 42 is flat and placed in abutment with a spherical surface 41a of the valve ball 41. The small-diameter shaft of the valve armature 42 is disposed inside the through hole 17a of the valve body 17 to be slidable vertically. The end 42a of the valve armature 42 is exposed inside the valve chamber 17c. The valve ball 41 is seated on or lifted up from the valve seat 16d through the valve armature 42, thereby blocking or establishing the flow of fuel from the pressure control chambers 8 and 16c to the valve chamber 17c.

Specifically, the valve ball 41 is made of a spherical body with a flat face 41b. The flat face 41b is to be seated on or lifted away from the valve seat 16d. When the flat face 41b is seat on the valve seat 16d, it closes the outlet orifice 16a to block the fluid communication between the pressure control chamber 16c and the valve chamber 17c.

The orifice block 16, as illustrated in FIGS. 19(a) and 19(b), has a cylindrical guide hole 16g formed in the upper end surface 16l facing the valve armature 42. The guide hole 11g has a bottom and works to guide the sliding motion of the spherical surface 41a of the valve ball 41. The guide hole 16g has formed on a central area of the bottom thereof a frusto-conical protrusion which has a flat upper surface defining the valve seat led. The end of an opening of the guide hole 16b lies flush with the upper end surface 16l of the orifice block 16.

The outer periphery of the valve seat 16d is smaller in size than the inner periphery of the guide hole 16g. In other words, the valve seat 16d is smaller in diameter than the guide hole 16g. Specifically, an annular fuel release path 16e is formed in the circumference of the bottom of the guide hole 16g around the valve seat 16d. The circumference of the valve seat 16d is smaller than that of the flat face 41b of the valve ball 41 so that the fuel release path 16g is ensured around the valve seat 16d even when the valve ball 41 is seated on the valve seat 16d. Therefore, when the valve ball 41 leaves the valve seat 16d, it will create a fuel release chamber defined by the fuel release path 16e and a gap between the valve seat 16d and the flat face 41b of the valve ball 41.

The valve ball 41 is retained by the guide hole 16g to be slidable vertically (i.e., the axial direction of the fuel injector 2). The clearance between the inner periphery of the guide hole 16g and the spherical surface 41a of the valve ball 41 is so selected as to ensure the sliding motion of the valve ball 41 and minimize the amount of fuel leaking from the valve seat 16d to the low pressure side (i.e., the low pressure path 17d).

The guide hole 16g has, as clearly illustrated in FIGS. 19(a) and 19(b), formed in the inner peripheral wall thereof four V-grooves defining fuel drain paths 16r which open into the valve chamber 17c and communicate with the low pressure path 17d. The fuel drain paths 16r extend from the fuel release path 16e. Therefore, when the valve ball 41 is lifted away from the valve seat 16d, it establishes a fuel release flow path extending from the outlet orifice 16a to the gap between the valve seat 16d and the flat face 41b of the valve ball 41, to the fuel release path 16e, to the fuel drain paths 16r, and to the low pressure path 17d. The fuel release flow path has a sectional area greater in size than the outlet orifice 16a, so that the flow rate of fuel from the outlet orifice 16a to the low pressure path 17d depends upon the size of the outlet orifice 16a, thereby ensuring the stability of flow of the fuel to the low pressure path 17d when the valve ball 41 is lifted away from the valve scat 16d.

The fuel drain paths 16r, as can be seen from FIG. 19(b), extend radially at a regular intervals, thereby ensuring the stability of flow of fuel emerging from the outlet orifice 16a of the valve scat 16d toward the fuel drain paths 16r and orientation of the valve ball 41 when the valve ball 41 is lifted away from the valve seat 16d. The number of the fuel drain paths 16r may be selected as a function of a required flow rate of fuel to be drained from the outlet orifice 16a. The corner 16l of the opening of the outlet orifice 16d is, as illustrated in FIG. 19(b), chamfered. The valve armature 42 serves as a support which retains the valve ball 41. The orifice block 16 also serves as a valve body with the valve seat 16d. The valve body 17 also serves as a valve housing.

The operation of the fuel injector 2 will be described below. The high-pressure fuel is supplied from the common rail 104 to the fuel sump 12c through the high-pressure fuel pipe 105, the fuel inlet path 11c, the fuel supply path 11b, and the fuel feeding path 12d. The high-pressure fuel is also supplied to the pressure control chambers 8 and 16c through the fuel inlet path 11c and the inlet orifice 16b.

When the coil 61 is in a deenergized state, the valve ball 41 is urged by the spring 59 through the valve armature 42 into constant abutment with the valve seat 16d. This closes the outlet orifice 16a to block the flow of fuel from the pressure control chambers 8 and 16c to the valve chamber 17c and the low pressure path 17d.

The pressure of fuel in the pressure control chambers 8 and 16c is kept at the same level as in the common rail 104 and works as a back pressure acting on the control piston 30. The sum of the back pressure (which will also be referred to as a first hydraulic effort below) urging the nozzle needle 20 through the control piston 30 to close the spray hole 12b and the pressure (which will also be referred to as a second hydraulic effort below), as produced by the spring 35, which urges the nozzle needle 20 to close the spray hole 12b is, thus, kept greater than the pressure (which will also be referred to as a third hydraulic effort below) of fuel in the fuel sump 12c and around the valve seat 12a which urges the nozzle needle 20 away from the spray hole 12b. This causes the nozzle needle 20 to be placed on the valve seat 12a and closes the spray hole 12b not to produce a jet of fuel from the fuel injector 2.

On the valve ball 41 seated on the valve seat 16d, the pressure of fuel in the outlet orifice 16a (i.e., in the chamfered corner 16l of the outlet orifice 16a) acts.

When the coil 61 is energized to open the fuel injector 2, it will cause the coil 61 to produce a magnetic force so that a magnetic attraction is created between the stationary core 63 and the valve armature 42, thereby attracting the valve armature 42 toward the stationary core 63. The pressure (which will also be referred to as a fourth hydraulic effort below) of fuel in the outlet orifice lea (i.e., the back pressure acting on the control piston 30) is exerted on the valve ball 41 to lift the valve ball 41 away from the valve seat 16d. The valve ball 41 moves along the inner periphery of the guide hole 16g toward the stationary core 63.

When the valve ball 41 is lifted away from the valve seat 16d along with the valve armature 42, it establishes the fluid communication from the pressure control chambers 8 and 16c to the valve chamber 17c and to the low-pressure path 17d through the outlet orifice 16a, so that the fuel emerges from the outlet orifice 16a and flows into the low-pressure path 17d. This causes the pressure of fuel in the pressure control chambers 8 and 16c (i.e., the back pressure acting on the control piston 30) to drop, so that the first hydraulic effort decreases gradually. When the third hydraulic effort urging the nozzle needle to open the spray hole 12b exceeds the sum of the first and second hydraulic efforts urging the nozzle needle 20 to close the spray hole 12b, it will cause the nozzle needle 20 to be lifted up from the valve seat 12a (i.e., upward, as viewed in FIG. 18) to open the spray hole 12b, so that the fuel is sprayed from the spray hole 12b.

When the coil 61 is deenergized to close the fuel injector 2, it will cause the magnetic force to disappear from the coil 61, so that the valve armature 42 and the valve ball 41 are pushed by the spring 59 to the valve seat 16d. When the flat face 41b of the valve ball 41 is seated on the valve seat 16d, it blocks the flow of fuel from the pressure control chambers 8 and 16c to the valve chamber 17c and the low-pressure path 17d. This results in a rise in the back pressure in the pressure control chambers 8 and 16c exerted on the control piston 30. When the sum of the first and second hydraulic efforts exceeds the third hydraulic effort, it will cause the nozzle needle 20 to be moved downward, as viewed in FIG. 18. When the nozzle needle 20 is seated on the valve seat 12a, it closes the spray hole 12b to terminate the spraying of fuel from the fuel injector 2.

The structure of the inlet body 70 will be described below. The inlet body 70 is, as illustrated in FIG. 18, located farther away from the spray hole 12b than the pressure control chambers 8 and 16c and secured threadably to an end portion of the injector body in which a portion of the fuel supply path 11b is formed.

The inlet body 70, as clearly illustrated in FIGS. 20(a) to 20(c), has formed therein a fuel inlet 72 in which the high-pressure fuel is supplied from the common rail 104 and the fuel inlet path 73 through which the high-pressure fuel is introduced into the fuel supply path 11b. The fuel inlet path 73 has a bar filter (not shown) installed therein.

The inlet body 70 is made of carbon steel (egg, S15C) which has anti-corrosion and high-mechanical strength properties and is plated with Zn in order to enhance the anti-corrosion property, XM7, SUS430, SUS304, or SUS630 which are high in corrosion resistance.

The inlet body 70 and the lower body 11 are joined detachably by a cylindrical retaining nut 71. The retaining nut 71 has formed on an open end inner wall thereof an internal thread meshing with an external thread formed on the lower body 11. The retaining nut 71 is made up of a fastening portion 71a and a covering portion 71b. The fastening portion 71a covers portions of the inlet body 70 and the lower body 11 to fasten them tightly. The covering portion 71b covers a metal stem 74, as will be described later in detail. The covering portion 71b has formed therein a connector opening 71c into which an electric connector is to be inserted to make an electric connection with the metal stem 74. The connector opening 71c may alternatively be formed in the fastening portion 71a.

The metal stem 71 is one of component parts of the fuel pressure sensor 80. The metal stem 71 is, as clearly illustrated in FIGS. 22(a) and 22(b), a hollow cylinder having a bottom which is smaller in thickness to form a diaphragm 18n. The diaphragm 18n is elastically deformable in response to the pressure of fuel exerted thereon, The metal stem 71 is also equipped with a pressure sensing chamber 18b defined by a hole formed therein which has a given depth and inner diameter and into which the pressure of fuel is admitted. The inlet body 70 has formed therein, as illustrated in FIG. 20(a), a pressure inlet path 75 contoured to conform with an external shape of the metal stem 74. Specifically, the metal stem 74 is fit in the pressure inlet path 75.

The metal stem 74 has formed thereon an external thread which meshes with an internal thread formed in the fuel inlet path 75 of the inlet body 70. The installation of the metal stem 74 in the inlet body 70 is, as can be seen in FIG. 21, achieved by orienting the metal stem 74 to have the pressure sensing chamber 18b face the pressure inlet path 75 and fastening it to establish engagement of the external thread with the internal thread of the inlet body 70.

A combination of the depth of the pressure inlet path 75 and the length of the metal stem 74 is, as illustrated in FIGS. 20(a) to 20(c), selected so that the diaphragm 18n is exposed outside an outer open end of the pressure inlet path 75. A recess 175 is formed in the outer peripheral wall of the inlet body 70 to form a flat surface around the open end of the pressure inlet path 75. A pressure sensor chip 18f is affixed to the outer surface of the diaphragm 18n of the metal stem 74. When the metal stem 74 is fitted in the pressure inlet path 75, an outermost portion 220 of the sensor chip 18f or the metal stem 74 in the radial direction of the inlet body 70 is located inside, as can be seen from FIG. 20(c), a radially outermost portion 210 of the outer wall of the inlet body 70 (i.e., an outer peripheral edge of the recess 175) which defines the recess 175 in the inlet body 70.

A ceramic board 76 is, as illustrated in FIGS. 21(a) to 21(c), glued or bonded to the flat surface of the inlet body 70 around the pressure sensor chip 18f. The ceramic board 76 has bonded thereon an amplifier IC chip working to amplify an output of the pressure sensor chip 18f and a characteristic adjustment IC chip. The characteristic adjustment IC chip includes a non-volatile memory which stores data on the sensitivity of the pressure sensor chip 18f and the injection quantity characteristic of the fuel injector. After the metal stem 74 and the ceramic board 76 are mounted in the inlet body 70, the inlet body 70 is fitted to the lower body 11 and fixed firmly by the retaining nut 71.

The pressure inlet path 75 which defines a mount chamber in which the metal stem 74 is disposed communicates with the fuel inlet path 73 through a branch path 78. The high-pressure fuel introduced into the fuel inlet path 73 through the fuel inlet 72 is, therefore, directed partially into the pressure sensing chamber 18b so that the pressure of the high-pressure fuel is exerted on the diaphragm 18n.

Figure 22A:
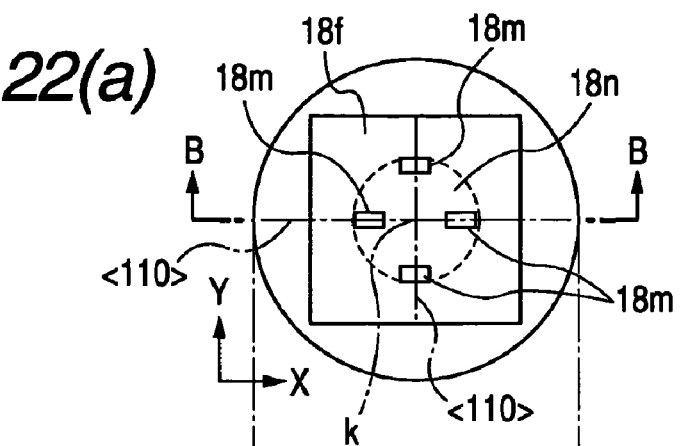
FIG. 22(a) is a plane view which shows a fuel pressure sensor mounted in the fuel injector of FIG. 18.
Figure 22B:
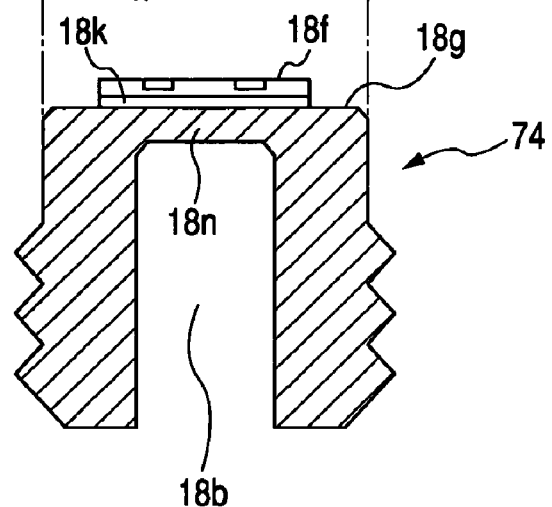
FIG. 22(b) is a longitudinal sectional view, as taken along the line B-B in FIG. 22(a), which shows a stem that is the part of a fuel pressure sensor mounted in the fuel injector of FIG. 18.

The pressure sensor chip 18f is made of monocrystal silicon (Si) and is, as illustrated in FIGS. 22(a) and 22(b), affixed to the outer surface of the diaphragm 18n of the metal stem 74 through a low-melting glass material. The pressure sensor chip 18f works as a stain gauge which is responsive to the degree of elastic deformation or strain of the diaphragm 18n, as developed by the pressure of fuel introduced into the pressure sensing chamber 18b of the metal stem 74.

The inlet body 70 is oriented to have a length extending at a given angle θ relative to the longitudinal center line (i.e., an axis) of the injector body. Specifically, the angle θ which the longitudinal center line of the fuel inlet path 73 makes with the longitudinal center line of the injector body (i.e., the length of the fuel supply path 11b) is selected to be greater than or equal to 0° and less than 90°, preferably greater than or equal to 0° and less than or equal to 75°, and more preferably greater than or equal to 0° and less than or equal to 60°. The angle θ is set to 60° in this embodiment. The metal stem 74 is secured, as can be seen in FIG. 18, to the upper surface of the inlet body 70 when the fuel injector 2 is in use. The diaphragm 18n is, therefore, oriented at the angle θ to the longitudinal center line of the injector body.

The material of the metal stem 74 is required to have a mechanical strength great enough to withstand the pressure of fuel exerted thereon and a low coefficient of thermal expansion because the Si-made pressure sensor chip 18f is bonded to the metal stem 74 using glass. The metal stem 74 may be made of material containing main components of Fe, Ni, and Co or Fe and Ni and additives of Ti, Nb, and Al or Ti and Nb for precipitation strengthening. The metal stem 74 may be made by a press, a cutting or grinding machine, or cold-forging. For example the metal stem 74 is made of Kovar that is Fi—Ni—Co alloy whose coefficient of thermal expansion is substantially equal to that of glass.

The diaphragm 18n of the metal stem 74, as described above, protrudes from the end of the pressure inlet path 75. The ceramic board 76 is bonded to the flat surface of the inlet body 70 around the diaphragm 18n. The ceramic board 76 has bonded thereon the amplifier IC chip and the characteristic adjustment IC chip. The characteristic adjustment IC chip includes the non-volatile memory which stores data on the sensitivity of the pressure sensor chip 18f and the injection quantity characteristic of the fuel injector.

The amplifier IC chip and the characteristic adjustment IC are joined to the pressure sensor chip 18f through aluminum wires made by wire-bonding techniques. The ceramic board 76 has connector pins 77 which are joined to conductors printed on the ceramic board 76 and extend to the connector opening 71c. A harness (not shown) which is to be joined to the terminal pin 51b is also to be joined to the connector pins 77. The terminal pin 51b is connected electrically to the ECU 107 along with the terminal pin 51a for the operation of the fuel injector 2.

The fuel pressure sensor 80 is, as apparent from the above discussion, installed in the inlet body 70 and equipped with the metal stem 76, the pressure sensor chip 18f, and the ceramic board 76. The pressure sensor chip 18f works to convert the deformation of the diaphragm 18n into an electric signal. The output from the pressure sensor chip 18f is processed by a sensor signal processing circuit (i.e., the amplifier IC chip, etc.) mounted on the ceramic board 76.

The fuel pressure sensor 80 outputs a signal representing the pressure of fuel flowing through the fuel inlet path 73 to the ECU 107 through the terminal pin 51b. The ECU 107 samples the output from the fuel pressure sensor 80 of each of the fuel injectors 2 and control the spraying of fuel from the fuel injector 2.

The structure of the fuel pressure sensors 80 will also be described below in detail with reference to FIGS. 22(a) and 22(b) and FIGS. 23(a) to 23(c).

The metal stem 74 has the following measurements. The outer diameter is 6.5 mm. The inner diameter (i.e., the diameter of the pressure sensing chamber 18b) is 2.5 mm. The thickness of the diaphragm 18n required under 20 MPa is 0.65 mm, and under 200 MPa is 1.40 mm The pressure sensor chip 18f affixed to the surface 18g of the diaphragm 18n is made of a monocrystal silicon substrate 18r which has a plane direction of (100) and an uniform thickness. The pressure sensor chip 18f is secured at the bottom thereof to the surface 18g of the diaphragm 18n through a glass layer 18k made from a low-melting glass material. The silicon substrate 18r is 3.56 mm×3.56 mm in square and 0.2 mm in thickness. The glass layer 18k is 0.06 mm in thickness.

The pressure sensor chip 18f is equipped with four rectangular gauges 18m. The gauges 18m are each implemented by a piezoresistor. The silicon substrate 18r whose plane direction is (100) structurally has orthogonal crystal axes <110>.

The gauges 18m are disposed two along each of the orthogonal crystal axes <110>. Two of the gauges 18m are so oriented as to have long side thereof extending in the X-direction, while the other two gauges 18m are so oriented as to have short sides extending in the Y-direction. The four gauges 18m are, as can be seen from FIG. 22(a), arrayed along a circle whose center lies at the center k of the diaphragm 18n.

Figure 23A:
FIGS. 23(a), 23(b), and 23(c) are sectional views which show a sequence of process of producing a pressure sensor chip affixed to the stem of FIG. 22(b)
Figure 23B:
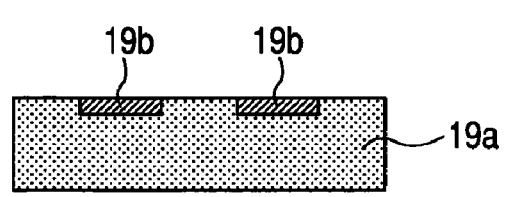
Figure 23C:
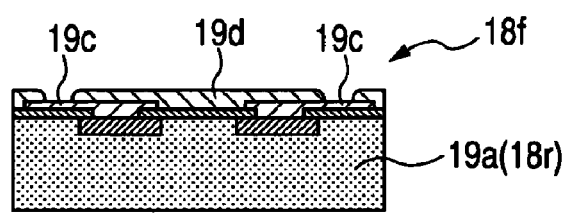

The pressure sensor chip 18f also has wires and pads (not show) which connect the gauges 18m together to make a typical bridge circuit and make terminals to be connected to an external device (i.e., the ECU 107). The bridge circuit is covered with a protective film. The pressure sensor chip 18f is substantially manufactured in the following steps, as demonstrated in FIGS. 23(a) to 23(c). First, an n-type sub-wafer 19a is prepared. A given pattern is drawn on the sub-wafer 19a through the photolithography. Subsequently, boron is diffused over the sub-wafer 19a to form p+ regions 19b that are piezoresistors working as the gauges 18m. Wires and pads 19c are formed on the sub-wafer 19a, as illustrated in FIG. 23(c). An oxide film 19d is also formed over the surface of the sub-wafer 19a to secure electric insulation of the wires and the pads 19c, Finally, a protective film is also formed over the surface of the sub-wafer 19a and then etched to expose the pads to outside the sub-wafer 19a. The pressure sensor chip 18f thus produced is glued to the diaphragm 18n of the metal stem 74 using the low-melting glass 18k to complete the pressure sensor chip 18f.

The diaphragm 18n is flexed when subjected to the pressure of fuel entering the pressure sensing chamber 18b of the metal stem 74. The pressure sensor chip 18f is responsive to the flexing of the diaphragm 18n to convert it into an electric signal (i.e., a difference in potential of the bridge circuit arising from a change in resistance of the piezoresistors or gauges 18m). The sensor signal processing circuit mounted on the ceramic board 76 processes the signal, as produced by the pressure sensor chip 18f, and output it to the ECU 107. The sensor signal processing circuit may be fabricated monolithically on the pressure sensor chip 18f.

As described above, the inlet body 70 equipped with the fuel pressure sensor 80 is designed to be separate from the injector body (i.e., the assembly of the lower body 11 and the nozzle body 12) and joined to the injector body mechanically. This structure enables the operation of the pressure sensor chip 18f to be diagnosed before the inlet body 70 is fixed to the injector body. If a failure in operation of the pressure sensor chip 18f is found, it may be replaced. For example, the metal stem 74 or the ceramic board 76 may be replaced before installed in the fuel injector 2. It is, therefore, possible to install only the inlet bodies 70 in which the fuel pressure sensors 80 have been checked to operate properly to the injector bodies of the fuel injectors 2, thereby improving the fabrication yield of the fuel injectors 2.

The inlet body 70 is secured to a portion of the injector body which is far from the spray hole 12b. Specifically, the inlet body 70 is designed to be disposed between the high-pressure pipe 105 and the injector body, thus facilitating the ease of installation of the inlet body 70 to the injector body. The inlet body 70 is joined to a portion of the injector body which is farther away from the spray holes 12b than the pressure control chambers 8 and 16c, thus facilitating the laying out of signal wires joined to the fuel pressure sensor 80 in the inlet body 70 and improving the productivity of the fuel injectors 2 further.

In use, the fuel injector 2 is partially disposed in the engine cylinder, so that mechanical vibrations arising from the combustion of fuel in the cylinder are transmitted over the length of the injector body. If the diaphragm 18n of the fuel pressure sensor 80 is oriented perpendicular to the direction in which the vibrations are transmitted (i.e., the length of the injector body), the direction in which the diaphragm 18n deforms will coincide with that in which the vibrations are transmitted. This causes the vibrations to be added as an electrical noise to the output of the fuel pressure sensor 80. In order to eliminate such a problem, the inlet body 70 is, as described above, oriented at, for example, 60° to the length of the injector body. Additionally, the metal stem 74 is also mounted in the upper surface of the inlet body 70 so as to have the length perpendicular to the length of the inlet body 70. This orients the surface of the diaphragm 18n at, for example, 60° to the length of the injector body. In this case, the vibrations will be reduced by sin 60° times (≈0.86) in degree, thus resulting in a decrease in electrical nose added to the output of the fuel pressure sensor 80.

The inlet body 70 is designed to be equipped with the metal stem 74 in which the diaphragm In is formed, thus facilitating the ease of machining the diaphragm 18n, especially controlling the thickness thereof as compared with when the diaphragm 18n is formed directly in the injector body. This improves the accuracy in measuring the pressure of fuel in the fuel injector 2. The diaphragm 18n is the most thin in the wall of the metal stem 74 defining the pressure sensing chamber 18b, thus resulting in great deformation of the diaphragm 18n arising from a change in pressure of the fuel.

When the metal stem 74 is fitted in the pressure inlet path 75, the outermost portion 220 of the sensor chip 18f or the metal stem 74 in the radial direction of the inlet body 70 is located inside, as can be seen from FIG. 20(c), the radially outermost portion 210 of the outer wall of the inlet body 70 (i.e., an outer peripheral edge of the recess 175) which defines the recess 175 in the inlet body 70, thus avoiding the removal of or physical damage to the pressure sensor chip 18f when the inlet body 70 is fixed to the injector body.

The branch path 78 which is smaller in diameter than the pressure sensing chamber 18b of the metal stem 74 to function as an orifice is formed between the fuel inlet path 73 of the inlet body 70 and the pressure sensing chamber 18b, thus resulting in a decrease in variation in pressure of the fuel introduced into the metal stem 74.

The retaining nut 71 which establishes a joint between the inlet body 70 and the lower body 11 has formed therein the connector opening 71c into which the electric connector is to be inserted to make an electric connection with the metal stem 74. This permits the superficial area of the retaining nut 71 to be increased to enhance the strength of the joint between the inlet body 70 and the lower body 11 without sacrificing the electric connection between the fuel pressure sensor 80 and the ECU 107.

The inlet body 70, as already described, serves as a connector to connect or retain the fuel pressure sensor 80 to the lower body 11 of the fuel injector 2. The fuel inlet path 73 and the branch path 78 define a fuel path through which the fuel, has entered the fuel injector 2, is directed partially to the fuel pressure sensor 80.

The fourteenth embodiment of the invention will be described below with reference to FIG. 24. The same reference numbers, as employed in the thirteenth embodiment, will refer to the same parts, and explanation thereof in detail will be omitted here.

Figure 24:
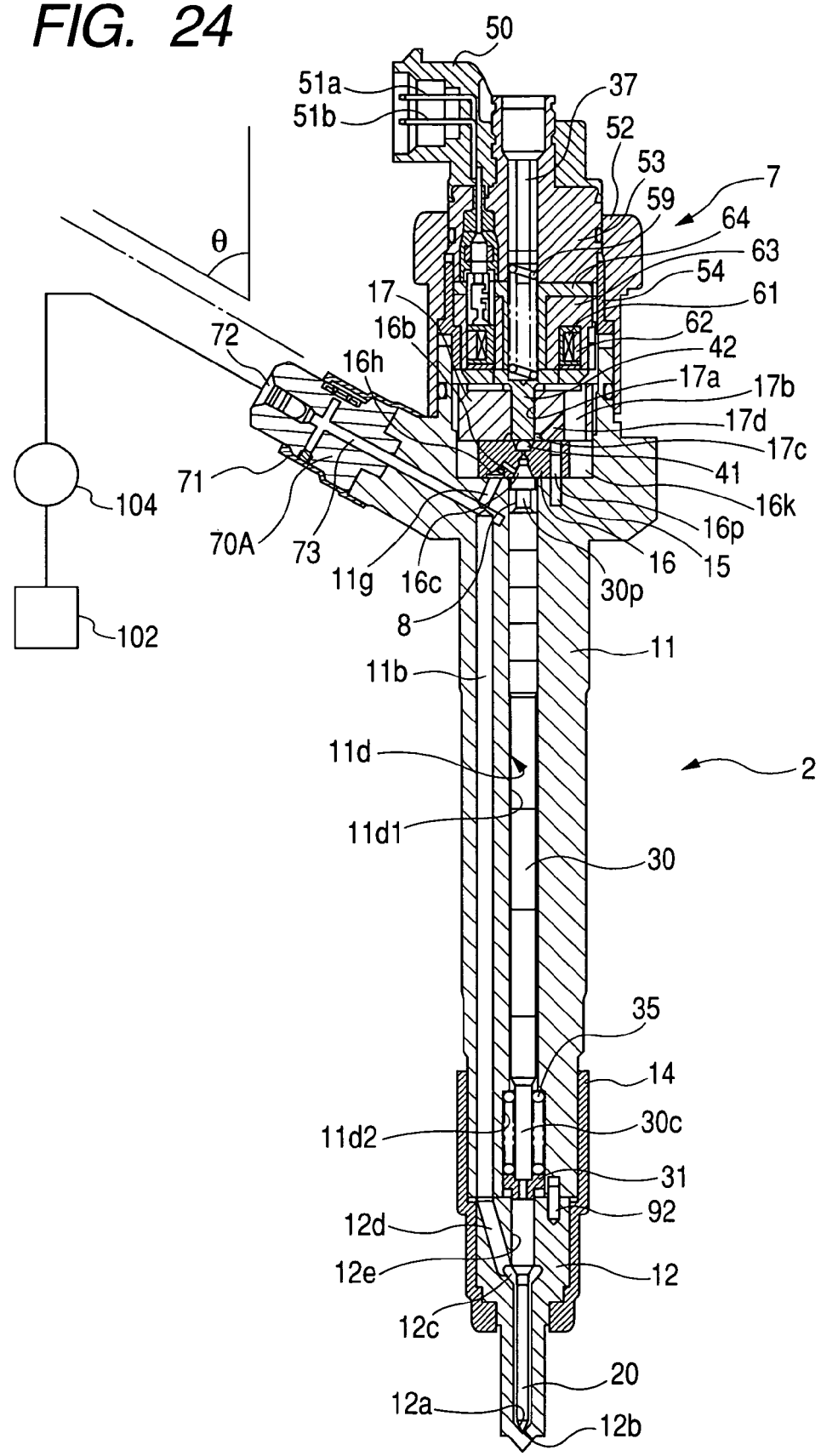
FIG. 24 is a longitudinal sectional view which shows an internal structure of a fuel injector installed in the accumulator fuel injection system of FIG. 17 according to the fourteenth embodiment of the invention.
Figure 25A:
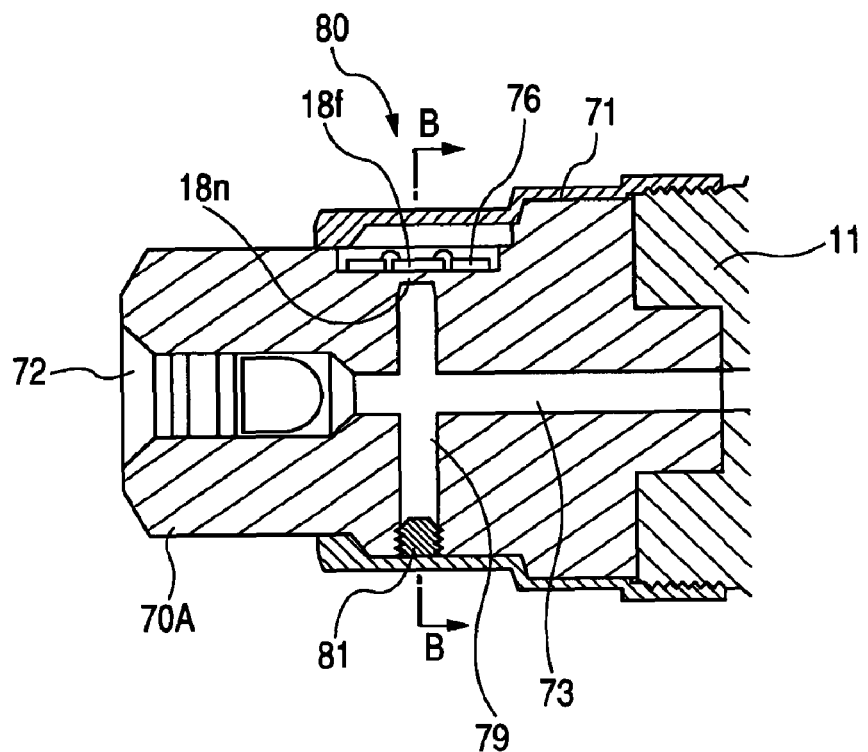
FIG. 25(a) is a partially longitudinal sectional view, as taken along the line A-A in FIG. 25(b), which shows an internal structure of an inlet body joined to the fuel injector of FIG. 24.
Figure 25B:
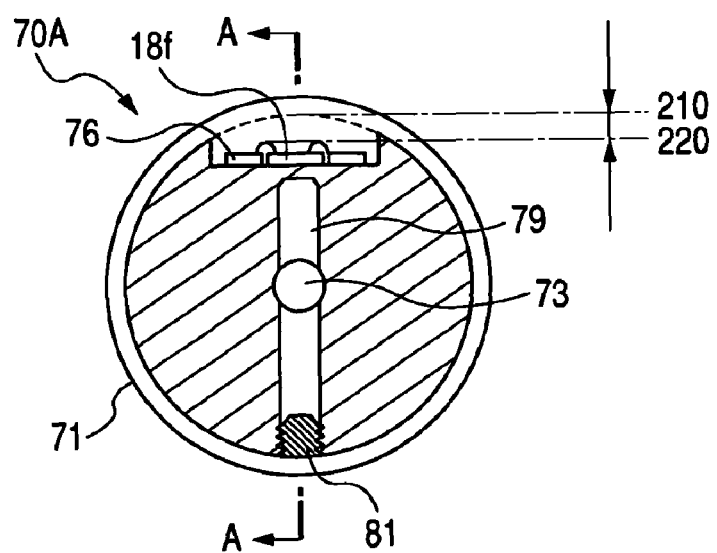
FIG. 25(b) is a transverse sectional view, as taken along the line B-B in FIG. 25(a), which shows the inlet body of FIG. 25(a)

FIG. 24 is a longitudinal sectional view which shows an internal structure of fuel injectors 2 to be installed in the fuel injection system 100 of FIG. 17. FIGS. 25(a) and 25(b) are a longitudinal sectional view and a transverse sectional view which show an internal structure of the inlet body 70A to be joined to the fuel injector 2 of FIG. 24.

The inlet body 70A, unlike in the thirteenth embodiment, does not have the metal stem 74 and is designed to have the diaphragm 18n formed therein.

The inlet body 70A, as illustrated in FIGS. 25(a) and 25(b), has formed on an outer surface thereof a flat area (which will also be referred to as a chip-mount surface below) on which the pressure sensor chip 18f is mounted. A hole 79 is formed in the inlet body 70A and traverses the fuel inlet path 73 radially. The hole 79 extends from the outer surface of the inlet body 70A perpendicular to the fuel inlet path 73 to beneath the chip-mount surface on which the pressure sensor chip 18f is mounted, thereby defining a thickness between the end of the hole 79 and the chip-mount surface as the diaphragm 18n.

The thickness of the diaphragm 18n may be controlled by using a rangefinder during the production of the inlet body 70A. After the diaphragm 18n is machined, the open end of the hole 79 is closed hermetically by fastening a screw 81 into a threaded inner wall of the hole 79.

Other arrangements are identical with those in the thirteenth embodiment, and explanation thereof in detail will be omitted here.

The fifteenth embodiment of the invention will be described below with reference to FIG. 26. The same reference numbers, as employed in the thirteenth embodiment, will refer to the same parts, and explanation thereof in detail will be omitted here.

Figure 26:
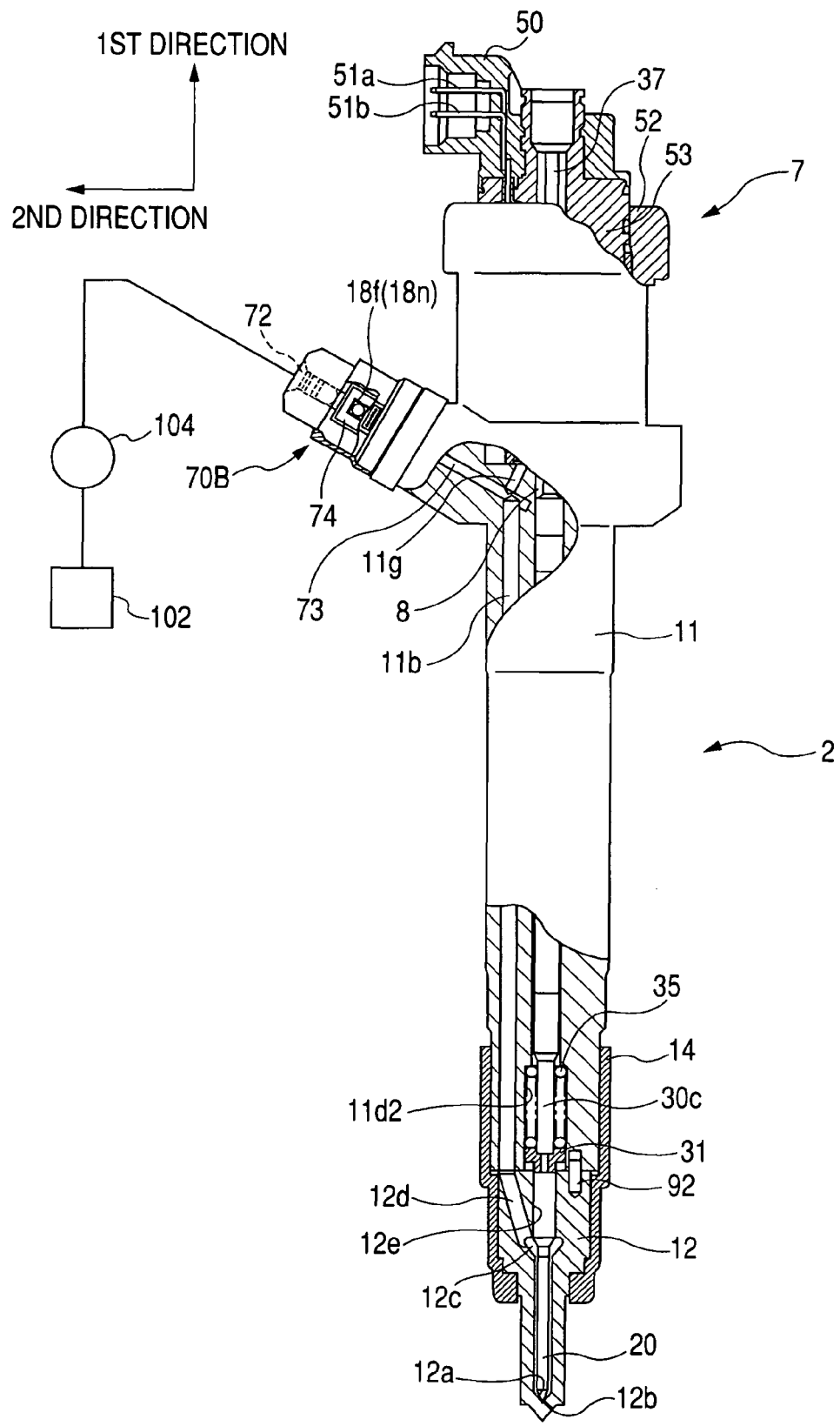
FIG. 26 is a longitudinal sectional view, as taken along the line A-A in FIG. 27(b), which shows an internal structure of a fuel injector installed in the accumulator fuel injection system of FIG. 17 according to the fifteenth embodiment of the invention.

FIG. 26 is a partially sectional view which illustrates the fuel injector 2 to be installed in the fuel injection system 100 of FIG. 17. An assembly of the lower body 11 and the nozzle body 12, like in the thirteenth embodiment, forms the injector body. An inlet body 70B is joined to a portion the injector body which is far from the spray hole 12b. The inlet body 70B, like in the thirteenth and fourteenth embodiments, works as a connector to make a mechanical connection of the fuel pressure sensor 80 to the fuel injector 2.

The inlet body 70B has formed therein the fuel inlet 72 to be joined to the common rail 104 through the high-pressure pipe 105, as illustrated in FIG. 17, and the fuel inlet path 73 extending from the fuel inlet 72 to the fuel supply path 11b. The inlet body 70B has a length extending at an angle of for example, 60° to the longitudinal center line or length of the injector body 11 (i.e., the fuel supply path 11b.

The inlet body 70B is identical in structure with the inlet body 70 of the thirteenth embodiment. Specifically, the stem 74 equipped with the diaphragm 18n and the pressure sensor chip 18f is installed in the inlet body 70B.

However, if the axial direction (i.e., the lengthwise direction) of the injector body (i.e., the lower body 11) is defined as a first direction, and a radial direction of the injector body (i.e. the lower body 11) oriented toward the length of the fuel inlet path 73 of the inlet body 70B, that is, extending perpendicular to the first direction is defined as a second direction, a plane of the chip-mount surface of the inlet body 703 on which the pressure sensor chip 18f is mounted (in other words, the surface of the diaphragm 18n) extends at an angle greater than or equal to 0° and smaller than or equal to 30° to a plane, as defined to extend through the first and second directions. In this embodiment illustrated in FIG. 26, the chip-mount surface is oriented parallel to the first and second directions.

In use, the fuel injector 2 is, as described above, partially disposed in the engine cylinder, so that mechanical vibrations arising from the combustion of fuel in the cylinder are transmitted over the length of the injector body. Further, the pressure of fuel, as supplied from the common rail 104, is exerted on the fuel inlet 72 that is the end of the inlet body 70B. A variation in movement of the fuel through the high-pressure pipe 105 arising from sequential start and stop of spraying of the fuel from the fuel injector 2, therefore, results in minute vibrations transmitted in the second direction.

If the diaphragm 18n of the fuel pressure sensor 80 is oriented perpendicular to the first and second directions, the direction in which the diaphragm 18n deforms will coincide with that in which the vibrations are transmitted. This causes the vibrations to be added as an electrical noise to the output of the fuel pressure sensor 80.

The chip-mount surface of the inlet body 70B (i.e., the plane of the diaphragm 18n) is, as described above, oriented at an angle of 0° to 30° to the plane extending in the first and second directions. In this embodiment, the plane of the diaphragm 18n extends at an angle of 0° in the first and second directions. This causes the vibrations arising from the combustion of fuel in the engine cylinder and the variation in flow of fuel inputted to the fuel injector 2 to be reduced by sin 30° times (≈0.5) or less in degree, thus resulting in a decrease in electrical nose added to the output of the fuel pressure sensor 80.

The plane of the diaphragm 18n of this embodiment extends parallel to the first and second directions, thus resulting in a decrease in the electrical noise to almost zero (0), which improves the accuracy in measuring the pressure of fuel in the fuel injector 2.

The chip-mount surface of the inlet body 70B on which the pressure sensor chip 18f is mounted is oriented parallel to the length of the injector body, that is, formed on a side wall of the inlet body 70B, thus facilitating the joining of the electrical connector to the connector pins of the pressure sensor chip 18f.

The inlet body 70B may alternatively be designed, like in the fourteenth embodiment, to have the diaphragm 18n formed directly therewithin as long as the chip-mount surface of the inlet body 70B on which the pressure sensor chip 18f is mounted is oriented at an angle greater than or equal to 0° and smaller than or equal to 30° to the plane extending in the first and second directions.

The sixteenth embodiment of the invention will be described below with reference to FIGS. 27(a) and 27(b). The same reference numbers, as employed in the thirteenth embodiment, will refer to the same parts, and explanation thereof in detail will be omitted here.

Figure 27A:
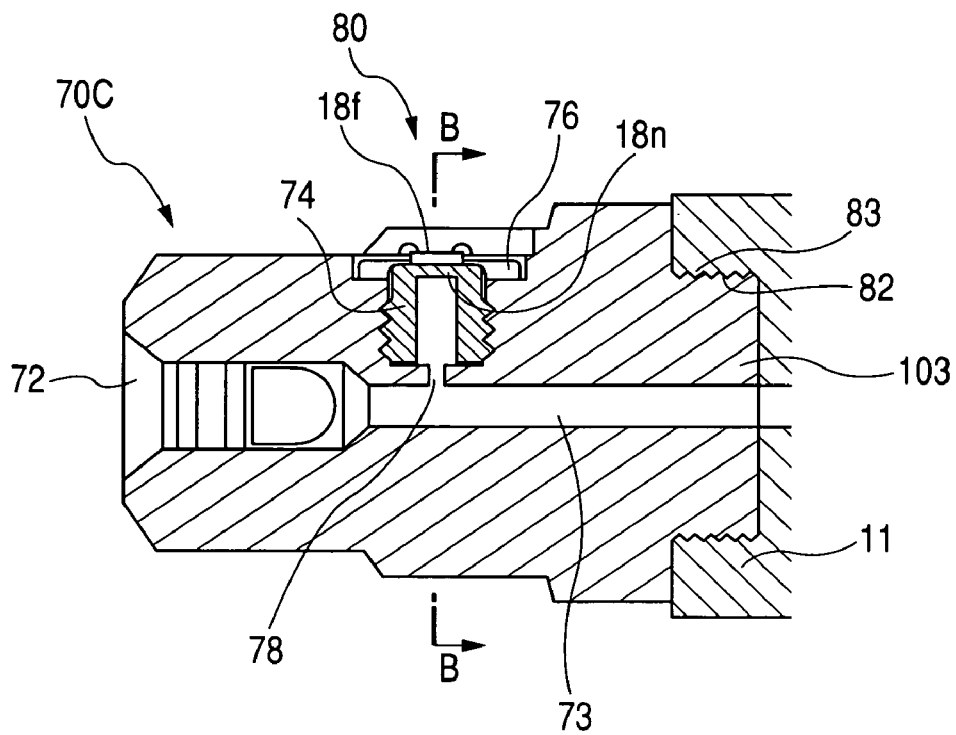
FIG. 27(a) is a partially longitudinal sectional view, as taken along the line B-B in FIG. 27(a), which shows an internal structure of an inlet body joined to the fuel injector of FIG. 26.
Figure 27B:
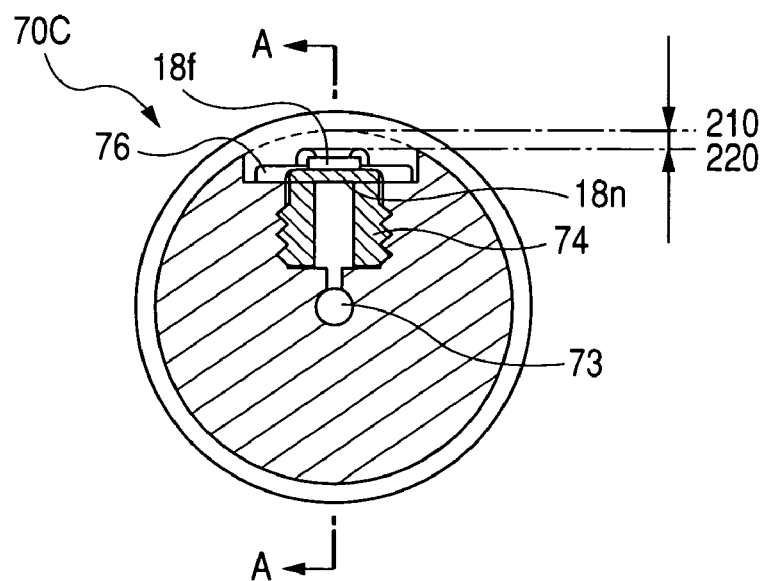
FIG. 27(b) is a transverse sectional view which shows the inlet body of FIG. 27(a)

FIGS. 27(a) and 27(b) are a longitudinal sectional view and a transverse sectional view which show an internal structure of the inlet body 70C to be joined to the fuel injector 2 of FIG. 18. In the thirteenth embodiment, the retaining nut 71 of a stepped shape is used to joint the inlet body 70 to the injector body, while in this embodiment, the joining of the inlet body 70C to the injector body is achieved by fastening an external thread 82 formed on the circumference of a boss 103 on the end of the inlet body 70C into an internal thread 83 formed in an inner wall of the lower body 11.

A gasket made of, for example, hard rubber may be disposed between the inlet body 70C and the lower body 11 in order to ensure the stability of joining and hermetical sealing therebetween. The threads 82 and 83 are so formed preferably that when the threads 82 and 83 are tightened fully, the chip-mount surface of the inlet body 70C on which the pressure sensor chip 18f is mounted is always placed in a given angular position.

The structure of the inlet body 70C eliminates the need for the retaining nut 71 to make a joint to the lower body 11, thus resulting in a decrease in parts of the fuel injector 2.

Figure 28A:
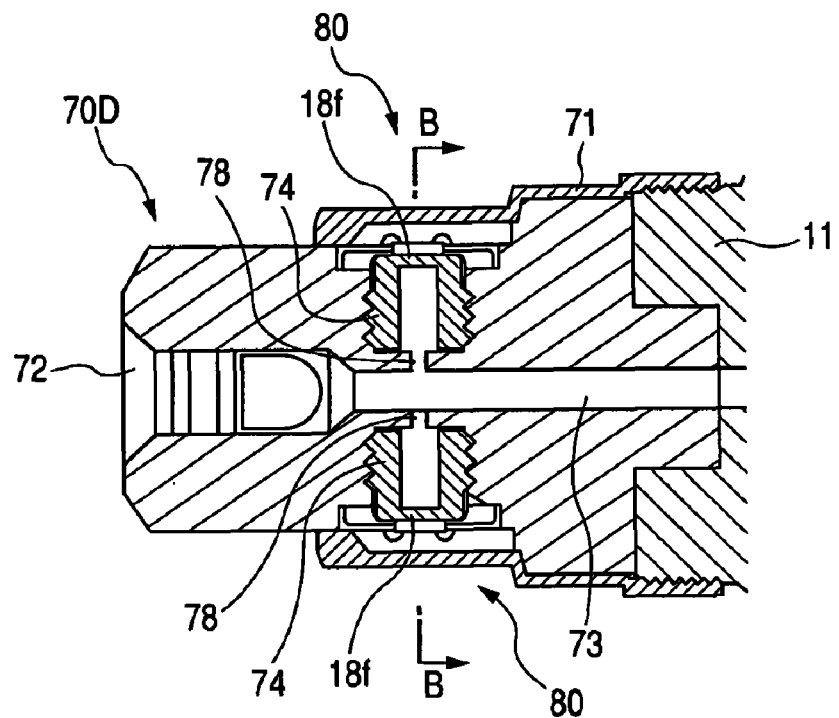
FIG. 28(a) is a partially longitudinal sectional view, as taken along the line B-B in FIG. 28(a), which shows an internal structure of an inlet body according to the seventeenth embodiment of the invention which is joined to the fuel injector of FIG. 26.
Figure 28B:
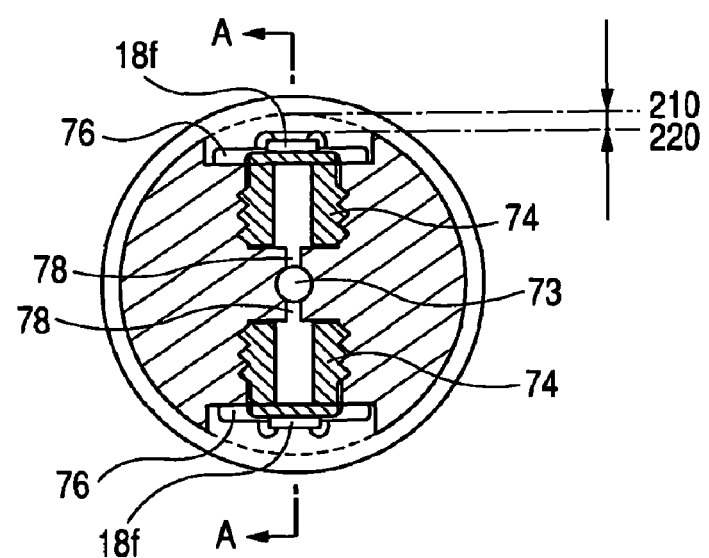
FIG. 28(b) is a transverse sectional view, as taken along the line B-B in FIG. 28(a), which shows the inlet body of FIG. 28(a)

The seventeenth embodiment of the invention will be described below with reference to FIGS. 28(a) and 28(b) which is a modification of the structure of the thirteenth embodiment. The same reference numbers, as employed in the thirteenth embodiment, will refer to the same parts, and explanation thereof in detail will be omitted here.

The inlet body 70D to be joined to the lower body 11 of the fuel injector 2 is designed to be equipped with a plurality of fuel pressure sensors 80. Specifically, two metal stems 74 are mounted in the inlet body 70D. The branch paths 78 are formed in the inlet body 70D to establish fluid communications between the fuel inlet path 73 and the metal stems 74. Each of the metal stems 74 is identical in structure with the one in FIGS. 20(a) to 20(c) and FIGS. 22(a) and 22(b), and explanation thereof in detail will be omitted here.

The two metal stems 74 are opposed diametrically to each other across the fuel inlet path 73. The pressure sensing chamber 18b, as illustrated in FIG. 22(b), of each of the metal stems 74 communicates with the fuel inlet path 73 through the branch path 78 to have the diaphragm 18*n* exposed to the high-pressure fuel. The metal sterns 74 are preferably identical in size or measurement with each other in order to ensure the identify of outputs from the pressure sensor chips 13*f*.

The use of a plurality of the fuel pressure sensors 80 compensates for the reliability in operation thereof mutually. If one of the pressure sensors 80 has failed in operation, the outputs from the other fuel pressure sensor(s) 80 may be used to determine the pressure of fuel in the fuel injector 2 in the ECU 107.

Figure 29A:
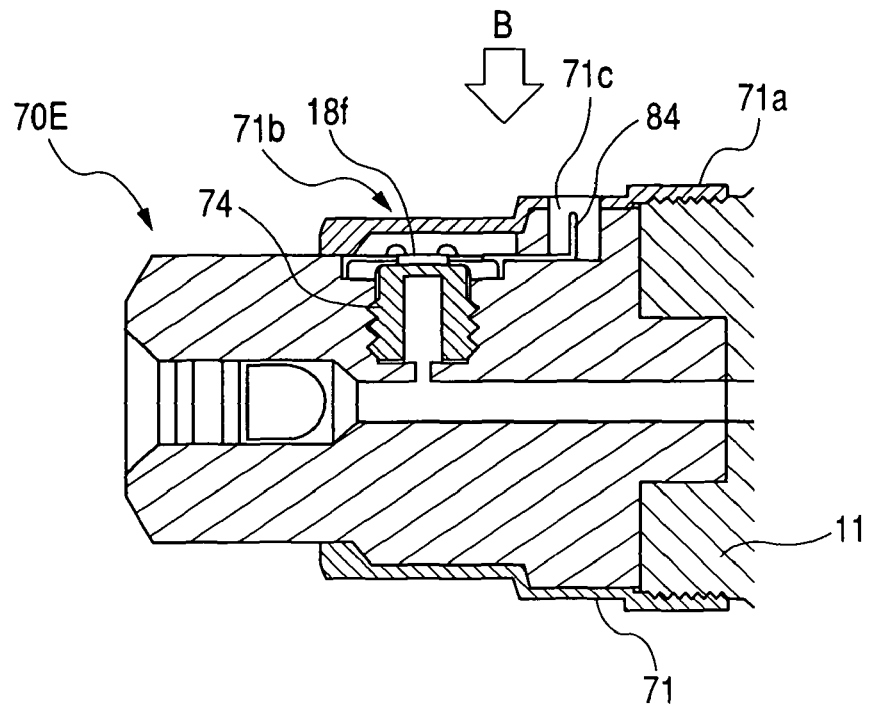
FIG. 29(a) is a partially longitudinal sectional view which shows an internal structure of an inlet body according to the eighteenth embodiment of the invention which is joined to the fuel injector of FIG. 26.
Figure 29B:
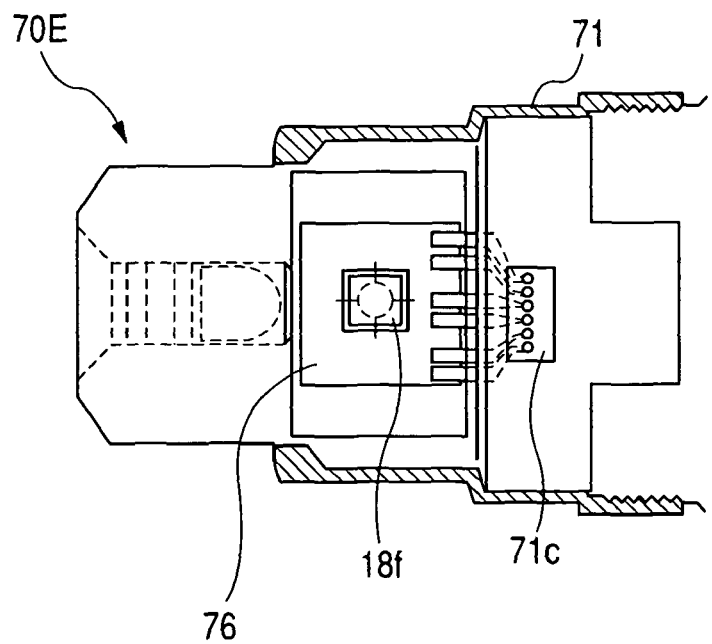
FIG. 29(b) is a transverse sectional view which shows the inlet body of FIG. 29(a)

The eighteenth embodiment of the invention will be described below with reference to FIGS. 29(*a*) and 29(*b*) which is a modification of the structure of the thirteenth embodiment. The same reference numbers, as employed in the thirteenth embodiment, will refer to the same parts, and explanation thereof in detail will be omitted here.

In the thirteenth embodiment, the ceramic board 76 has installed thereon the connector pins 77 which are to be joined to the electric connector through the connector opening 71*c* formed in the covering portion 71*b* of the retaining nut 71. The inlet body 70E of this embodiment is made of an electrically insulating hard resin such as epoxy resin and has connector pins 84 formed therein by insert-molding. The connector pins 84 are joined at ends thereof to conductors printed on the ceramic board 76. The connector opening 71*c* is formed in the fastening portion 71*a* of the retaining nut 71.

The connector pins 84 are, as described above, fabricated integrally in the inlet body 70E, thus ensuring the fixing of the connector pins 84 to facilitate the ease of connection with the electric connector and the stability of joining between the connector pins 84 and with the electric connector.

The nineteenth embodiment of the invention will be described below with reference to FIGS. 30 and 31. The same reference numbers, as employed in the thirteenth to eighteenth embodiments, will refer to the same parts, and explanation thereof in detail will be omitted here.

The fuel injectors 2 of the thirteenth to eighteenth embodiments have the inlet body is joined to the end of the lower body 11 which is far from the spray hole 12*b*, while the fuel injectors 2 of this embodiment is designed to have an inlet body 70F joined to one of axially-opposed ends of a length of the injector body.

The fuel injector 2, like in the thirteenth embodiment, works to spray fuel into an internal combustion engine (not shown) such as an automotive diesel engine and is controlled in operation by the accumulator fuel injection system 100, as illustrated in FIG. 17. Specifically, the ECU 107 controls the fuel injection pump 103 to pump fuel out of the fuel tank 102 and deliver it to the common rail 104. The common rail 104 accumulates the fuel therein at a controlled pressure and supplies the fuel to each of the fuel injectors 2. The ECU 107 controls the spraying of the fuel from each of the fuel injectors 2.

Figure 30:
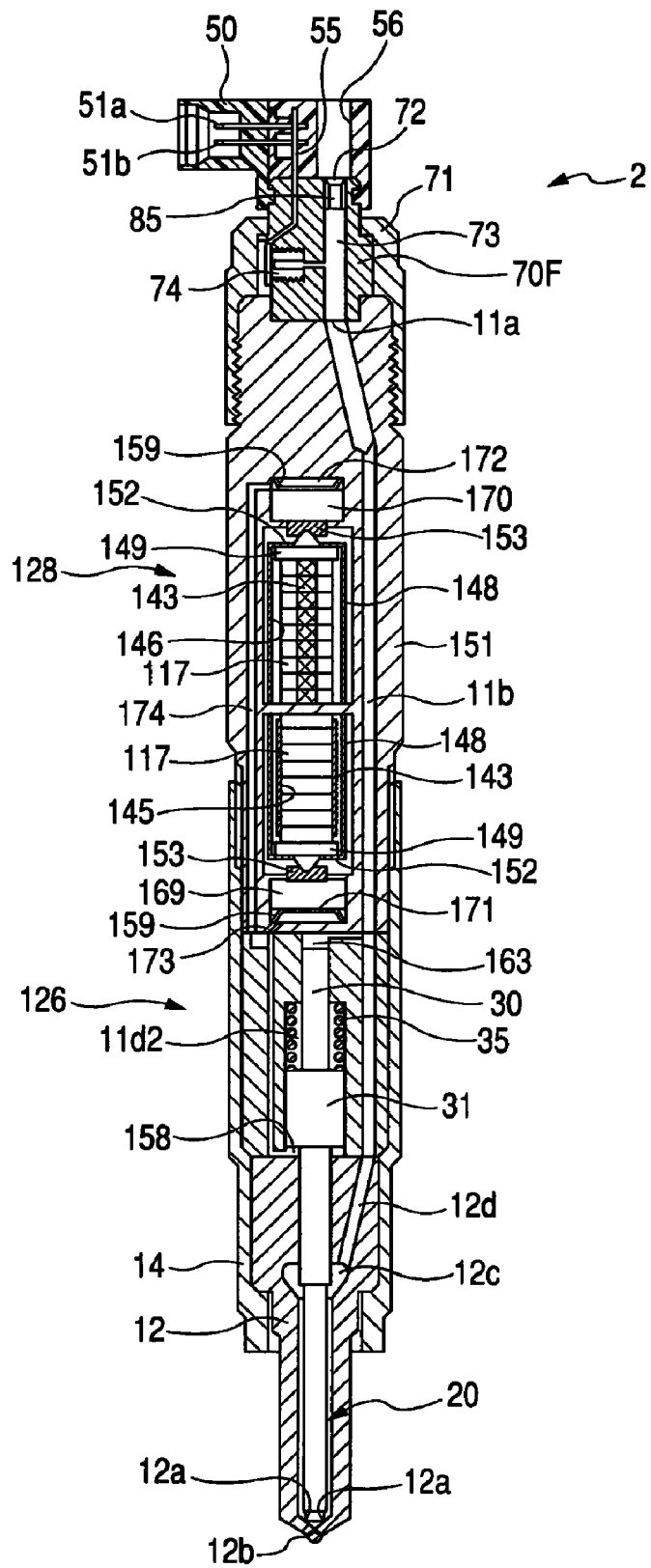
FIG. 30 is a longitudinal sectional view which shows an internal structure of a fuel injector installed in the accumulator fuel injection system of FIG. 17 according to the nineteenth embodiment of the invention.

The fuel injector 2, as can be seen in FIG. 30, includes the nozzle needle 20, the piezo-actuators 145 and 146, and the spring 35 working as a valve-closing mechanism. The nozzle needle 20 is disposed within the nozzle body 12 to be slidable to open or close the spray hole 12*b*. When charged, each of the piezo-actuators 145 and 146 expands to produce thrust force (i.e., drive force) which is, in turn, transmitted through a drive force transmission mechanism, as will be described later, to the nozzle needle 20. The spring 35 urges the nozzle needle 20 in the valve-closing direction in which the spray hole 12*b* is closed.

The fuel injector 2 consists essentially of a main body 126, an actuating mechanism 128, and the nozzle body 12 which are joined together by the retaining nut 14. The main body 126 has installed therein the control piston 30 and the cylinder 31. The control piston 30 and the cylinder 31 constitute the part of the valve-closing mechanism. The actuating mechanism 128 has installed therein first and second piezo-pistons 169 and 170 which constitute the part of the drive force transmission mechanism. The nozzle body 12 has the nozzle needle 20 installed therein and is secured to the top end of the main body 126.

The nozzle needle 20 is slidable in the axial direction of the fuel injector 2 to open or close the spray hole 12*b*. The nozzle needle 20 has a tapered head. The nozzle body 12 has formed therein the valve seat 12*a* on which the tapered head of the nozzle needle 20 is to be seated to close the spray hole 12*b*. The nozzle needle 20 has a rear portion borne by the nozzle body. The read end of the nozzle needle 20 is placed in contact abutment with a top end surface of the cylinder 30, so that the nozzle needle 20 is urged by and moved along with the cylinder 31 in the valve-closing, direction.

The nozzle body 12 also has the fuel sump 12*c* in which the high-pressure fuel to be supplied to the spray hole 12*b* is accumulated, a guide hole communicating between the fuel sump 12*c* and the spray hole 12*b*, and the fuel feeding path 12*d* through which the high-pressure fuel flows to the fuel sump 12*c*.

Each of the piezo-actuators 145 and 146 is made of a stack of piezoelectric plates 117. Each of the piezoelectric plates 117 has an inner electrode formed by evaporating and depositing conductive material on one of opposed major surfaces thereof. Two outer electrodes 143 are affixed, one to each of opposed side surfaces of the stack of the piezoelectric plates 117. Each of the outer electrodes 143 makes an electrical connection between alternate ones of the piezoelectric plates 117.

When voltage is applied to the stack of the piezoelectric plates 117 of each of the first and second piezo-actuators 145 and 146, it expands in a lengthwise direction thereof to develop a stroke. The amount of stroke of the stack of the piezoelectric plates 117 depends upon the degree of voltage applied thereto. The amount of stroke, as referred to herein, is an amount by which each of the first and second piezo-actuators 145 and 146 expands as a whole.

Each of the first and second piezo-actuators 145 and 146 is disposed within a hollow cylinder 148 in contact therewith and retained within the actuator body 151 while being pressed by a press member 149. An elastic film 152 is fit in an end of each of the hollow cylinder 148 to create a hermetic seal. Each of the press members 149 presses a corresponding one of the first and second piezo-actuators 145 and 146 through the elastic film 152 and an adjustment shim 153 to transmit the drive force, as produced by the one of the first and second piezo-actuators 145 and 146 to a corresponding one of the first and second piezo-pistons 169 and 170.

The drive force transmission mechanism includes the first and second piezo-pistons 169 and 170 which are moved by the drive force transmitted from the first and second piezo-actuators 145 and 146. The drive force transmission mechanism works to amplify and transmit the movement of the first and second piezo-pistons 169 and 170 hydraulically as the drive force to the control piston 30 and the cylinder 31 through the fuel.

The amplification of the movement of the first and second piezo-pistons 169 and 170 is based on Pascal's law. Specifically, the driver force transmission mechanism includes first and second piezo-pressure chambers 171 and 172 and first and second fuel flow paths 173 and 174. The fuel in each of the first and second piezo-pressure chambers 171 and 172 are elevated in pressure by the movement of a corresponding one of the first and second piezo-pistons 169 and 170. The elevated pressure of the fuel is transmitted to a booster chamber 158 through the first and second fuel flow paths 173 and 174. The booster chamber 158 is defined by the end of the nozzle body 12 within the main body 126, so that the pressure of the fuel in the booster chamber 158 is exerted on the end of the cylinder 31. Specifically, the movement of the first and second piezo-pistons 169 and 170 is amplified and transmitted hydraulically to the cylinder 31 through the first and second piezo-pressure chambers 171 and 172, the first and second fuel flow paths 173 and 174, and the booster chamber 158. The amplification of the movement of the first and second piezo-pistons 169 and 170 depends upon a ratio of a pressure-transmitting area to a pressure-exerted area (i.e., the pressure-transmitting area/the pressure-exerted area) where the pressure-transmitting area is an area of the ends of the first and second piezo-pistons 169 and 170 which pressurize the fuel within the first and second piezo-pressure chambers 171 and 172, and the pressure-exerted area is an area of a portion of the end of the cylinder 31 on which the pressure of the fuel in the booster chamber 158 is exerted directly, that is, an area of the whole of the top end (i.e., the lower end, as viewed in FIG. 30) of the cylinder 31 minus an area of the whole of the rear end (i.e., the upper end, as viewed in FIG. 30) of the nozzle needle 20.

The top end of the cylinder 31 is exposed directly to the booster chamber 158, so that the pressure of fuel in the booster chamber 150 urges the cylinder 31 in the valve-opening direction in which the nozzle needle 20 is lifted up to open the spray hole 12b. The amount of lift of the nozzle needle 20 depends upon the amount of strokes of the first and second piezo-actuators 145 and 146.

Disc springs 159 are disposed in the first and second piezo-pressure chambers 171 and 172 to urge the first and second piezo-pistons 169 and 170 into abutment with the first and second piezo-actuators 145 and 146, respectively. Each of the disc springs 159 functions as a return spring to apply a given initial pressure to the stack of the piezoelectric plates 117 to avoid the breakage arising from over-expansion thereof. Instead of the disc springs 159, coil springs may be employed.

The valve-closing mechanism includes the spring 35, the control piston 30, and the cylinder 31. The spring 35 is disposed on the rear end of the cylinder 31 to urge it in the valve-closing direction. The control piston 30 is urged hydraulically by the pressure of fuel in the control piston-pressure chamber 163 into abutment with the cylinder 31 and push the cylinder 31 in the valve-closing direction. The cylinder 31 is placed in contact abutment with the rear end of the nozzle needle 20 and transmit the sum of pressures, as produced by the feel in the control piston-pressure chamber 163 and the spring 35, to the nozzle needle 20. Specifically, the valve-closing mechanism works to exert the pressures, as produced by the fuel in the control piston-pressure chamber 163 and the spring 35, on the nozzle needle 20 and urge it in the valve-closing direction. The valve-closing mechanism also works to exert the pressure of fuel in the booster chamber 158 on the cylinder 31 in the valve-opening direction to permit the nozzle needle 20 to be lifted up to open the spray hole 12b.

The control piston-pressure chamber 163 communicates with the fuel supply path 11b and is exposed to the high-pressure fuel at all the time. To the spring chamber 11d2 in which the spring 35 is disposed, the fuel leaks from the control piston-pressure chamber 163 and the booster chamber 158 and is, in turn, drained to the fuel tank 102 through a fuel drain path (not shown).

The operation of the fuel injector 2 will be described below. When it is required to open the spray hole 12b, the first and second piezo-actuators 145 and 146 are energized by control signals from the ECU 107, so that the stacks of the piezoelectric plates 117 are charged to produce the drive forces, thereby moving the first and second piezo-pistons 169 and 170, respectively. This causes the pressure of fuel in the booster chamber 158 to be elevated in level, thereby transmitting the drive forces hydraulically to the cylinder 31 in the valve-opening direction. The pressure of fuel in the booster chamber 158 lifts up the cylinder 31 against the pressure, as produced by the spring 25, so that the nozzle needle 20 is moved upward to open the spray hole 12b to spray the fuel into the engine. The amount of lift of the nozzle needle 20, as described above, depends upon the amount of strokes of the first and second piezo-actuators 145 and 146. The injection rate of the fuel, thus, depends upon the amount of strokes.

When it is required to close the spray hole 12b, the ECU 107 stops to output the control signals to the first and second piezo-actuators 145 and 146. This causes the stacks of the piezoelectric plates 117 to be discharged, so that the drive forces, as produced by the first and second piezo-actuators 145 and 146, disappear. The pressure of fuel in the first and second piezo-pressure chambers 171 and 172 and the booster chamber 158 then drops to decrease the pressure urging the cylinder 31 ins the valve-opening direction against the pressure, as produced by the spring 35. When the pressure acting on the cylinder 31 in the valve-closing direction has exceeded that in the valve-opening direction, it will cause the nozzle needle 20 to be moved downward to close the spray hole 12b to terminate the spraying of the fuel into the engine.

The fuel injector 2, as already described, has the first piezo-piston 169 which is moved by the drive force produced by the first piezo-actuator 145 and the second piezo-piston 170 which is moved by the drive force developed by the second piezo-actuator 146. The first and second piezo-actuators 145 and 146 are, as described above, disposed in alignment within the hollow cylinders 148 in contact abutment with the press members 149, respectively. The first and second piezo-pistons 169 and 170 are pressed by the press members 149 through the elastic films 152 and the adjustment shims 153 and also to be moved by the drive forces produced by the first and second piezo-actuators 145 and 146, respectively.

The first and second piezo-pistons 169 and 170 transmit the drive forces produced by the first and second piezo-actuators 145 and 156 hydraulically to the nozzle needle 20. Specifically, the drive force transmission mechanism works to transmit the drive forces to the cylinder 31 through the first and second piezo-pistons 169 and 170 and also to amplify and transmit the movements of the first and second piezo-pistons 169 and 170 to the cylinder 31. The first and second piezo-pistons 169 and 170 define the first and second piezo-pressure chambers 171 and 172 within the main body 126 and work to elevate the pressures of fuel in the first and second piezo-pressure chambers 171 and 172. The elevated pressures are, in turn, transmitted to the booster chamber 158 through the first and second fuel flow paths 173 and 174 and exerted on the cylinder 31. The drive force transmission mechanism may, therefore, work to transmit the drive forces, as produced by the first and second piezo-actuators 145 and 146, and the amount of strokes of the first and second piezo-actuators 145 and 146 to the cylinder 31 independently.

The ratio of the pressure-transmitting area that is the sum of areas of the ends of the first and second piezo-pistons 169 and 170 which contribute to pressurize the fuel in the first and second piezo-pressure chambers 171 and 172 to the pressure-exerted area that is the area of a portion of the end of the cylinder 31 on which the pressure of the fuel in the booster chamber 158 is exerted directly may be changed by selecting one of the first and second piezo-pistons 169 and 170 which is to be energized to pressurize the fuel in a corresponding one of the first and second piezo-pressure chambers 171 and 172. Specifically, the degree of the drive force, as developed by the first and second piezo-actuators 145 and 146, and the amount of strokes of the first and second piezo-actuators 145 and 146 to be converted into the amount of lift of the cylinder 31 depend upon the above area ratio based on Pascal's law. The drive forces are amplified greatly as the area ratio is decreased, while the amount of strokes is amplified greatly as the area ratio is increased. Therefore, when a greater drive force is required to lift up the nozzle needle 20, for example, to initiate the injection of fuel into the engine, the ECU 107 may select one of the first and second piezo-actuators 145 and 146 which serves to move one of the first and second piezo-pistons 169 and 170 so as to decrease the area ratio more greatly in order to ensure the stability in opening the spray hole 12b. Alternatively, when a greater amount of lift of the nozzle needle 20 is required to assure a required quantity of fuel to be injected into the engine, for example, after the initiation of the injection of fuel, the ECU 107 may select one of the first and second piezo-actuators 145 and 146 which serves to move one of the first and second piezo-pistons 169 and 170 so as to increase the area ratio more greatly.

The fuel injector 2 may alternatively be designed to have only one of combinations of the first piezo-actuator 145 and the first piezo-piston 169 and the second piezo-actuator 146 and the second piezo-piston 170.

The structure of the inlet body 70F that is one of the features of the invention will be described below.

The inlet body 70F is, as can be seen in FIG. 30, joined to an upper end of the actuator body 151 (corresponding to the lower body 11, as referred to in the thirteenth embodiment) which is located farther from the spray hole 12b than the first and second piezo-pressure chambers 171 and 712. The actuator body 151 is the part of the injector body.

The actuator body 151 has a recess formed in an upper end thereof, as viewed in FIG. 30. The bottom of the recess has formed therein an opening 11a leading to the fuel supply path 11b. The actuator body 151 also has an external thread formed on a circumference of an upper end portion thereof.

Figure 31:
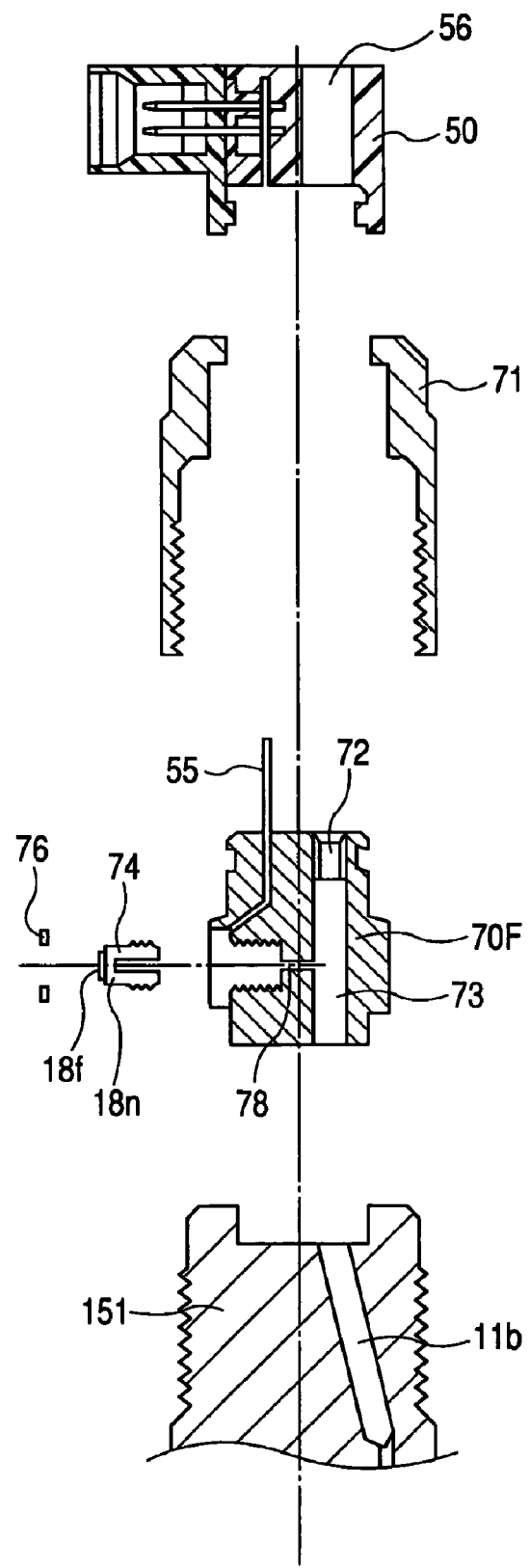
FIG. 31 is an exploded view which shows an end portion of the fuel injector of FIG. 30 in which a fuel pressure sensor is installed.

The inlet body 70F is, as can be seen in FIG. 31, designed to be separate from the injector body and to be joined detachably to the injector body (i.e., the actuator body 151). The inlet body 70F is made of a cylindrical block which has formed therein a fuel induction path 73 which establishes a fluid communication between the high-pressure pipe 105 to which the fuel is delivered from the common rail 104, as illustrated in FIG. 17, and the fuel supply path 11b in the actuator body 151. The inlet body 70F has also formed therein a fuel inlet 72 into which the fuel, as supplied from the common rail 14 and which leads to the fuel induction path 73. A bar filer 85 is, as shown in FIG. 30, installed in the fuel injection path 73.

The inlet body 70F is equipped with the metal stem 74 which has substantially the same structure as that in FIGS. 20(a) to 20(c). Specifically, the metal stem 74 has the diaphragm 18n to which the pressure sensor chip 18f is attached. The inlet body 70F has formed therein the branch path 78 through which the high-pressure fuel is introduced from the fuel induction path 73 to the pressure sensing chamber 18b of the metal stem 74.

The inlet body 70F has installed therein a plurality of terminals 55 which are insulated electrically from each other. Each of the terminals 55 is connected at an end thereof to the signal processing circuit of the pressure sensor chip 18f and at the other end to the terminal pin 51b of the connector 50. The connector 50 has a through hole 56 which is formed in coincidence with the fuel inlet 72 of the inlet body 70F and through which the high-pressure pipe 105 passes. Specifically, the high-pressure pipe 105 passes through the hole 56 and connects with the fuel inlet 72 of the inlet body 70F.

The inlet body 70F is, like in the thirteenth embodiment, joined firmly to the actuator body 151 through the cylindrical retaining nut 71. Specifically, the retaining nut 71 has formed therein an internal thread which engages the external thread of the actuator body 151 to make the firm joint of the inlet body 70F to the actuator body 151.

The inlet body 70F, like in the above embodiments, works as a connector to connect the fuel pressure sensor 80 (i.e., the metal stem 74) to the fuel injector 2.

While the present invention has been disclosed in terms of the preferred embodiments in order to facilitate better understanding thereof, it should be appreciated that the invention can be embodied in various ways without departing from the principle of the invention. Therefore) the invention should be understood to include all possible embodiments and modifications to the shown embodiment which can be embodied without departing from the principle of the invention as set forth in the appended claims.

In the first embodiment, the connection of the fuel injector INJz, the connector 70z, and the high-pressure pipe 50z to the internal combustion engine is, as described above, achieved by installing the fuel injector INJz into the engine, joining the connector 70z to the fuel injector INJz, and then coupling the high-pressure pipe 50z to the connector 70z. Such a connection may alternatively be achieved by preparing an assembly of the connector 70z joined to the fuel injector INJz and connecting the assembly to the engine or preparing an assembly of the connector 70z joined to the high-pressure pipe 50z and coupling the assembly to the fuel injector INJz already mounted in the engine. The same applies to the other embodiments.

In the first to twelfth embodiments, the connector 70z is joined to the high-pressure port 43z and the high-pressure pipe 50z through the metal-to-metal tough sealing, however, such joining may be achieved through mechanical seals such as gaskets.

The fuel pressure sensor 80 may alternatively be equipped with a piezoelectric device instead of the strain gauge to measure the deformation of the diaphragm 18n.

The invention may alternatively be used with fuel injectors to be installed in gasoline engines such as direct injection gasoline engines designed to inject the fuel directly into the combustion chambers E1z of the engine.

What is claimed is:

1. A fuel pressure sensor/sensor mount assembly for use in a fuel injection system equipped with a fuel injector which injects fuel, as supplied from an accumulator through a fuel pipe, into an internal combustion engine, comprising:
 a connector which is formed separately from and is to be disposed between the fuel injector and the fuel pipe and has formed therein a communication path which is to establish a fluid communication between a fuel outlet of the fuel pipe and a fuel inlet of the fuel injector, said connector also having formed therein a sensor mount exposed to the communication path; and
 a fuel pressure sensor mounted in the sensor mount of said connector, said fuel pressure sensor being sensitive to a pressure of the fuel in the communication path to produce a signal indicative thereof.

2. A fuel pressure sensor/sensor mount assembly as set forth in claim 1, further comprising a connection nut which has an injection-side thread formed on one of ends thereof for engagement with the fuel injector and a connector-side thread formed on the other of the ends for engagement with said connector, and wherein the injection-side thread and the connector-side thread are so mechanically oriented that tightening of the connection nut in a given direction causes the injection-side thread and the connector-side thread to establish the engagement with the fuel injector and said connector simultaneously.

3. A fuel pressure sensor/sensor mount assembly as set forth in claim 1, wherein said connector is to be retained between a top end portion of the fuel pipe in which the fuel outlet is formed and the fuel injector, further comprising a pipe nut which is to have the top end portion and said connector disposed therein and to establish threadable engagement with the fuel injector, and wherein said pipe nut includes a press member to press the top end portion against said connector through the threadable engagement of said pipe nut with the fuel injector.

4. A fuel pressure sensor/sensor mount assembly as forth in claim 3, wherein said fuel pressure sensor is disposed inside said pipe nut, and wherein one of the fuel injector and said pipe nut has formed therein a conductor outlet hole through which a conductive wire of said fuel pressure sensor extends from inside to outside said pipe nut.

5. A fuel pressure sensor/sensor mount assembly as forth in claim 1, wherein said connector has a thread which is fastened to the fuel injector, and wherein said connector is welded to the fuel injector to hold the connector from rotating relative to the fuel injector.

6. A fuel pressure sensor/sensor mount assembly as forth in claim 1, wherein said connector is fastened threadably to the fuel injector and the fuel pipe, and wherein a direction in which said connector is fastened threadably to the fuel injector is oriented to traverse a direction in which said connector is fastened threadably to the fuel pipe.

7. A fuel pressure sensor/sensor mount assembly as set forth in claim 1, wherein said connector has formed therein a thin-walled portion which is to be deformed elastically by the pressure of the fuel in the communication path, and wherein said fuel pressure sensor is designed to be sensitive to elastic deformation of the thin-walled portion to produce the signal as a function of the pressure of the fuel.

8. A fuel pressure sensor/sensor mount assembly for use in a fuel injection system equipped with fuel injectors which inject fuel, as supplied from an accumulator through fuel pipes, into a multi-cylinder internal combustion engine, comprising:
a connector which is formed separately and is to be disposed between the fuel injectors and the fuel pipes and has formed therein a plurality of communication paths which are to establish fluid communications between fuel outlets of the fuel pipes and fuel inlets of the fuel injectors, said connector also having formed therein sensor mounts exposed to the communication paths, respectively; and
fuel pressure sensors mounted one in each of the sensor mounts of said connector, each of said fuel pressure sensors being sensitive to a pressure of the fuel in a corresponding one of the communication paths to produce a signal indicative thereof.

9. A fuel pressure sensor/sensor mount assembly as set forth in claim 8, said connector has a joint serving to establish a mechanical joint to a cylinder head of the internal combustion engine, so that said connector functions as a clamp to clamp the fuel injectors to the cylinder head.

10. A fuel pressure sensor/sensor mount assembly as set forth in claim 8, wherein said connector has formed therein a common wire distribution path through which conductive wires of said fuel pressure sensors extend.

11. A fuel pressure sensor/sensor mount assembly as set forth in claim 8, wherein said connector has a common connector to which conductive wires of said fuel pressure sensors are joined.

12. A fuel pressure sensor/sensor mount assembly as set forth in claim 8, wherein said connector is equipped with a cooling mechanism working to cool said fuel pressure sensors.

13. A fuel pressure sensor/sensor mount assembly as set forth in claim 12, wherein the cooling mechanism includes a coolant path formed in said connector through which coolant flows to cool said fuel pressure sensors.

14. A fuel injection apparatus comprising:
an injector body which has a fuel flow path to which fuel is supplied from an external fuel induction pipe and a spray hole which communicates with the fuel flow path and from which at least a portion of the fuel is sprayed;
an inlet body which is separately formed from said injector body and secured to said injector body, said inlet body having formed therein a fuel inlet path communicating between the external fuel induction pipe and the fuel flow path of said injector body; and
a fuel pressure sensor which is installed in said inlet body and includes a diaphragm which is to be deformed in response to pressure of the fuel flowing through the fuel inlet path and a sensing element which produces a signal as a function of a degree of deformation of said diaphragm.

15. A fuel injection apparatus as set forth in claim 14, further comprising a nozzle needle which is movable in an axial direction of said injector body to open and close the spray hole selectively, an actuator working to control movement of said nozzle needle in the axial direction of said injector body, and a pressure control chamber into or from which the fuel is fed or discharged by an operation of said actuator and which exerts pressure of the fuel, as fed thereinto, on a control piston to urge said nozzle needle in a valve-closing direction in which the spray hole is closed, wherein said nozzle needle, said actuator, said control piston, and said pressure chamber are disposed in said injector body, and wherein said inlet body is joined to a portion of said injector body which is located farther from the spray hole than said pressure control chamber.

16. A fuel injection apparatus as set forth in claim 14, wherein said diaphragm has a flat surface on which said sensing element is mounted, and wherein a plane of the flat surface is oriented at an angle greater than or equal to 0° and smaller than 90° to an axial direction of said injector body.

17. A fuel injection apparatus as set forth in claim 16, wherein the plane of the flat surface of said diaphragm is oriented at an angle greater than or equal to 0° and smaller than or equal to 75° to the axial direction of said injector body.

18. A fuel injection apparatus as set forth in claim 14, wherein said inlet body includes a branch path extending from the fuel inlet path and a cylindrical stem having an open end communicating with the branch path and a closed end which is opposite the open end and which defines said diaphragm.

19. A fuel injection apparatus as set forth in claim 18, wherein said inlet body also includes an open hole and a recess, the open hole extending from an outer wall of said inlet body into the fuel inlet path to define the branch path, the recess being formed to occupy an area of the outer wall of said inlet body in which the open hole is formed, and wherein said cylindrical stem is fit in the recess.

20. A fuel injection apparatus as set forth in claim 19, wherein said diaphragm has opposed first and second surfaces, the first surface facing the fuel inlet path, wherein the fuel pressure sensor has a sensing element installed on the second surface of said diaphragm, and wherein the recess of said inlet body is so formed in said inlet body that an outermost portion of one of the sensing element and the stem in a radial direction of said inlet body is located radially inside an outermost portion of the outer wall of the inlet body which defines the recess.

21. A fuel injection apparatus as set forth in claim 20, wherein the sensing element is a semiconductor pressure sensing element and affixed to the second surface of said diaphragm.

22. A fuel injection apparatus as set forth in claim 18, wherein the branch path is defined by an orifice formed between the fuel inlet path and the cylindrical stem, and wherein a diameter of the orifice is smaller an inner diameter of the cylindrical stem.

23. A fuel injection apparatus as set forth in claim 14, wherein said inlet body is joined detachably to said injector body through a fastener.

24. A fuel injection apparatus as set forth in claim 23, wherein said injector body has a thread formed thereon, and wherein said fastener is made of a hollow cylindrical member which covers at least a portion of said inlet body and a portion of said injector body and has a thread engaging with the thread of said injector body to make a joint between said injector body and said inlet body.

25. A fuel injection apparatus as set forth in claim 23, wherein said inlet body includes a plurality of connector pins which are electrically connected to said fuel pressure sensor and which are electrically insulated from each other, and wherein said fastener has an opening facing the connector pins.

26. A pressure sensing apparatus for use in a fuel injection system working to spray fuel comprising:
   an inlet body including a fuel inlet path through which fuel flows, an open hole and a recess, the open hole extending from an outer wall of said inlet body into the fuel inlet path to define a branch path diverging from the fuel inlet path, the recess being formed to occupy an area of the outer wall of said inlet body in which the open hole is formed;
   a hollow cylindrical stem having an open end communicating with the branch path and a closed end which is opposite the open end and which defines a diaphragm, the diaphragm having opposed first and second surfaces, the first surface facing the fuel inlet path; and
   a fuel pressure sensor mounted on the second surface of the diaphragm, said pressure sensor producing a signal as a function of a degree of deformation of the diaphragm arising from exertion of pressure of the fuel, and
   wherein the recess of said inlet body is so formed in said inlet body that an outermost portion of one of the fuel pressure sensor and the stem in a radial direction of said inlet body is located radially inside an outermost portion of the outer wall of the inlet body which defines the recess.

27. A pressure sensing apparatus comprising:
   an injector body including a fuel inlet port to which an external fuel induction pipe is to be joined and fuel is supplied through the external fuel induction pipe, a fuel flow path through which the fuel, as supplied through the fuel inlet port, flows, and a spray hole which communicates with the fuel flow path and from which at least a portion of the fuel is sprayed;
   a diaphragm exposed to the fuel flowing through the fuel flow path, said diaphragm having a flat wall which is to be deformed in response to pressure of the fuel; and
   a fuel pressure sensor mounted on the flat wall of said diaphragm, said fuel pressure sensor producing a signal as a function of a degree of deformation of said diaphragm, and
   wherein if an axial direction of said injector body is defined as a first direction, and a radial direction of said injector body oriented toward the fuel inlet port is defined as a second direction, a plane of the flat wall of said diaphragm extends at an angle greater than or equal to 0° and smaller than or equal to 30° to a plane, as defined to extend through the first and second directions.

* * * * *